United States Patent
Kanani

(10) Patent No.: US 12,017,142 B2
(45) Date of Patent: Jun. 25, 2024

(54) SYSTEM AND METHOD FOR REAL-TIME CALIBRATION OF VIRTUAL APPAREL USING STATEFUL NEURAL NETWORK INFERENCES AND INTERACTIVE BODY MEASUREMENTS

(71) Applicant: Pritesh Kanani, Bellevue, WA (US)

(72) Inventor: Pritesh Kanani, Bellevue, WA (US)

( * ) Notice: Subject to any disclaimer, the term of this patent is extended or adjusted under 35 U.S.C. 154(b) by 402 days.

(21) Appl. No.: 17/555,651

(22) Filed: Dec. 20, 2021

(65) Prior Publication Data

US 2022/0258049 A1 Aug. 18, 2022

Related U.S. Application Data

(60) Provisional application No. 63/150,077, filed on Feb. 16, 2021.

(51) Int. Cl.
*A63F 13/31* (2014.01)
*A63F 13/53* (2014.01)

(52) U.S. Cl.
CPC ............. *A63F 13/53* (2014.09); *A63F 13/31* (2014.09)

(58) Field of Classification Search
CPC ........... A63F 13/17; A63F 13/31; G06F 3/011
See application file for complete search history.

(56) References Cited

U.S. PATENT DOCUMENTS

| | | | |
|---|---|---|---|
| 11,062,508 B1* | 7/2021 | Moody | G06F 18/22 |
| 2001/0026272 A1* | 10/2001 | Feld | A41H 3/007 |
| | | | 345/585 |
| 2019/0050427 A1* | 2/2019 | Wiesel | G06T 19/00 |

* cited by examiner

*Primary Examiner* — James S. McClellan
(74) *Attorney, Agent, or Firm* — The Rapacke Law Group, P.A.; Andrew S. Rapacke

(57) ABSTRACT

An Augmented Reality (AR) and Artificial Intelligence (AI) based interactive virtual try-on solution that facilitates trying on, fitting, and modularizing a virtual apparel in real-time—as if a consumer were wearing the apparel. A user with a mobile device defines retail adjustment operations on the virtual apparel using an AR-based visual interface. The user can interact with the virtual apparel for identifying, defining, and changing the look, fit, and design of the apparel on the user's body. The real-time interaction is with the same virtual apparel. The system defines operations based on user's features, sartorial measurements, intent, gestures, position, pressure values received from a controller operated by the user, and the sensed motion of the user to translate into a set of machine learning inference models that predict a series of states that visually generate the outcome the user anticipates based on the user's interaction with the virtual clothing.

18 Claims, 10 Drawing Sheets

SYSTEM AND METHOD FOR REAL-TIME CALIBRATION OF VIRTUAL APPAREL USING STATEFUL NEURAL NETWORK INFERENCES AND INTERACTIVE BODY MEASUREMENTS

CROSS-REFERENCE TO RELATED APPLICATION

This application claims the priority benefit under 35 U.S.C. § 119(e) of U.S. Provisional Application No. 63/150,077 filed on Feb. 24, 2021, the disclosure of which is incorporated herein by reference in its entirety.

TECHNICAL FIELD

This disclosure relates generally to virtual clothing, and more specifically to a software-based system and method that allows users to interact with virtually-generated clothing in real-time based on their own body measurements to calibrate the look, fit and design of a specific virtual apparel on their own body in real-time as per individual needs.

BACKGROUND

Online shopping offers the users convenience of shopping from the comfort of their homes. With the advent of sophisticated e-commerce applications, online shopping has been increasing in leaps and bounds. The customers can purchase a myriad of products and services through online means. Although a limited number of products were initially available for online purchase, the list has steadily grown over the last decade. Now, the users can purchase almost anything online—groceries, restaurant food, expensive cars, contractor services, concert tickets, postage stamps, music lessons, and so on.

In case of clothing and related accessories, vendors have created "virtual fitting rooms" to implement the brick-and-mortar store's "Try before you buy" strategy in the online world for efficient customer engagement. The virtual fitting room technology market provides offerings for clothing accessories (such as shoes, belts, masks, and the like), watches, glasses, hats, clothes/apparels, and more. These virtual fitting rooms typically utilize Augmented Reality (AR) in conjunction with Artificial Intelligence (AI) to estimate a human user's pose and/or body parts for rendering of the virtual try-on solution for the user.

For example, in case of try-on of a virtual watch, ARTag technology may be used to generate a band printed with specific markers. The band may be worn on a user's wrist to start a virtual try-on of a three-dimensional (3D) watch that is displayed on the user's wrist at the location of the band. In case of virtual footwear, AI's deep learning technologies may be utilized to estimate the pose of a user's foot based on the estimated position of selected 3D keypoints. Thereafter, a parametric 3D model of the user's foot may be created, positioned, and scaled according to the geometric properties of the user's foot. The virtual footwear then may be rendered on the 3D model of the foot or on an actual image of the user's foot using AR techniques. Furthermore, many companies have deployed the AR technology for try-on of virtual glasses. The solution may be based on the deep learning-powered pose estimation approach for detection of facial landmarks, while maintaining differentiation of face contour, nose, eyes, eyebrows, and lips with sufficient accuracy. Once the user's facial features are detected, the user can choose a glass model from a virtual catalog, and it is put on his/her eyes. A similar approach may be used to facilitate virtual try-on of hats.

In the context of virtual try-on of an item of clothing (such as, for example, a shirt, a pair of pants, a t-shirt, a skirt, a dress, and so on), a two-dimensional (2D) image or representation of the clothing item may be "applied" or transferred onto a 2D photo or silhouette of the user. The technologies such as Generative Adversarial Networks (GANs), Human Pose Estimation models, and Human Parsing models may be used for the 2D clothes transferring applications. Generally, the following steps may be performed: (i) Initially, the areas corresponding to the relevant individual body part(s) may be identified in the user's 2D image/photo. For example, legs may be identified for pants, arms and torso may be identified for shirts, and so on. (ii) Then, the position of the identified body parts may be detected. (iii) Based on the detected position of the relevant body part(s), a 2D warped image of a virtual clothing item (which is to be transferred onto the user's image) may be produced. For example, if the user has selected to view a virtual shirt, then the warped image of the shirt may be generated based on the detected position of the relevant body parts—here, the arms and torso of the user. (iv) Finally, the warped image of the virtual clothing item may be applied to the 2D image of the user with minimal artifacts.

Although the above approach of transferring of 2D clothes images to a human user's image can provide an unusual and immersive user experience, it still lacks the real-time operation to qualify as a true AR-based solution. Furthermore, compared to shoes, masks, glasses, and watches, the virtual try-on of 3D clothing remains a challenge because the clothes are deformed when taking the shape of a person's body. This hampers proper AR experience.

SUMMARY

This Summary provides a simplified form of concepts that are further described below in the Detailed Description. This Summary is not intended to identify key or essential features and should therefore not be used for determining or limiting the scope of the claimed subject matter.

As mentioned before, the virtual try-on of 3D clothing in real-time remains a challenge because of the need to adjust the shape, size, and orientation of the clothing as per the contours of the user's body in real-time. The deformation needed to make the virtual clothing appear realistic on the user may need to be adjusted in real-time as per the user movement/motion. Furthermore, a virtual try-on solution can be truly beneficial only when it allows the user to interact with the 3D virtual clothing in real-time to find the right-fitting apparel and also to control how a designated clothing item looks on him/her in real-time.

In the virtual world, where online shoppers are consistently increasing, social experiences and user interface design matter a lot to the end users. An additional engagement of just 0.2% from the users of online clothing and accessory platforms can drive over 50 million dollars of revenue for these industries. Interaction with garments is one of the key elements for the user to decide if a garment is a good fit or not. Users need to be able to adjust and interact with their clothing to have the satisfaction that they have purchased the correct clothing online. Retailers, on the other hand, need to be able to test out how a garment behaves virtually to tell their customers how their apparel offerings can help.

It is therefore desirable to devise a technology application that helps consumers find the right fit for apparel by allowing them to interact, in real-time, with the same virtual apparel to control how the virtual apparel or clothing looks on them in real-time.

As a solution, particular embodiments of the present disclosure relate to a system and method that allows a user with a smartphone or tablet or other wearable device (laptop/desktop) to define retail adjustment operations on a virtual apparel/clothing in real-time using an AR-based visual interface and the user's fingertips. The solution allows the user to interact with the virtual apparel for identifying, defining, and changing the look, fit, and design of the specific apparel on the user's own body in real-time as per individual needs. The real-time interaction is with the same virtual garment, and not a different garment. A user can provide queries based on his/her own body measurements in order to interact with the virtually-generated clothing to fit the clothing to the user's needs in real-time. The system defines operations that utilize a combination of constructs such as user's features (hands, face, legs, and so on), sartorial measurements of the user, intent of the user, gestures of the user, depth of the user's position, pressure values received from a controller operated by the user, and the sensed motion of the user to translate into a set of machine learning (ML) inference models that predict a series of states that visually generate the outcome the user anticipates based on the user's interaction with a virtual piece of clothing.

Initially, a software application as per teachings of the present disclosure may generate user's body measurements using the camera in the user's equipment—such as a mobile phone, a smartphone, a tablet computer, and the like. The user may be allowed to perform a virtual operation in real time—such as unbuttoning a virtual t-shirt, folding a pair of virtual jeans, or removing an e-belt—with an apparatus controller designed to fit in user's hands or using a hand gesture, voice command, or facial expression without using the controller. The virtual operation may tweak certain body measurements. For example, a virtual unbuttoning operation may tweak the measured chest size of the user to "open up" the virtual t-shirt in a gravitationally decreasing direction. The apparatus controller may receive body measurements and dynamically scale them as per key points of the virtual clothing and apparel assets. A pressure sensor in the apparatus controller may allow the user to affirm actions such as "hold," "drop," "move," or "fold" on a virtual apparel depending on the combination of position, gesture, and pressure of the given interaction. A query translator module of the software application may interface with the apparatus controller, the camera in the user's equipment, and a user interface being displayed on the user's equipment and define the rules of interactions with the virtual apparel by the user. For example, the query translator may interpret an input received from the apparatus controller as a virtual unbuttoning operation. In response, the query translator may inform a Convolutional Neural Network (CNN) based server in the software application that the user wishes to manipulate the button of the virtual t-shirt, with the expected result of opening the virtual t-shirt. In this manner, a user can perform retail adjustment operations on a piece of virtual apparel.

In certain embodiments, the software application may comprise two modules in communication with each other—a retailer (or backend) module, and a user (or frontend) module. The retailer module may be deployed by a clothing retailer to offer a selection of virtual apparels to its customers to try-on and interact with in real-time before placing an order for the desired clothing. Using Augmented Reality (AR) techniques, the retailer module may generate an augmented image (or video frame) of the user in real-time, with a user-selected virtual apparel fitted on the user. The user module, on the other hand, may be installed on the user equipment (UE) to allow the user to capture and send the user's body measurements to the retailer module and also to transmit user interactions for processing by the retailer module. As mentioned before, an apparatus controller may be operated by the user to interact with a specific virtual apparel. The apparatus controller may locally communicate with the user module, for example, via a Bluetooth® link with the UE. Based on the inferred intent of the user interaction, the backend module may modify—in real-time—the AR image of the user to allow the user to control how the virtual apparel looks on the user in real-time and under different poses/movements.

In one embodiment, the present disclosure is directed to a method, which comprises: (i) wirelessly obtaining, by a computing system, sartorial measurements of a human user; (ii) displaying, by the computing system, a real-time image of the user with a virtual apparel fitted on a corresponding body portion of the user (across any pose or deformation of the user's body) in the real-time image as per the sartorial measurements, thereby generating an augmented image of the user in real-time; (iii) interpreting, by the computing system and in real-time, a sartorial interaction by the user with the virtual apparel in the augmented image to predict an apparel-specific action intended by the user as if the user were actually wearing the virtual apparel; and (iv) displaying, by the computing system and in real-time, the augmented image of the user having the virtual apparel modified as per the apparel-specific action. In particular embodiments, the augmented image is displayed to the user as a real-time video frame.

In another embodiment, the present disclosure is directed to a method, which comprises: (i) determining, by a computing system, sartorial measurements of a human user; (ii) selecting, by the computing system, a virtual apparel that best fits a corresponding body portion of the user as per the sartorial measurements; (iii) generating, by the computing system, a first Augmented Reality (AR) dataset to enable a first real-time display of an augmented image of the user with the virtual apparel fitted on the corresponding body portion of the user; (iv) receiving, by the computing system, an indication predicting an apparel-specific action intended by the user through a sartorial interaction with the virtual apparel in the augmented image; and (v) analyzing, by the computing system, the indication to generate a second AR dataset to enable a second real-time display of the augmented image of the user having the virtual apparel modified therein as per the apparel-specific action. In some embodiments, the method may further include projecting the (determined) sartorial measurements back onto the augmented image output. In other embodiments, prior to analyzing the indication, the method may include tasks associated with an interpretation and accumulation stage to address features of query translator and query assimilator (discussed later in more detail).

In a further embodiment, the present disclosure is directed to a computer program product comprising a non-transitory computer-usable medium having computer-readable program code embodied therein, wherein the computer-readable program code, when executed by a computing system, causes the computing system to implement a method. The method comprises performing the following in real-time: (i) wirelessly generating sartorial measurements of a human user; (ii) providing a virtual apparel that best fits a corresponding body portion of the user as per the sartorial measurements; (iii) displaying a video frame of the user with the virtual apparel fitted on the corresponding body portion of the user (across any pose or deformation of the body portion), thereby generating an augmented video frame of the user; (iv) allowing the user to perform a sartorial interaction with the virtual apparel in the augmented video frame; (v) interpreting the sartorial interaction to predict an apparel-specific action intended by the user as if the user were actually wearing the virtual apparel; and (vi) displaying the augmented video frame of the user having the virtual apparel modified therein as per the apparel-specific action.

Thus, the AR- and AI-based interactive virtual try-on solution as per particular embodiments of the present disclosure facilitates trying on, fitting, and modularizing a virtual apparel as if the consumer were actually wearing the apparel. The solution helps the users interact with the virtual apparel in real-time to find the right fitting apparel for their body measurements. A software middleware provisions retailers with stateful operators that allow the retailers to define and generate virtual clothing interactions that can benefit the consumers when they try-on their desired virtual clothing. Because the solution allows a user to interact with a virtually-generated clothing in real-time—as if the user were trying-on the clothing in a traditional brick-and-mortar store—before making a purchase online, the returns of clothing purchased online and attendant utilization of human resources (such as for re-stocking, returns processing, billing adjustments, and the like) may be significantly reduced.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

DETAILED DESCRIPTION

Figure 1:
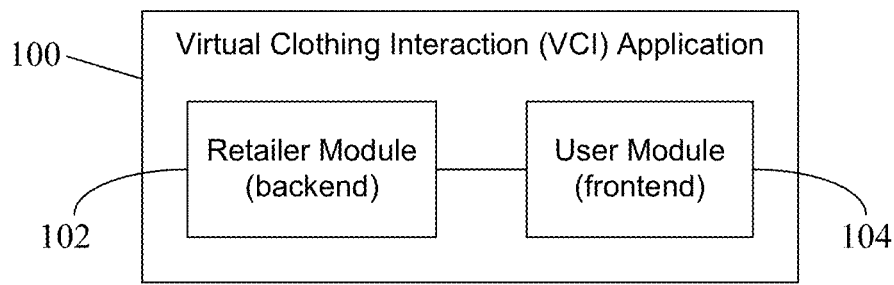
FIG. 1 illustrates constituent components of a Virtual Clothing Interaction (VCI) application according to particular embodiments of the present disclosure.

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the teachings of the present disclosure. Furthermore, this disclosure provides various example implementations or embodiments, as described, and as illustrated in the drawings. However, this disclosure is not limited to the implementations described and illustrated herein, but can extend to other implementations, as would be known or as would become known to those skilled in the art.

Reference throughout this specification to "one embodiment," "particular embodiments," "this implementation," "some embodiments," or other terms of similar import, means that a particular feature, structure, or characteristic described in connection with the embodiment is included in at least one embodiment or implementation of the present disclosure. Thus, the appearances of these phrases in various places throughout this specification are not necessarily all referring to the same implementation/embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "real-time," "pre-defined", "virtually-generated," etc.) may be occasionally interchangeably used with its non-hyphenated version (e.g., "real time," "predefined", "virtually generated," etc.), and a capitalized entry (e.g., "Host System," "Retailer Module," "Augmented Reality," etc.) may be interchangeably used with its non-capitalized version (e.g., "host system," "retailer module," "augmented reality," etc.). Such occasional interchangeable uses shall not be considered inconsistent with each other.

It is noted at the outset that the terms "coupled," "operatively coupled," "connected", "connecting," "electrically connected," etc., are used interchangeably herein to generally refer to the condition of being electrically/electronically connected in an operative manner. Similarly, a first entity is considered to be in "communication" with a second entity (or entities) when the first entity electrically sends and/or receives (whether through wireline and/or wireless means) information signals (whether containing address, data, or control information) to/from the second entity regardless of the type (analog or digital) of those signals. It is further noted that various figures shown and discussed herein are for illustrative purpose only and are not drawn to scale.

The terms "first," "second," etc., as used herein, are used as labels for nouns that they precede, and do not imply any type of ordering (e.g., spatial, temporal, logical, etc.) unless explicitly defined as such. Furthermore, items or features appearing in different figures may be identified using the same reference numeral for ease of discussion. However, such identification does not imply that the commonly-referenced items/features are identical across all embodiments.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism.

In the discussion herein, the terms "retailer system," "third party system", "third party platform," and "host system" may be used interchangeably merely for ease of description. Similarly, the terms "customer", "client," and "user" also may be used interchangeably regardless of whether the person performing interactions with a virtual apparel as per teachings of the present disclosure is an actual or potential client of a retailer offering the virtual try-on facility. A commercial transaction between a user and the retailer is not needed for the user to be considered a "customer" in the discussion herein. Furthermore, also for ease of discussion, the terms "apparel", "clothing," and "garment" may be used interchangeably herein to refer to a wearable article of a human user's wardrobe. Some exemplary apparels include a shirt, a t-shirt, a pair of pants, a skirt, a mini-dress, and the like. On the other hand, a clothing "accessory" may include a belt, a suspender, a wristwatch, a pair of shoes, a scarf, a tie, an outer jacket, and the like. In some embodiments, the term "apparel" may include an "accessory" as well.

Generally, an online retailer or merchant selling items of clothing may be a human operator or a non-human entity (such as a for-profit corporation, a non-profit enterprise, or any other commercial or non-commercial entity). A customer, on the other hand, is a human person who tries on a virtual clothing offered by the retailer as per teachings of the present disclosure. Based on the virtual try-on, the customer may intimate the merchant to modify certain aspects or features of the clothing before shipping it to the customer. Alternatively, the customer may decide not to purchase the clothing altogether.

It is understood that the try-on of a clothing—whether virtually or traditionally in a brick-and-mortar store—is essentially a real-time operation. Any interaction the user performs with the clothing during the try-on is a real-time interaction for which the user gets real-time feedback, for example, by looking at himself/herself in a mirror at a brick-and-mortar store. Hence, in the context of the virtual try-on, the user would also expect a real-time interpretation of his/her interactions with a virtual clothing and corresponding real-time feedback. Therefore, the present disclosure focuses on such real-time operations. Due to minor processing delays inherent in any electronic data processing operation, in the present disclosure, an action, transaction, task, or operation may be considered to be in "real-time" so long as it is perceived as such by the user in the context of the user's online experience. The terms "substantially in real-time," "in near real-time", or "essentially in real-time" may be considered equivalent to the term "real-time" in view of the relatively insignificant delays inherent in electronic data processing and accepted worldwide by the online community of users as part of their "real-time" online experience.

FIG. 1 illustrates constituent components of a Virtual Clothing Interaction (VCI) application 100 according to particular embodiments of the present disclosure. The VCI application 100 may be a software module having various distributed data processing functionalities discussed later below with reference to FIGS. 2-11. Some portion of data processing or computations may be performed locally in a mobile device whereas some other portion of data processing may be performed remotely on an online host system. The VCI application 100 according to one embodiment of the present disclosure may include a VCI Retailer Module or backend component 102 and a VCI User Module or frontend component 104. In particular embodiments, the user module 104 and the retailer module 102 may interact with each other in a client-server configuration. The user module and the retailer module may be in bi-directional communication (as discussed below with reference to FIG. 2) with each other and may together facilitate a customer's interactions with a virtual apparel as discussed later.

Figure 2:
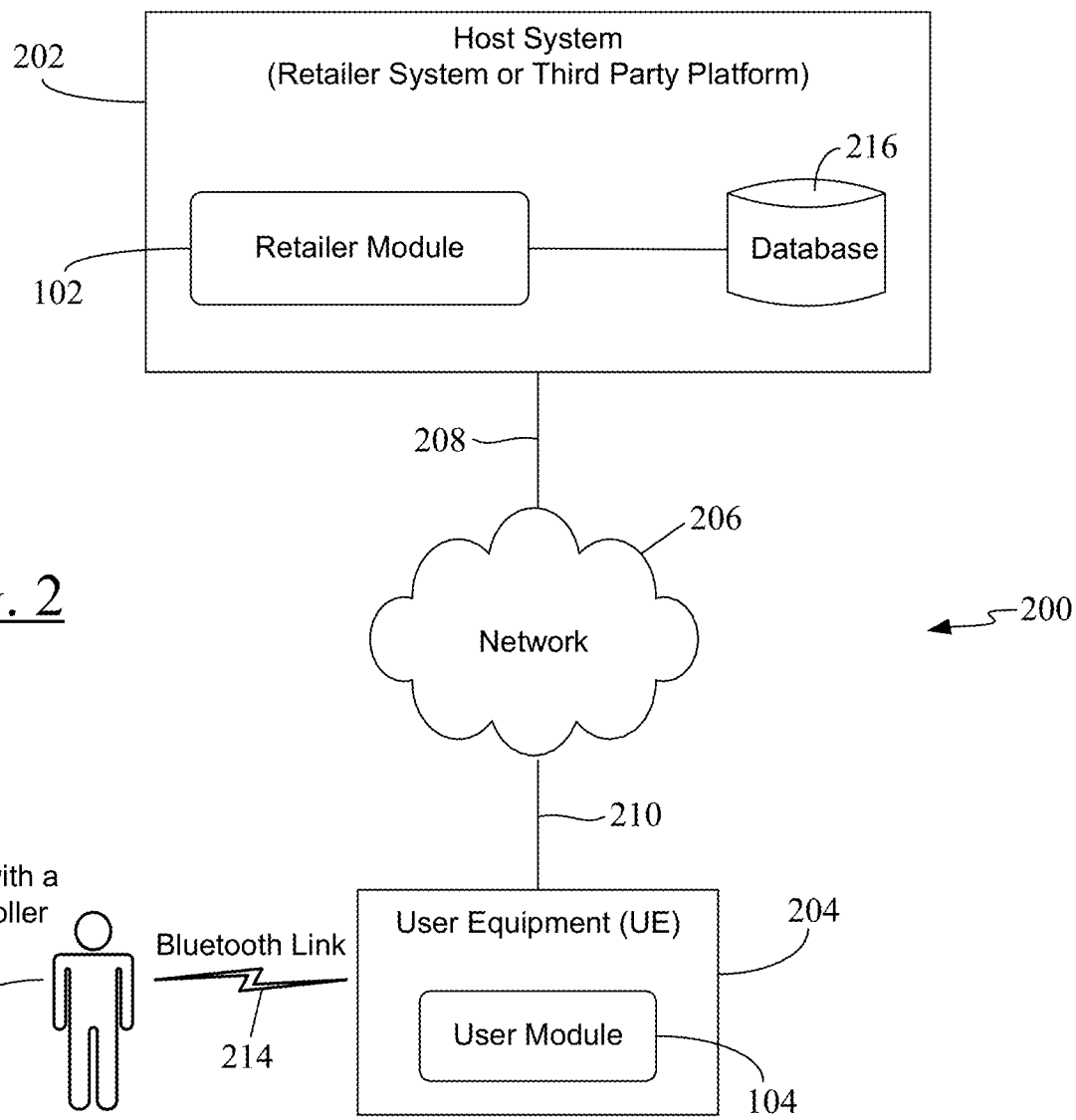
FIG. 2 depicts an exemplary system for implementing the VCI application as per certain embodiments of the present disclosure.

FIG. 2 depicts an exemplary system 200 for implementing the VCI application 100 as per certain embodiments of the present disclosure. In the system 200 of FIG. 2, a host system (also interchangeably referred to as a retailer system or a third-party platform) 202 is shown to be in communication with a User Equipment (UE) 204 via a communication network 206. It is noted here that the terms "mobile handset," "mobile device," "user terminal," and "User Equipment (UE)" may be used interchangeably herein to refer to a wireless communication device that is capable of voice and/or data communication via a wireless carrier network and also capable of being mobile. Some examples of such mobile handsets/devices include cellular telephones or data transfer equipments (e.g., a Personal Digital Assistant (PDA) or a pager), smartphones (e.g., iPhone™, Android™, Blackberry™, etc.), tablet computers, laptops, Bluetooth® devices, or any other type of user devices capable of operating in a wireless environment. The carrier network may be a wireless communication network (e.g., a cellular network) facilitating voice and/or data communication between two user equipments (UEs).

In the embodiment of FIG. 2, each system 202, 204 may be operable to communicate with the other system, as shown by the exemplary (bi-directional) links 208, 210. In a typical implementation, the communication network 206 may be an Internet Protocol (IP) network, such as the Internet. However, in other embodiments, the host system 202 may individually communicate with the UE 204 via a different type of communication network that supports bi-directional communication. For example, the host system 202 may be connected to the UE 204 via a corporate intranet or a specific communication platform made available to the UE 204. For example, in case of the host system 202 set-up as a stand-alone kiosk in a mall or a department store, the UE of a mall's visitor or store patron may connect with such a kiosk via a local network of Bluetooth® or Near-Field Communication (NFC) links to allow the visitor to use his/her UE to virtually try-on the clothing offered by the retailer for sale. It is noted that the bi-directional links 208, 210 are exemplary in nature; they do not imply that all types of communication between two entities connected by a link is bi-directional. Furthermore, the UE 204 may send/receive content from the host system 202 through a wireless connection with the Internet 206. In that case, the communication link 210 may be a wireless link. On the other hand, in some embodiments, the retailer system 202 may be connected to the Internet 206 via a wired connection, such as an Ethernet connection. In that case, the communication link 208 may be a wired connection. In other embodiments, the communication link 208 may be a wireless connection (not shown) or a combination of wired and wireless connections.

As shown in the embodiment of FIG. 2, the user module 104 may reside in the mobile device 204, whereas the retailer module 102 may reside at the host system 202. The user module 104 may be configured to run on a variety of mobile devices—Android™ based, Apple iOS™ based, or any other mobile operating system-based (e.g., Symbian™ operating system (OS), Palm™ OS, Windows Mobile™ OS, etc.). In particular embodiments, the mobile device 204 may support downloadable applications and may include a User Interface (UI) to facilitate various tasks in support of the virtual apparel interactions as discussed later below. Such tasks may include, for example, activating a camera in the UE 204 to obtain body measurements of the user, sending the initial body measurements to the retailer module 102, displaying the user's augmented image received from the retailer module 102, reporting user's interactions with the virtual clothing in the augmented image to the retailer module 102, and the like. The host system 202 may be based on the Microsoft® Windows® OS (such as, for example, Windows 7, 8, or 10, and Windows NT operating systems) or any other OS (e.g., Mac™ OSX, Linux, etc.).

In the embodiment of FIG. 2, the UE 204 is shown to be associated with a user 212 who is participating in the interactive virtual try-on of an apparel. The host system 202, on the other hand, may be associated with an online merchant or retailer offering such virtual try-on of its clothing line to the user 212 via online means, as discussed later. In some embodiments, the host system 202 may be associated with a third party who is not the retailer, but an entity affiliated with the retailer to provide the functionality of the VCI application 100 to the retailer and its customers, for example, through a cloud-based Software as a Service (SaaS) platform or Infrastructure as a Service (IaaS) platform. In certain embodiments, such a third party may host the retailer's clothing line on its platform and provide the marketing resources and virtual try-on facility to the retailer's customers on behalf of the retailer. In other embodiments, the third party simply may lease or license the VCI application 100 and its operational environment to the retailer—for example, as a Platform as a Service (PaaS) product—to be implemented on the retailer's own system/platform. As discussed later, the user 212 may hold or wear a controller unit (such as, for example, the apparatus controller 600 of FIG. 6) that communicates with the UE 204 in a wireless manner, such as, for example, via a Bluetooth® link 214. In this manner and as discussed in more detail later, the controller unit may communicate user's interactions with the virtual apparel to the retailer module 102 through its data transmissions to the UE 204 (which, in turn, sends the received data to the host system 202). In some embodiments, the controller may be optional, in which case the user may communicate through gestures, facial expressions, voice commands, and the like. It is understood that there may be multiple user terminals associated with the host system 202, and there may be multiple retailer systems offering online try-on of virtual clothing to the user 212 through its UE 204. However, for ease of illustration and simplicity of discussion, only one of each such system 202, 204 is shown connected to the network 206. The discussion below in the context of a single customer and a single merchant remains equally applicable to all merchants and customers utilizing the functionality of the VCI application 100.

As mentioned earlier, the host system 202 may be associated with an online clothing retailer or a non-retailer third party that merely provides an online platform (in the form of the host system 202) to the retailer to enable the retailer to provide an interactive virtual try-on of its clothing to potential customers as per teachings of the present disclosure. In particular embodiments, the third party may charge a fee to the merchant for its services. In some embodiments, the functionality of the user module 104 may be incorporated into the host system 202 as, for example, in case of a stand-alone kiosk established in a mall or other location for access by the user to try-on retailer's virtual apparels and order them online directly from the kiosk or the user's mobile handset. In case the user's device 204 is a desktop computer or a data processing unit that has a significantly more powerful web browser than those currently available for smartphones, the user module 104 may remain on the host system 202 and may be executed in the device's browser without necessarily downloading the entire program code of the user module 104 onto the user's system 204. Other arrangements to implement the try-on of virtual apparels in an interactive manner may be devised as suited in the marketplace.

The host system 202 may include the retailer module 102 that implements certain aspects of the interactive virtual try-on of clothing as per teachings of the present disclosure. Various software units or components contained in the user module 104 and the retailer module 102 are illustrated in the exemplary embodiment of FIG. 4 and discussed later below. In particular embodiments, the retailer module 102 may be communicatively coupled to a database 216 in the host system 202. Various data generated during a user's virtual try-on of an item of clothing such as, for example, sartorial measurements of the user's body, data to generate a real-time AR image of the user wearing a virtual apparel, the real-time data representing the user's apparel-specific action(s) and corresponding modifications needed to the virtual apparel being shown in the AR image of the user; one or more components of the retailer module 102 including Application Programming Interfaces (APIs) to external programs or applications; data about various garments—such as, for example, dimensions of various portions of a garment, its clothing material, color, size, texture, and other properties—offered for virtual try-ons; and other relevant information necessary to implement the interactive virtual try-on as per teachings of the present disclosure may be stored in the database 216. In certain embodiments, the program code of the user module 104 also may reside in the database 216 for download by users, for example, through a web browser or as an independent mobile app. It is noted that, in some embodiments, the database 216 may be an integral part of the host system 202 as shown, for example, in the embodiment of FIG. 2. In other embodiments, however, the database 216 or a portion thereof (for example, the portion storing garment-related data) may be an external data storage unit (for example, a cloud-based data storage) that is communicatively coupled to the host system 202 for storage and retrieval of data. In certain embodiments, the database 216 may be implemented in software alone, or as a combination of hardware (for example, physical storage/ memory) and software that manages the hardware (for example, a database management application). Additional architectural details of the host system 202 are provided later with reference to discussion of FIG. 11.

Figure 3:
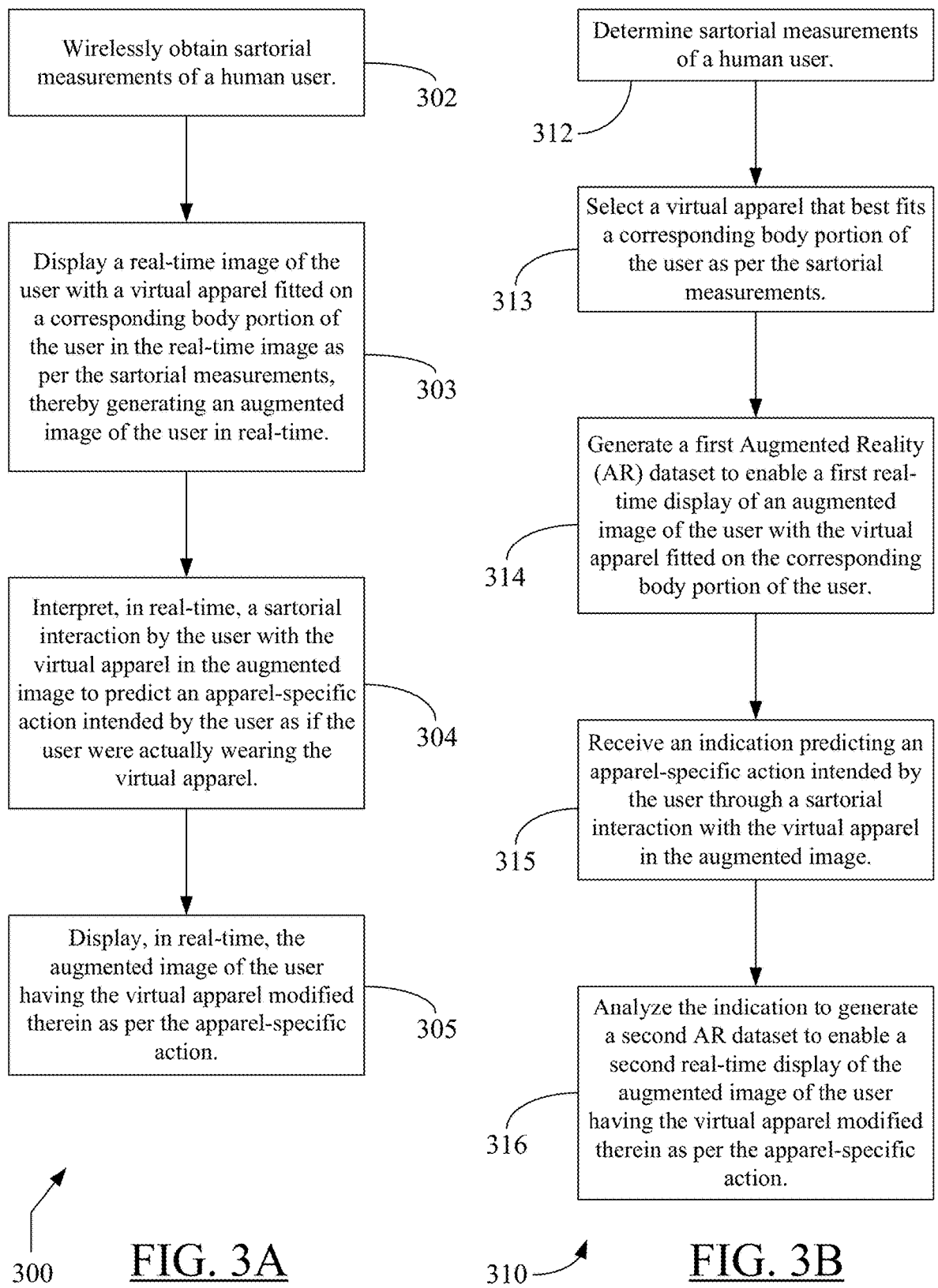
FIGS. 3A-3B show exemplary flowcharts depicting various steps that may be performed by a computing system as per particular embodiments of the present disclosure to facilitate virtual clothing interactions as per teachings of the present disclosure.

In particular embodiments, the functionality of the VCI application 100 may be accomplished when the program codes of its component modules—the retailer module 102 and the user module 104—are executed by processors in respective systems 202, 204. Each module 102, 104 may be a software application comprising program code, which, upon execution by a processor (not shown) in the respective system 202, 204, may enable the systems 202, 204 to jointly perform different operations to facilitate the interactive virtual try-on as per teachings of the present disclosure. An exemplary set of such operations is illustrated in FIG. 3, which is discussed later below. More generally, the retailer module 102, upon execution, may enable the host system 202 to receive, store, and analyze the content received at link 208 and also from other sources (such as, for example, from an external website or data provider, from an external database, and the like); responsively manage and process the content; and offer the results of the processing to the user module 104 for display/presentation to the user 212. Similarly, the user module 104, upon execution, may enable the UE 204 to receive, store, and analyze the content received at links 210 and 214; appropriately process the content and communicate with the retailer module for additional processing; and display the virtual apparel try-on features to the user 212 in real-time as per teachings of the present disclosure. Thus, in some embodiments, the host system 202 may function as a "server", whereas the UE 204 may function as a "client" of the host system 202. It is noted, however, that the client-server based arrangement is only one example of how the interactive virtual try-on methodology of the present disclosure may be implemented. In some embodiments, the functionality of the VCI application 100 may be implemented in a non-server system as well. The non-server system, for example, may be the earlier-mentioned kiosk that implements the functionalities of the retailer module 102 as well as the user module 104 on a single platform.

Furthermore, in certain embodiments, the functionality of the entire VCI application 100 or one or more of its modules 102, 104 may be implemented in an online cloud environment. In this context, "cloud computing" or "cloud environment" refers to an online model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and/or deployment models (e.g., private cloud, community cloud, public cloud, hybrid cloud, etc.).

Figure 10:
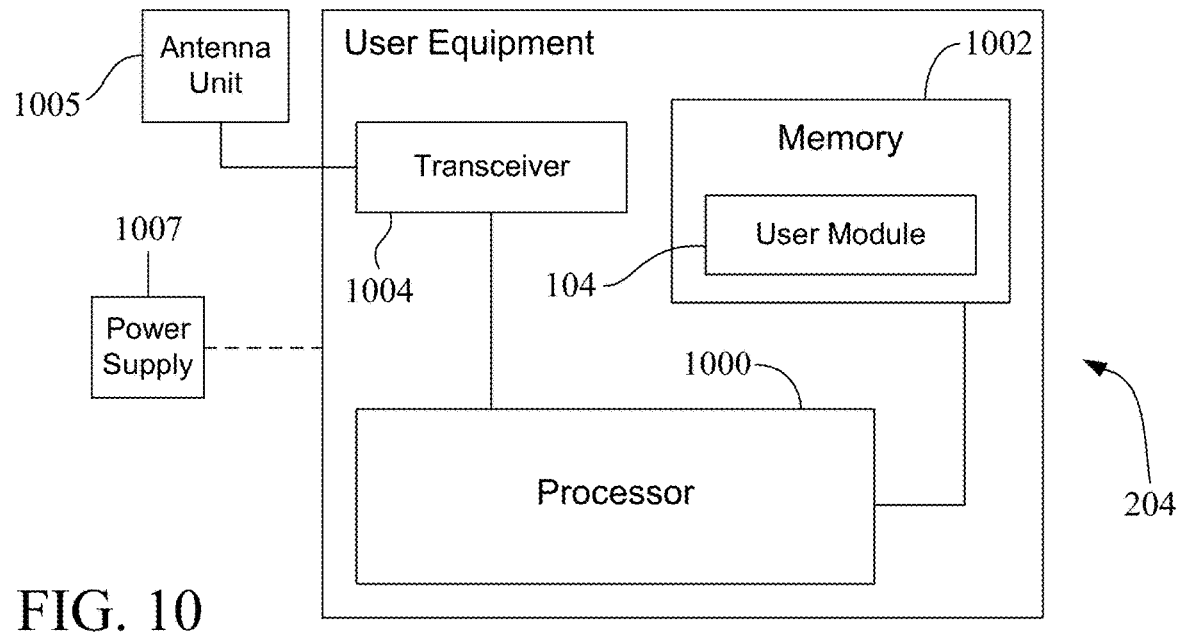
FIG. 10 is a block diagram of an exemplary User Equipment (UE) according to one embodiment of the present disclosure.
Figure 11:
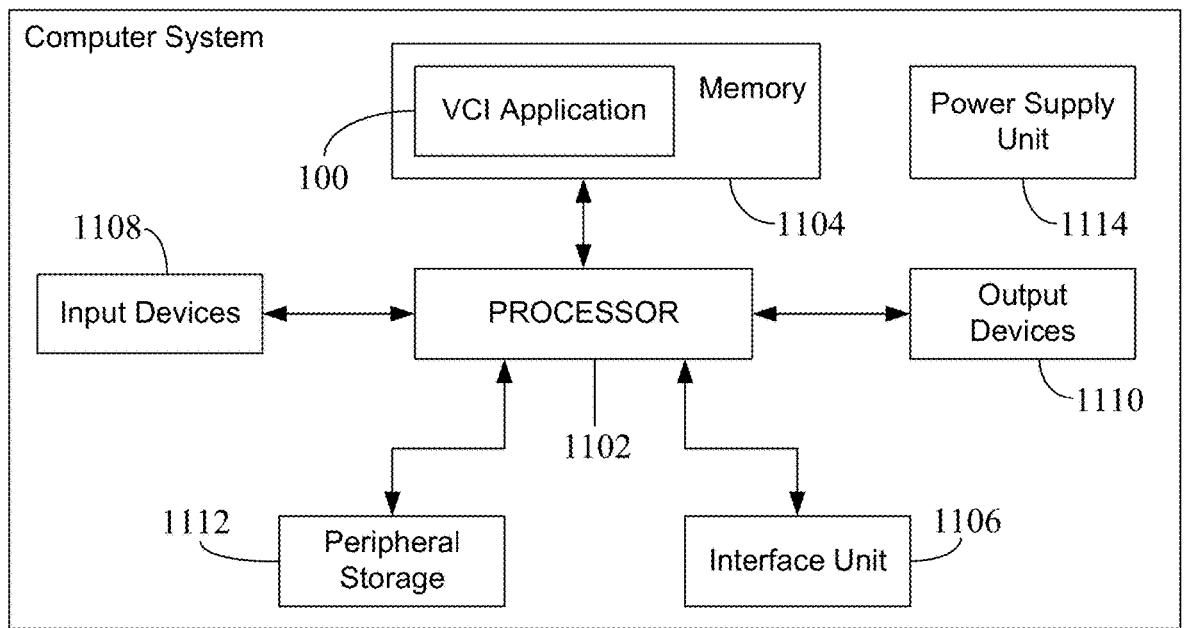
FIG. 11 illustrates an example configuration of a computer system that can be used to implement the virtual clothing interaction methodology described herein.

The program code constituting the retailer module 102 may be stored in a storage unit or memory (not shown) in the host system 202, whereas the program code of the user module 104 may be stored in a memory (not shown) in the UE 204. These program codes may be executed by a processor (not shown) in the respective system 202, 204 under operative control of a respective Operating System (OS). Such memory, processor, and other exemplary architectural details of the UE are shown in FIG. 10 and that of the host system 202 are shown in FIG. 11 and discussed later below. In one embodiment, at least a portion of the program code for the VCI application 100 may be based on Open Source Software (OSS). In some embodiments, the VCI application 100 may be associated with one or more computing systems (not shown) managed by a server that coordinates content delivery to/from these computing systems to the systems 202, 204. The architectural configuration, layout, appearance, or content of such a server based configuration are not relevant to the present disclosure and, hence, no additional details thereof are provided here.

In some embodiments, each of the systems 202, 204 may be a computing system. A computing system generally processes, compiles, stores, and/or communicates information or data for business, personal, or other purposes thereby allowing users or operators of the system to take advantage of the value of the information. Because technology and information handling need and requirements vary between different users or applications, computing systems may also vary regarding what information is handled, how the information is handled, how much information is processed, stored, or communicated, and how quickly and efficiently the information may be processed, stored, or communicated. The variations in computing systems allow for computing systems to be general or configured for a specific user or specific use such as online retail, financial transaction processing, airline reservations, enterprise data storage, or global communications. In addition, computing systems may include a variety of hardware and software components that may be configured to process, store, and communicate information and may include one or more computers, data storage systems, and networking systems.

Modern computing systems include many different types of consumer and commercial electronic devices such as, for example, personal computers (e.g., desktops or laptops), tablet computers, mobile devices (e.g., personal digital assistants (PDAs), User Equipments (UEs), or smart phones), corporate (or small business) server and data processing systems (e.g., blade server or rack server), a network storage device, and the like. These devices may vary in size, shape, performance, functionality, and price. In any event, almost all these modern devices are equipped with relevant hardware and software to allow their users/operators to access a number of different websites over the Internet and perform online transactions.

For purpose of this disclosure, a computing system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for personal, business, scientific, control, or other purposes. The computing system may include random access memory (RAM), one or more processing resources such as a central processing unit (CPU) or hardware or software control logic, read-only memory (ROM), and/or other types of nonvolatile memory. Additional components of the computing system may include one or more disk drives, one or more network ports for communicating with external devices as well as various input and output (I/O) devices, such as a keyboard, a mouse, touch-screen and/or video display. The computing system may also include one or more buses operable to transmit communications between its various hardware components.

In particular embodiments, as noted before, the VCI application 100 may be considered Software as a Service (SaaS). This service may be offered for free to customers, but the clothing retailers may be charged a fee for the use of the service. In other embodiments, as noted before, the functionality of the VCI application 100 may be offered to a retailer as a Platform as a Service (PaaS). In one embodiment, the customer-specific functionality of the user module 104 of the VCI application 100 may be offered as a downloadable mobile app or a browser add-on. In some embodiments, the program code of the user module 104 may be executed from within the web browser of the user's system 204 without the need to download the user module 104 onto the user's system 204. The customer-specific functionality may allow a customer to send details of the customer's body measurements and customer's real-time interactions with a virtual apparel for processing by the host system 202 to provide the customer with an immersive virtual try-on experience as per teachings of the present disclosure. In some embodiments, a program shortcut may allow the customer to download the customer-specific software portion—here, the user module 104—of the VCI application 100 into the UE 204 for execution as an interface when performing a virtual try-on. Similarly, the merchant-specific functionality of the retailer module 102 of the VCI application 100 may be made available to the retailer system 202 to allow an online merchant to offer the interactive virtual try-on of its apparels, as discussed in detail later below.

FIGS. 3A-3B show exemplary flowcharts 300, 310 depicting various steps that may be performed by a computing system as per particular embodiments of the present disclosure to facilitate virtual clothing interactions as per teachings of the present disclosure. It is noted that, in certain embodiments, the steps/tasks 312-316 illustrated in the flowchart 310 in FIG. 3B may be considered complementary to the steps/tasks 302-305 in the flowchart 300 in FIG. 3A. In that case, all of the tasks 302-305 and 312-316 may collectively accomplish the functionality of the VCI application 100. In some embodiments, the steps shown in the flowchart 300 of FIG. 3A primarily may be performed by the UE 204, whereas the steps shown in the flowchart 310 of FIG. 3B primarily may be performed by the host system 202 to collectively implement the functionality of the VCI application 100. Thus, the computing system mentioned in the context of the embodiment in FIG. 3A may be the UE 204, whereas that in the context of the embodiment in FIG. 3B may be the host system 202. In other embodiments, the UE 204 and the host system 202 may jointly perform the steps in one or both of the flowcharts 300, 310. In any event, the computing system performing the tasks in FIGS. 3A-3B may include in hardware and/or software the functionality of the VCI application 100 or a relevant portion thereof—such as the user module 104 or the retailer module 102, as applicable. In one embodiment, the program code of the VCI application 100 or that of the relevant software module 102, 104 (as well as the program code for the OS of the respective computing system 202, 204) may be executed by a processor (not shown) in the respective computing system 202, 204 and, upon execution of the program code, the corresponding computing system 202, 204 may be operative to perform the tasks illustrated in FIGS. 3A-3B (collectively "FIG. 3"), as applicable.

In the flowcharts 300, 310, each block represents one or more tasks that can be implemented in hardware, software, or a combination thereof. In the context of software, the blocks represent computer-executable instructions that, when executed by one or more processors, cause the processors to perform the recited tasks. Generally, computer-executable instructions include routines, programs, objects, modules, components, data structures, and the like that perform particular functions or implement particular abstract data types. The order in which the blocks are described is not intended to be construed as a limitation, and any number of the described tasks can be combined in any order and/or in parallel to implement the processes shown in the flowcharts 300, 310. For discussion purpose, the processes in the flowcharts 300, 310 are described with reference to the system 200 in FIG. 2 as described above, although other models, frameworks, systems, and environments may be used to implement these processes.

Referring now to the flowchart 300 in FIG. 3A, initially, the computing system (for example, the UE 204 and/or the host system 202) may wirelessly obtain sartorial measurements of a human user (block 302). As discussed in more detail later with reference to FIG. 4, the sartorial measurements as per particular embodiments of the present disclosure may include more than typical clothing-related body measurements—such as, for example, waist size, shoulder length, hip measurements, wrist size, neck width, and so on—of the user (such as the user 212 in FIG. 2). In a virtual world, where someone like a human tailor is absent and where all body measurements are generated electronically and remotely/wirelessly, the body measurements alone may not suffice to convey sufficient information necessary to accurately render a virtual apparel for the best fit. For example, even if a user indicates to the VCI application 100 that he/she wears a t-shirt of "small" size, that, in and of itself, does not provide sufficient information to generate sartorial measurements of the user. The computing system would capture not only the body measurements of the user (at block 302) to determine the unique body dimensions of the user but would also utilize other information (as discussed later) to eventually generate user-specific sartorial measurements that enable the user to try-on a virtual apparel that best fits the user as per the user's sartorial measurements. As another example, each individual wears a piece of clothing in a personalized manner—for example, two individuals having the same body waist may wear and anchor jeans at different points on their torso. Therefore, sartorial measurements in the context of rendering a virtual apparel also may take such individual clothing preference into account so that the virtual apparel may fit the user as intended by the user. At block 303, the computing system (such as the UE 204) may display a real-time image or video frame of the user 212 with a virtual apparel fitted on a corresponding body portion of the user in the real-time image as per the sartorial measurements. For example, the real-time image may display a virtual shirt fitted on the torso and arms of the user, a virtual pair of shorts fitted on the upper legs of the user, a virtual robe/gown fitted on the torso and legs of the user, and the like. The size of the virtual apparel may be selected based on the sartorial measurements of the relevant body portion(s) of the user. The real-time display mentioned at block 303 may generate an augmented image of the user in real-time. In particular embodiments, the augmented image may be based on AR techniques and may be displayed to the user as a real-time video frame as discussed later. In other embodiments, the augmented image may be displayed as a combination of video frames, objects, and likeness stacked on top of each other to be viewed as a single video frame to a human eye. The physics engine (discussed later below) may create a "chroma keying" or compositing effect to accomplish such stacking. Thus, in some embodiments, the term "real-time image" also may refer to a real-time video frame, composited frames, objects, and the like. In other embodiments, holographic display technology—for example, cameras projecting 3D depth from a hololens or from some projection mechanisms/ displays—may be used to display the augmented image. In certain embodiments, the computing system (such as the UE 204) may display a "measurement mode" prior to generating the augmented image. In the measurement mode, the computing system may display real time graphics (such as user's body mesh or wireframe or joints) allowing the user to view the sartorial measurements as mapped on the corresponding body portion of the user and to adjust the sartorial measurements for generation of the augmented image. The real time graphics may be demonstrated for the end user's understanding of his/her (raw) body measurements and allowing the user to adjust them as desired for a better-fitting apparel selection. For example, if a user wants their waist to be measured 2 inches above the standard methodology as a preference of wearing their skirt or pants, the user may be allowed to configure this before wearing a virtual garment.

At block 304, the computing system (for example, the UE 204 and/or the host system 202) may interpret, in real-time, a sartorial interaction by the user 212 with the virtual apparel in the augmented image (generated at block 303) to predict an apparel-specific action intended by the user as if the user were wearing the virtual apparel. As discussed later with reference to FIG. 6, the user 212 may use a wearable controller on his/her hand(s) to "interact" with the virtual apparel in real time, as if the user were wearing the apparel. The computing system may interpret the user's interaction(s) in real-time to predict what the user wishes to do with the virtual apparel. For example, if the virtual apparel is a t-shirt, the user may touch/press the virtual button(s) of the t-shirt with the hand controller or may twist the virtual collar of the t-shirt with the hand controller. The computing system may interpret these gestures in real-time to infer the apparel-specific action intended by the user—for example, that the user wishes to unbutton the t-shirt or fold/unfold its collar (depending on the sensed direction of twisting of the virtual collar). Consequently, at block 305, the computing system (such as the UE 204) may display, in real time, the augmented image of the user having the virtual apparel modified therein as per the apparel-specific action. For example, in case of the unbuttoning of the virtual t-shirt, the computing system may display the augmented image with the t-shirt opening and coming off of the user's torso and upper arms in real-time. In case of the folding/unfolding of the collar of the t-shirt, the computing system may display the augmented image with the collar of the t-shirt being folded/unfolded in real-time, as if the user were actually wearing the t-shirt and performing the folding/unfolding operation in real life. As before, the AR techniques may be used to display the augmented image at block 305 to the user as a real-time video frame.

Generally, the term "sartorial interaction", as used herein, refers to actions a person would normally perform while wearing, trying, adjusting, or taking off a piece of clothing. Such actions include, for example, folding a sleeve or a collar of a shirt, closing a zipper of a pair of shorts, opening a button of a t-shirt, adjusting a bra, stretching a dress to adjust it on the body, and the like. More specifically, in the context of the present disclosure, a "sartorial interaction" may be defined as a computer vision based control plane operation that allows a human user to perceive, adjust, remove, change, or redefine their apparel structure and personalize garments for their body shape and motion to be able to visualize—in real time—how the apparel looks on them in a personalized manner. Examples include folding a virtual sleeve or a virtual pair of jeans without needing to hold the mobile device, adjusting a zipper virtually with the close of a thumb or adjusting/removing buttons of a virtual blazer or shirt, stretching a sleeve of a virtual shirt to make sure it fits properly or needs to be longer, and so on. As discussed in more detail later, a combination of sequential semantics may be defined to interface with segmented video frames of a customer, associated derivative measurements (such as vertex, pose, and joint co-ordinates), and available inputs from an apparatus controller (such as the controller 600 in FIG. 6) to identify human-to-virtual clothing operations (or sartorial interactions) that provide the customer with a control over the apparel's look, texture, and adjustment to enhance their decision to purchase the apparel. In particular embodiments, these semantics may be used to recreate garment structures using a real-time feedback loop inside a Convolutional Neural Network (CNN) based deep-learning model such as a Recurrent CNN (RCNN) or a deep CNN. This may generate unique outputs for rendering an apparel with AR effects needed to realistically capture the apparel behavior when worn by a human in a real-time try-on environment.

Referring now to the flowchart 310 in FIG. 3B, initially, at block 312, the computing system (such as, for example, the host system 202 and/or the UE 204) may determine sartorial measurements of a human user, such as the user 212 in FIG. 2. Some discussion of sartorial measurements is given with reference to the earlier discussion of block 302 of FIG. 3A and, hence, are not repeated here. As discussed later with reference to FIG. 4, initial body measurements may be obtained/captured wirelessly by the UE 204 and sent to the host system 202 through the network 206 for additional processing to determine sartorial measurements of the user 212. At block 313, the computing system (for example, the host system 202) may select a virtual apparel that best fits a corresponding body portion of the user as per the sartorial measurements. For example, if the user wishes to view a virtual t-shirt for the interactive try-on as per teachings of the present disclosure, the computing system may select a virtual t-shirt whose dimensions best fit the dimensions of the user's torso and upper arms. Other examples of virtual apparels and their corresponding body portions are discussed before with reference to discussion of block 303 and, hence, are not repeated here for the sake of brevity. It is noted that, in some embodiments, as discussed later, the user may be allowed to select a specific virtual apparel instead of the host system 202 selecting one for the user. Thereafter, at block 314, the computing system (such as the host system 202) may generate a first AR dataset to enable a first real-time display of an augmented image of the user with the virtual apparel fitted on the corresponding body portion of the user. The display operation noted at block 314 may be similar to the display operation discussed before with reference to block 303 in FIG. 3A. In particular embodiments, the first AR dataset may be supplied by the retailer module 102 to the user module 104 via the network 206 to enable the user module 104 to perform the display operation noted at block 314.

As mentioned earlier, the user 212 may interact with the virtual apparel in real-time. In embodiments, the user module 104 in the UE 204—with or without assistance from the retailer module 102 in the host system 202—may interpret the user's interaction(s) as discussed before with reference to block 304 in FIG. 3A. As a result, at block 315, the computing system (for example, the host system 202) may receive an indication—for example, from the UE 204 predicting an apparel-specific action intended by the user through a sartorial interaction with the virtual apparel in the augmented image. Consequently, at block 316, the computing system (for example, the host system 202) may analyze the indication received at block 315 to generate a second AR dataset to enable a second real-time display of the augmented image of the user having the virtual apparel modified therein as per the apparel-specific action. The display operation noted at block 315 may be similar to the display operation discussed before with reference to block 305 in FIG. 3A. Like the first AR dataset at block 314, in particular embodiments, the second AR dataset at block 316 also may be supplied by the retailer module 102 to the user module 104 via the network 206 to enable the user module 104 to perform the display operation noted at block 316 (and also at block 305).

The flowcharts 300, 310 provide an outline of the manner in which functionality of the VCI application 100 may be implemented as per teachings of the present disclosure to allow a user to interact with a virtual clothing in real-time and also to get a visual feedback of the interaction in real-time—in the form of the modified virtual apparel in the augmented image of the user—to determine whether a piece of clothing best fits the user or needs some modifications. This interactive approach may significantly enhance the user's participation in the virtual try-on offered by a retailer and make the overall experience quite enriching for the user. The functionality of the VCI application 100 may effectively "convert" the UE 204 as a digital mirror for the user 212 to use to try-on the virtual clothing.

Figure 4:
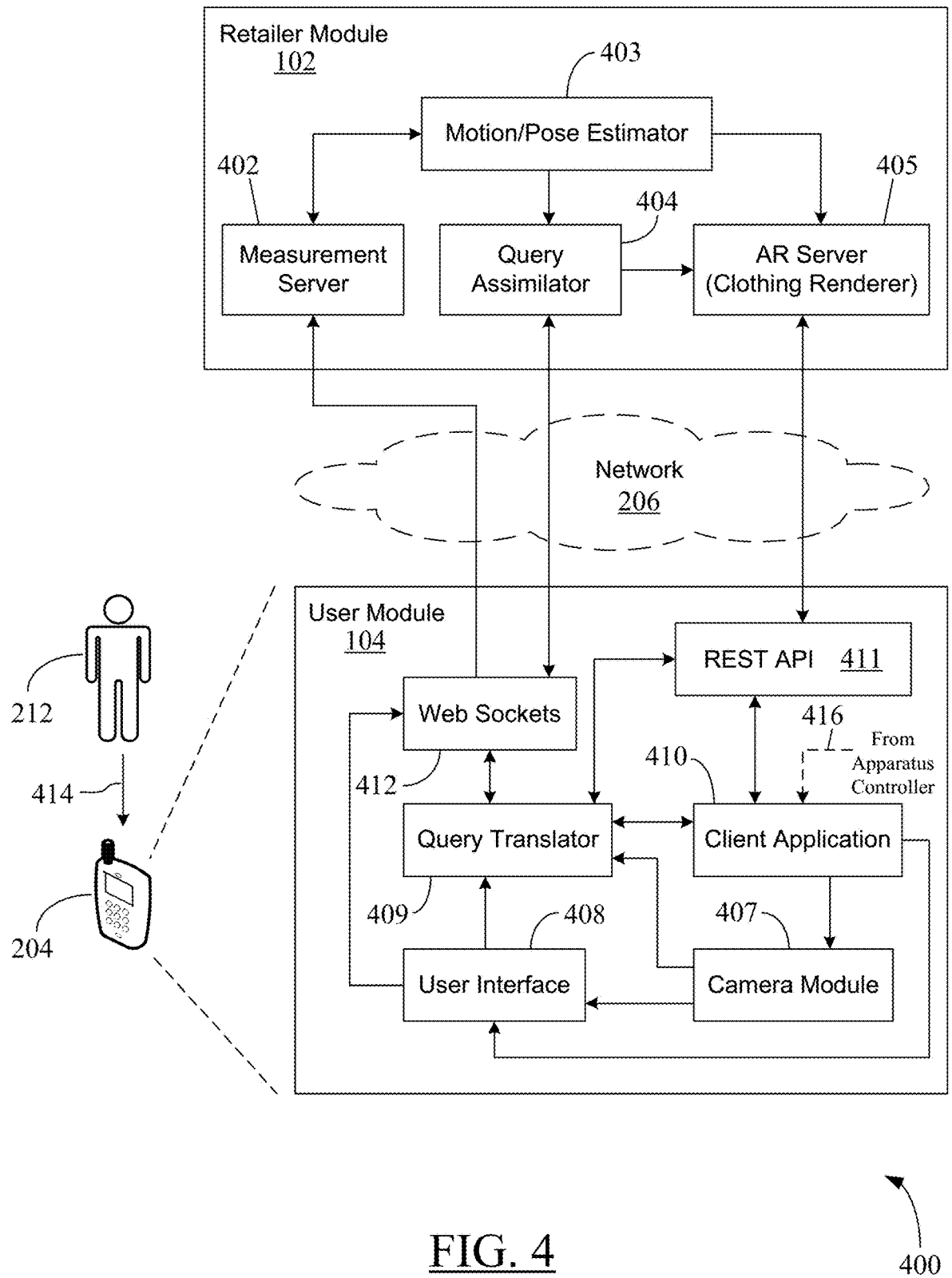
FIG. 4 is an exemplary arrangement that illustrates different software modules that comprise the VCI application and how it facilitates virtual clothing interactions as per particular embodiments of the present disclosure.

FIG. 4 is an exemplary arrangement 400 that illustrates different software modules 402-405, 407-412 that comprise the VCI application 100 and how it facilitates virtual clothing interactions as per particular embodiments of the present disclosure. The interconnections among the software modules shown in FIG. 4 are exemplary only. In other embodiments, additional or different software modules may comprise the VCI application 100, and these software modules may communicate with one another in a different manner than that represented by various connection arrows in FIG. 4. Similarly, in some embodiments, the execution of a task or operation may be partially shared between two or more software modules. However, for ease of discussion, such overlapping executions of tasks/operations are not identified and all internal communications among various software modules are not described. As shown, the retailer module 102 may comprise a measurement server 402, a motion/pose estimator 403, a query assimilator 404, and an Augmented Reality (AR) server 405 that generates data for rendering the virtual clothings. The user module 104, on the other hand, may comprise a camera module 407, a user interface (UI) 408, a query translator 409, a client application 410, a Representational State Transfer (REST) Application Programming Interface (API) 411, and web sockets 412.

In some embodiments, a virtual apparel may be selected by the user 212 from those displayed on a retailer's website or recommended by the retailer's system 202 based on a number of attributes (some or all may be selectable by the user)—such as the gender of the user, the style of the virtual apparel (the style also may include the characteristics of an apparel such as stitching, pleating, and so on), the size of the virtual apparel, the material of the virtual apparel, the texture of the virtual apparel, and physical effects (such as gravity) on the virtual apparel. The selected virtual apparel then may be displayed as fitted on the corresponding body portion of the user. In other embodiments, the retailer's system 202 (or a third party's system affiliated with the retailer) may present a set of virtual candidate apparels to the user for selection. Each virtual candidate apparel may be dimensionally closest to the sartorial measurements (discussed later below) of the corresponding body portion of the user. The user may be allowed to select a virtual candidate apparel from the set. The user-selected virtual candidate apparel then may be displayed as fitted on the corresponding body portion of the user.

In any event, before a user can try-on a virtual clothing, the online retailer or vendor of the clothing may instruct the user to download the relevant app (or provide the user with relevant instructions)—here, the user module 104—onto the user's mobile device. The download may be offered on the retailer's website or through a link to a third party's website. As mentioned before, the third party may be an entity that processes data sent by the user module 104 to provide the AR datasets to the user module for rendering a retailer's apparel virtually on the user's device 204. In some embodiments, the mobile app containing the user module 104 may be available for download from the Google® play store or the Apple® app store, or on an Internet gateway or iFrame on the web. As previously noted, in case of certain devices (for example, a desktop computer), there may not be any need to download such a mobile app. The user module 104 may run directly from the device's web browser.

Figure 5A:
FIGS. 5A-5C show exemplary screenshots and illustrations depicting various body measurements and subsequent generation of a 3D body mesh and joints of a user for real-time rendering of a virtual apparel as per certain embodiments of the present disclosure.
Figure 5B:
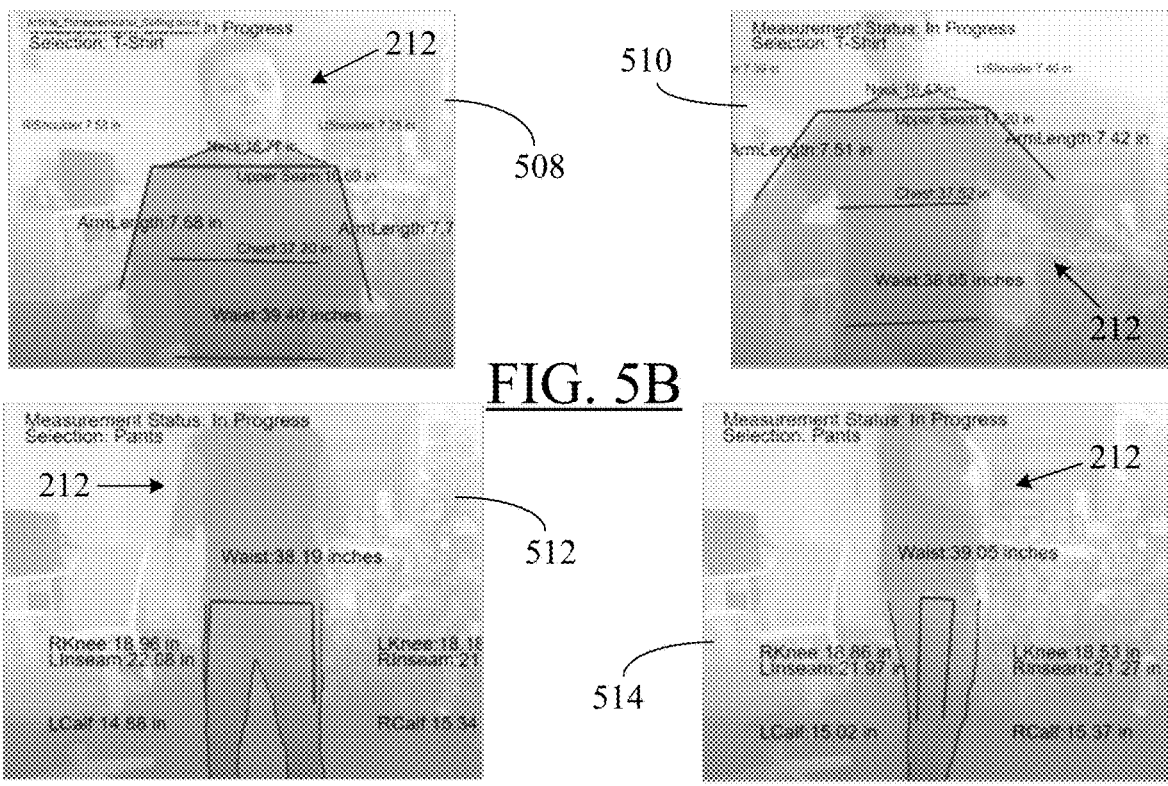
Figure 5C:
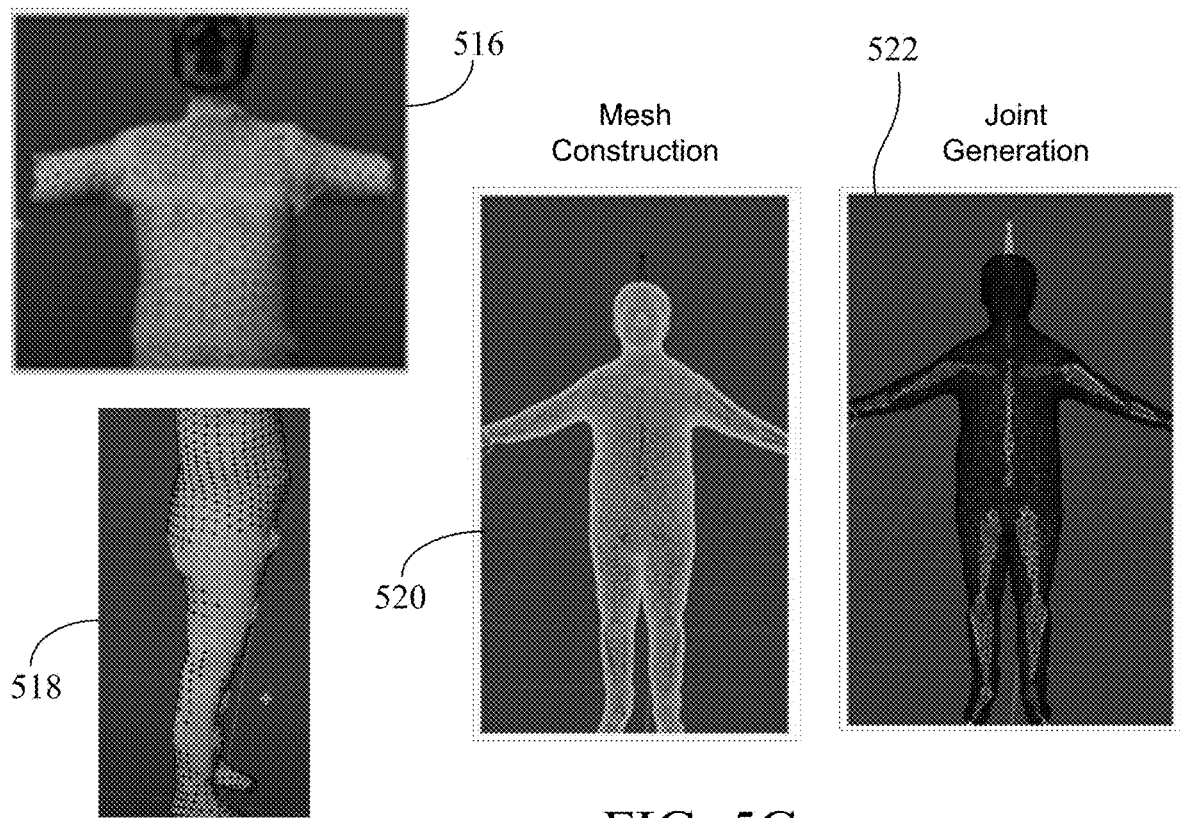

For ease of explanation, the operation of various modules in FIG. 4 will be discussed with reference to illustrations in FIGS. 5A-5C, which show exemplary screenshots and illustrations depicting various body measurements and subsequent generation of a 3D body mesh and joints of a user for real-time rendering of a virtual apparel as per certain embodiments of the present disclosure. In some embodiments, 3D body mesh may be generated in real-time (or in an offline mode), and with occluded segments of the body as well. It is noted initially that, embodiments, the user module 104 may be developed over the Unity Platform (or the Web 3.0 or Web XR (extended reality) platform—a well-known, cross-platform gaming and physics engine that can run on a mobile OS (such as, for example, Android™, Apple iOS™, or any other mobile operating system). Once the user 212 initiates the client application 410, it can activate the camera module 407 that interfaces with and turns on the camera (not shown) of the UE 204. Additionally, the client application 410 also activates the user interface 408 that interfaces with the display screen (not shown) of the UE 204 so that the user 212 can view his/her images or video captured by the camera module 407 on the UE's display. In one embodiment, the UE 204 may be an iPhone™ with camera optics including a 1080 pixel RGB (Red, Green, Blue) camera with a 12× LiDAR (Light Detection and Ranging) sensor, which may use infrared (IR) laser for depth imaging through measurement of distance, for example, between various key points mentioned below.

Initially, the user 212 may be asked to stand in front of the camera and turn around in a complete circle while keeping at least the relevant body portion visible in a field of view of the camera, thereby rotating the body portion while maintaining the body portion visible in the field of view of the camera. It is noted that, in one embodiment, the user may be instructed to maintain the body portion visible in a manner (for example, through a circular rotation) and to the extent necessary for generating an augmented image (or other augmented visuals). Generally, for the estimation techniques of the VCI application 100, it may be preferable for the camera to at least see all of the relevant body portion (or entire body) in some projected form in its field of view for the VCI application 100 to accurately determine exact sartorial measurements. In certain embodiments, instead of capturing a continuous video of the user's rotational motion and processing individual 2D video frames, the user module 104 may capture discrete, still 2D images of different poses of the user—for example, a "T" pose (front, back, sideways, and the like) with hands raised horizontally, a "Y" pose (front, back, sideways, and the like) with hands raised vertically, and so on—for further processing. The screenshot 500 in FIG. 5A illustrates an exemplary display upon initialization of the user module 104 with instructions for the user 212 as to what to do to allow the system to accurately collect user's body measurements before the user can try-on a virtual apparel. In the screenshot 501, the user 212 is shown with the user's entire body in the frame of the UE's camera. However, if the user 212 just wishes to try-on a virtual t-shirt, the user may pose only the torso and arms of the user in front of the camera, as shown in the exemplary illustrations 508, 510 in FIG. 5B. Similarly, if the user 212 is trying on a virtual pair of pants, the user may elect to face the camera showing his/her body portion comprising waist and legs as in the exemplary illustrations 512, 514 in FIG. 5B.

While the user rotates a circle, the UI module 408 may continuously and wirelessly capture 2D video frames of temporal rotational poses of the user's body portion in the camera's field of view to start registering the mappings that may be used—for example, by the measurement server 402—to create the continuity of the user's body shape in a way that the retailer module 102 understands the preference of the user's clothing style in the proper context of a number of attributes such as, for example, the gender of the user, the style of the virtual apparel, the size of the virtual apparel, the material of the virtual apparel, and the texture of the virtual apparel. In some embodiments, the user may not need to rotate a circle—for example, the system may simply ask the user to focus on his/her arm if the sartorial measurements are incorrect. In any event, such wireless capture of user's body measurements and other future inputs (such as gestures, virtual interactions, and the like, as discussed later) by the applicable software module—the UI module 408 or the client application 410 (discussed later—is illustrated by the exemplary arrow 414 in FIG. 4. In one embodiment, the UI module 408 may generate initial body measurements using three basic components—the pose of the user in the camera's field of view, the silhouette or background visual content of the user's image in the camera, and the calculated depth of each limb or other body part (such as torso, or likeness of a body part) of the user in the camera's field of view. The depth may be calculated using stereo mapping techniques or monocular segmentation. It is noted that deep learning methods can provide relative depth (for example, depth of nose versus the rest of the face) and absolute depth from the principal axis of the camera. This can be useful to understand both the body shape and where the device (such as the camera-containing UE) is kept. The initial pose may be determined by generating a pre-determined number of one-dimensional (1D) (for example, length measurements along the x-axis) and/or two-dimensional (2D) (for example, waist measurements, or other measurements along x-axis and y-axis) body measurements based on a pre-determined number of key points established at pre-defined locations throughout the body portion visible in the field of view. In the screenshot 502 in FIG. 5A, a camera icon 504 is shown indicating the progress of measurement of user's body dimensions through key points 506 established throughout the user's front pose in the camera. Various distances between the key points 506 may be wirelessly measured to capture the body measurements of the user 212. In one embodiment, there may be 24 such key points. In another embodiment, 73 key points may be used to generate 28 body measurements. Some exemplary poses (for example, front pose, side pose, tilted pose, and the like) and corresponding body measurements (for example, arm length, neck width, waist size, chest length, right leg in-seam, left calf diameter, and so on) are depicted in the exemplary illustrations 508, 510, 512, and 514 in FIG. 5B. The UI module 408 may send these body measurements to the measurement server 402— via a web socket 412—for further processing to determine appropriate sartorial measurements needed to accurately render a virtual apparel in real-time. Because the user may not remain stationary throughout the virtual try-on, the UI module 408, in particular embodiments, may continuously monitor user's real-time motion/pose and continuously capture and send user's body measurements to the measurement server 402 to enable it to maintain a real-time track of changes or modifications in the user's sartorial measurements for accurate rendering of virtual apparels based on the most-recent user pose. Such ongoing, interactive measurements may be performed in the background—for example, using the earlier-mentioned IR-based LiDAR sensor in the UE 204 (or mathematical Deep Learning Segmentation models—so as not to distract the user during the try-on of a virtual apparel. In some embodiments, the measurement data sent to the server 402 or any other component of the retailer module 102 may not include any personally-identifiable information of the user such as, for example, the actual picture or image of the user, the voice of the user, the name or any other identifying information associated with the user, and so on.

Figure 7A:
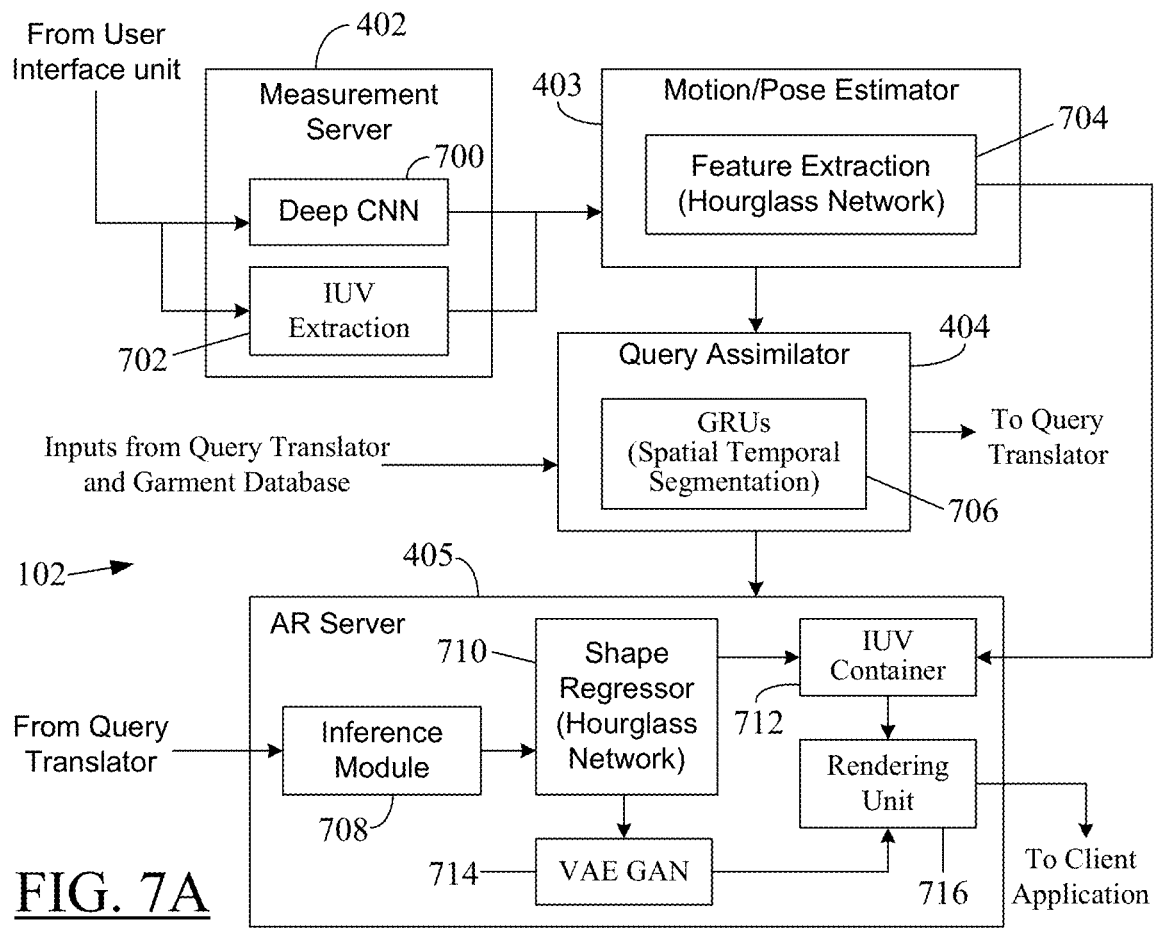
FIG. 7A illustrates an exemplary architecture of various software modules in the retailer module of FIG. 4.

In one embodiment, for every interval of 15-20 video frames, a web socket 412 or an equivalent application may backward correct the registrations of user's initial body mappings (generated by the UI module 408) using a moving average aggregation and try to minimize a regularized error margin for specific values of the user's body—normalized by a depth factor "D" and intrinsic angle correction in a way that the principal axis of the UE's 204 camera (not shown) is projected towards the center of the user's body (waist). When a pre-determined number of initial body measurements are received by the measurement server 402, it may store the measurement data along with relevant metadata in the database 216 for future access by itself or by other components in the retailer module 102—such as, for example, by the motion estimator 403. Additional AI-based architectural details of various components of the retailer module 102 are shown in FIG. 7A and discussed in more detail later. In particular embodiments, the measurement server 402 may use a convex hull based on different key points (such as the key points 506 in FIG. 5A) and initial body measurements (such as the seam, waist, bust, butt, thighs, shoulders, and the like as illustrated in FIG. 5B) to construct 3D body mesh, vertices and joints of the user's 212 body portion being measured. In particular embodiments, the vertices and joints may include anchors and armature, as well as degrees of freedom of the body skeleton. The illustration 516 in FIG. 5C is an instance of a 3D body mesh generated from the user measurements in the illustrations 508, 510 in FIG. 5B, whereas the illustration 518 in FIG. 5C is an instance of a 3D body mesh generated from the user measurements in the illustrations 512, 514 in FIG. 5B. On the other hand, the illustration 520 in FIG. 5C shows an exemplary 3D body mesh for the entire body of a user and the illustration 522 in FIG. 5C shows an exemplary map of joints and vertices corresponding to the 3D mesh 520. It is observed that, in some embodiments, the measurement server 402 also may normalize the movement of the user 212 with depth sensing as well as stereo depth estimation algorithms with a good degree of accuracy to enable the motion/ pose estimator 403 to more precisely estimate the current (and future) shape and pose of the user 212.

Additional technical details of how sartorial measurements are generated by the measurement server 402 (in conjunction with the pose estimator 403) are provided later. However, as a brief outline, it is noted that the server 402 may generate the 3D body mesh from the pre-determined number of body measurements and calculated depth of each body part (such as a limb, torso, and likeness of body parts) to represent the user's body portion as a continuum in 3D. The server 402 also may generate the map of vertices and joints from the 3D body mesh to provide anchors for rendering the virtual apparel in the real-time image. As previously noted, the user 212 may continuously change his/her pose and may move within the camera's field of view. Therefore, the values of the generated body mesh and joints may be correspondingly modified/adapted in real-time (in an iterative manner) to obtain accurate sartorial measurements of the user 212. In other words, real-time deformations in the configurations of the body mesh and map of vertices and joints may affect the sartorial measurements. Furthermore, the sartorial measurements are determined to render a virtual apparel and the rendering of the virtual apparel depends on the most current configuration of the body mesh and map of vertices and joints. Therefore, the temporal state of a virtual apparel rendered based on sartorial measurements for a specific pose of the user may change in view of the temporal motion of the user. Furthermore, the temporal state of a virtual apparel also may depend on a number of attributes like the gender of the user, and the style, size, material, and texture of the apparel. For example, even if a t-shirt is a unisex t-shirt and even though a man and a woman wear a t-shirt of the same size, the unisex t-shirt worn by a man may look different than that worn by a woman because of the gender of the user. As another example, in the real world, if a user raises his hands and brings his shoulders together while wearing a t-shirt, the size, style, material, and texture of the t-shirt may influence the movement/distortion or final configuration of the t-shirt on the user's body. In case of the virtual world, the shrinking of shoulders may deform the user's body mesh and map of joints, thereby also affecting the temporal state of the virtual apparel (here, a virtual t-shirt), which may need to be considered in determining the most recent sartorial measurements for accurately modifying the current rendering of the virtual apparel. Therefore, in particular embodiments, the server 402 may determine—in real-time and, in some embodiments, in conjunction with the pose estimator 403—the sartorial measurements as a function of: (i) the 3D body mesh and the map of vertices and joints as modified (which may include modifications, projections, and the like, of the 3D mesh and/or the map of vertices and joints) by real-time temporal motion of the user captured through the field of view of the camera, and (ii) a temporal state of the virtual apparel in view of the temporal motion of the user and the attributes mentioned above. In certain embodiments, the measurement server 402 may obtain initial data associated with a virtual apparel from the garment-related data stored in the database 216. The server 402 also may store the generated sartorial measurements in the database 216 for access by other modules. The real-time, iterative determination of sartorial measurements may assist the motion/pose estimator 403 and the AR server 405 in accurately rendering a virtual apparel, in real-time—as if the user 212 were wearing the apparel in the real world.

Referring again to FIG. 4, based on the sartorial measurement values received from the measurement server 402, the motion/pose estimator 403 may determine the 3D shape (or model) representing the user 212 (or the user's relevant body portion) and the user's current and future poses to identify/predict user's motion and consequent modification of the user's 3D shape, which may be used by the AR server 405 for accurate rendering of a virtual apparel. The query translator module 409 may initially interpret user's actions—as received through the inputs from the camera module 407, the UI module 408, and/or the client application 410—to generate appropriate commands to enable the AR server 405 to infer the user's intent in the sartorial interaction with a virtual apparel. Additional details of query translation and related data processing are provided later with reference to discussion of FIGS. 7-9. As briefly mentioned earlier and as discussed later in more detail with reference to FIG. 6, the user 212 may optionally operate a controller (such as the apparatus controller 600 in FIG. 6) to interact with the virtual apparel and to convey apparel-specific actions. The outputs of the controller 600 may be wirelessly received by the client application 410—as illustrated by the broken arrow 416—and provided to the query translator 409 for interpretation and further processing. In the embodiment of FIG. 4, the query translator 409 is shown to be in communication with the query assimilator 404 via the web sockets 412 (or an equivalent technology such as socketit.io or signalR) and with the AR server 405 via the REST API 411.

In one embodiment, the query assimilator 404 may operate as an accumulator of pose and joint content for the user 212 in view of multiple variables affecting the real-time interpretation of the user's sartorial interactions. The joint content may include mesh, body shape parameters (muscle, density, and the like), and past frame inputs (for example, last 5 seconds of frames, last 10 seconds of frames, and the like) as well. Based on the inputs from the query translator 409 and garment-related data associated with the virtual apparel under consideration (such as for example, the material of the apparel, the texture of the apparel, the shape of the apparel, the cloth constructors defined for the apparel, and the like), the query assimilator 404 may operate on the contents received from the pose estimator 403 to generate inputs for the AR server 405 to enable the server 405 to accurately infer the intent of the user through the user's sartorial interaction with the virtual apparel. In one embodiment, the query assimilator 404 also may provide these inputs to the query translator 409 in real-time as interactive feedback to further improve future interpretations of user's actions. The AR server 405 may receive the most-recent output of the query translator 409 and reconcile it with inputs from the query assimilator 404 to accurately infer the user's intent for rendering the virtual apparel using the user's 3D shape model generated by the pose estimator 403. The AR datasets generated by the AR server 405 for real-time rendering of the virtual apparel may be sent to the client application 410 utilizing a data connector middle-tier application—such as the REST API 411. The client application 410 may operate on the received AR datasets to display an augmented image/video of the user in real-time on the display screen (not shown) of the UE 204. The augmented image/video may show the virtual apparel fitted on the user's relevant body portion as per the user's sartorial measurements and modified as per the user's sartorial interactions, if any. It is noted that, in certain embodiments, instead of the web API design model of REST, a Simple Object Access Protocol (SOAP) based API may be used to allow communication with the AR server 405 through the Internet 206. Additional architectural and operational details of various software modules shown in FIG. 4 are provided later with reference to FIG. 7.

Below is a brief outline of technical details pertinent to how sartorial measurements may be generated and of distinctive aspects of the deep learning based model that may be deployed for real-time rendering of virtual garments as per particular embodiments of the present disclosure. The deep learning based garment-rendering model may comprise a number of neural network and Machine Learning (ML) based component modules, as discussed later with reference to FIG. 7A. There is a plethora of literature addressing the problem of 3D human pose and shape estimation from 2D camera images or video sequences. In particular embodiments, the term "shape" may refer to the pose-invariant surface of the human body in 3D, whereas the term "pose" may refer to the articulated posture of a human body part (such as limbs, torso, and likeness of body parts). It is well known that free form body measurement is a severely under constrained problem. Variations of Skinned Multi-Person Linear Model (SMPL) for CNN-based deep learning have been proven in the field to take in 2D imagery and reconstruct 3D meshes, vertices and joints. In particular embodiments, the present disclosure utilizes an iteration of SMPL—referred to as SMPL-X—as the base framework to segment and generate 28 body measurements and 73 key points to reconstruct the joints, rigs, and skin texture of the user's body. Additionally, a convex hull may be created to identify the measurement distances (between key points) and temporal motion of the human body as described, for example, in M. Kocabas, N. Athanasiou, and M. Black, "VIBE: Video Inference for Human Body Pose and Shape Estimation," arXiv® document no. 1912.05656, published on Apr. 29, 2020 and available at https://arxiv.org/pdf/1912.05656.pdf (hereafter, the "Vibe reference"), the disclosure of which is incorporated herein by reference in its entirety. Because the primary objective of the present disclosure is texture mapping and not mesh or pose prediction, the present disclosure introduces a new movement parameter ("Mu" or "$\mu$") that represents the adjusted temporal state of the virtual garment in context. The context of the garment may be defined by the item characteristics (of the virtual apparel) the user is searching for. In particular embodiments, the garment context may be given by earlier-mentioned attributes like the gender of the user, and the style, size, material, and texture of the apparel. The new parameter "Mu" may be introduced with a sequential GAN identifier, where a corpus of human movements are already provisioned to a discriminator (such as the deep CNN 700 in the measurement server 402 in FIG. 7A) to enable the discriminator to estimate the user's look in a "T" side pose and a "Y" pose to understand the anchors of the virtual apparel to be rendered, and the shape transitions and added effects such as texture and material wrinkles to be applied in the rendering for an accurate body fit.

In particular embodiments, the parameter "Mu" has a dimensionality of $\mu \in \mathbb{R}^{30}$ for the context of the gesture, intent and past "n" sequences of relevant video frames for the user's gesture. Furthermore, in the present disclosure, the differentiable invoke function, $\mathcal{M}(\theta, \beta) \in \mathbb{R}^{86890 \times 3}$, of the SMPL model in the Vibe reference is modified to include the variable "Mu." Here, "$\theta$" represents pose parameters and "$\beta$" represents shape parameters. The pose parameters include the global body rotation and the relative rotation of joints in axis-angle format. The shape parameters may be gender-neutral or may consider user's gender. Therefore, the SMPL-X model in the present disclosure is a differentiable invoke function, $\mathcal{M}(\theta, \beta, \mu) \in \mathbb{R}^{18600 \times 3}$, that outputs a posed 3D mesh of the user 212 considering the temporal state of the virtual garment. The invoke function of the SMPL-X model is more complex because of an extra hidden layer (for example, in the deep CNN 700 in FIG. 7A) for 3D textured mesh that considers the garment characteristics/context in the SMPL model's 3D mesh of user's pose. The invoke function can be even more complex if additional clothing features or accessories are also modeled. As in case of the Vibe reference, the invoke function of the present disclosure is also differentiable over a discriminator (for example, the deep CNN 700 in FIG. 7A) to allow for a calculation of body profile and measurements of the user 212, thereby yielding the sartorial measurements of the user in real-time. The differentiation is similar to that discussed in the Vibe reference and, hence, is not repeated herein for the sake of brevity. However, certain loss calculations in the Vibe reference may need to be modified as discussed later below.

In contrast to the Vibe reference, the present disclosure uses positional pre-measured context of the user 212 that is stored in the database 216 and that consists of a linear combination of preconceived motion based aspects observed from the same user—such as, for example, various measurements obtained during the initial rotation of the user in circle upon activation of the client application 410 for obtaining body measurements, observations and subsequent interpretations of the user's motion as well as interactions with a virtual garment, and so on. The user interactions monitored in the temporal sequences (in the captured video frames) along with measurement instances across the video frames and user's inputs for positioning of anchors (for example, where a user wears and anchors jeans on the user's torso) may create the realistic effects needed for accurately rendering virtual garments. An example here would be the user's adjustment of shoulder sleeves of a virtual t-shirt that creates an offset for the shoulder anchors and shoulder joints and that leads to a change in the personal body profile of the user. Another example would be the adjustment of a pair of jeans trousers on the waist. Every individual prefers to wear and anchor jeans at different points on their torso. This impacts the choice of the size of garment waist, despite two individuals having the same body waist. Therefore, the sartorial measurements may take such individual preferences and clothing characteristics into account to provide more relevant dimensions to the AR server 405 for accurate and personalized rendering of a virtual piece of clothing. It is noted that, in some embodiments, it may take just 10 seconds of circular motion of the user for the VCI application 100 to understand the user-specific joints and rigs to the complete degrees of freedom to help with clothing animations and physics effects, and also to allow for joints that resist texture gravity and elasticity. Furthermore, in certain embodiments, the VCI application 100 may use stitching techniques for correcting parallax effects to maintain the continuity of the garment portions for seamless rendering.

Below are certain loss calculations for the garment-rendering model of the present disclosure. Initially, it is observed that the total loss function, Lsmpl-x, for the SMPL-X model may be given as follows:

$$L_{SMPL-X} = (\beta - \hat{\beta})^2 + \Sigma_{t=0}^{T}(\theta_t - \hat{\theta}_t)^2 + \Sigma_{i=1}^{K}\Sigma_{t=0}^{T}(\mu_t - \hat{\mu}_t)^2 \quad (1)$$

In the equation (1) above, the parameters "$\beta$", "$\theta$" and "$\mu$" are the same as mentioned earlier with reference to the invoke function $\mathcal{M}(\theta, \beta, \mu)$. The parameters "$\hat{\beta}$", "$\hat{\theta}$", and "$\hat{\mu}$" are single instances of predictions of corresponding parameters "β", "θ" and "μ". However, in the equation (1), the parameter "μ." (or "Mu") also includes coefficient of texture and elasticity for the virtual garment under consideration. Such aspects are defined by attributes "i." Furthermore, in the equation (1) above, the parameter "μ." also includes weights for various textures of a garment. These weights are temporal represented by the attribute "T." Thus, the parameter "μ" contains a context of past timeframe sequences and custom user adjustments when rendering a virtual apparel. In other words, "μ" may be used to focus deeply on motion and configuration based garment interactivity. Furthermore, "T" are temporal frame weights meant for the GRU gating. It is noted that these texture weights may be dependent on the material of the garment such as cotton, leather, and the like. As previously noted, the feature space can be expanded for additional clothing features and/or accessories.

In particular embodiments of the present disclosure, to reduce computational complexity, the motion discriminators for sequence modeling (of human movements) do not retrain every corpus. Instead, those embodiments use an hourglass network such as, for example, the hourglass network 704 shown in FIG. 7A—to decide on the latent differences between the user's motion with a garment and the garment's own behavior. Any adversarial loss may be back-propagated to Gated Recurrent Units (GRUs) (such as, for example, the GRUs 706 in FIG. 7A) and handled by the adversarial loss function as follows. General details about an hourglass network may be obtained, for example, from A. Newell, K. Yang, and J. Deng, "Stacked Hourglass Networks for Human Pose Estimation," arXiv® document no. 1603.06937, published on Jul. 26, 2016 and available at https://arxiv.org/pdf/1603.06937.pdf, the disclosure of which is incorporated herein by reference.

In certain embodiments, the above-mentioned adversarial loss that is back-propagated to the GRUs may be given by the following loss function:

$$L_{adv} = \mathbb{E}(D(J)-1)^2 + \mathbb{E}(\beta - \hat{\beta})^2 \quad (2)$$

In the equation (2) above, the motion discriminator "D" may be a function of objective loss "J" and may indicate whether a generated sequence of human poses corresponds to a realistic sequence or not. Additional details about the objective loss function "J" are given below. The error function is denoted by the letter "$\mathbb{E}$". It is observed that positional loss may add to the complexity of the physical behavior of a virtual garment. For example, if a customer is trying on a virtual skirt, a faster change of position of the customer is bound to increase skirt lift. In that case, in certain embodiments, the parameter "β" may positionally play for position-against-the-gravity aspect for the garment in the context of earlier-mentioned attributes of customer's gender, and garment's size, shape, texture, and material.

The loss function to minimize the errors in estimations of 3D joint points in the user's video frames may be given as:

$$L_{3D(LiDAR+Kinect\ corpus)} = L_{3D}\ \text{hourglass latent vector} + L_{3D}\ \text{IUV texture generator} \quad (3)$$

$L_{3D}$ hourglass vector $= \|Z_{est} - Z_{hourglass\ layer}\|^2$, where "$Z_{est}$" is hourglass network's predicted depth and "$Z_{hourglass\ layer}$" is the data processed using the LiDAR+Kinect corpus as processed through the hourglass network. The LiDAR+Kinect corpus may hold some form of ground truth.

$L_{3D}$ IUV texture generator $= \|Z_{est} - Z_{relative\ depth}\|$, where "$Z_{relative\ depth}$" is the relative difference between body measurement data, projected in 3D plane/pose and the associated ground truth texture as generated from LiDAR/equivalent devices.

In the context of equation (3), a pre-trained corpus of human body's depth and measured co-ordinates from LiDAR and range data through Kinect (or similar technology such as trudepth (infrared) sensors, Time of Flight (ToF) sensors, stereo cameras, and the like) may be used by the ML-based networks as ground truth in the measurement server 402 and in the pose estimator 403 to predict the user's 3D joints and background/silhouette content in the user's video. In the first part of the right-hand side of equation (3), a latent vector (pose and 3D joints) is extracted and regressed. The pose and 3D joints may be contextually generated from the hourglass network as depicted by block 704 in FIG. 7A. This helps in regressing only the differential loss for the base mesh for apparel texture instead of the entire human body each time the model is trained or adapted. In the second part of the right hand side of equation (3), the Inverse Ultraviolet (IUV) extraction unit 702 in FIG. 7A is regularized on the relative depth of the user's body and IUV image from the ground truth. As a result, in an exemplary scenario, the subject (or user) may be able move their hands in the depth dimension (z-axis), and the apparel's texture and fitting may assume relative depth during the rendering and generation phase based on equation (3). It is noted here that the "$L_{3D}$ IUV texture generator" parameter is different from the standard "$L_{iuv}$" parameter mentioned in equation (4) below and also used in SMPL or similar AI literature for entropy and regression loss in mesh generation.

Based on the foregoing, the overall loss function that may be taken into account during training and implementation of the virtual garment rendering methodology as per teachings of the present disclosure may be given as:

$$L_{total} = L_{iuv} + L_{adv} + L_{SMPL-X} + L_{3D(LiDAR+Kinect\ corpus)} + L_{dynamic} \quad (4)$$

In the equation (4) above, the "$L_{SMPL-X}$" is given by equation (1), "$L_{adv}$" is given by equation (2), and "$L_{3D}$" is given by equation (3). As mentioned earlier, the VCI application 100 primarily relates to texture mapping or modeling of cloth behavior with respect to the human user's movements, and not to mesh generation or pose prediction. Thus, although pose and mesh prediction may be implicit in the functionality of the VCI application, 2D mesh or joint map may not need to be generated or accounted for in the loss function. Hence, there is no creation of a 2D mesh or 2D joint map in the present disclosure. Instead, the "$L_{dynamic}$" feature is introduced that dynamically updates the earlier-mentioned measurement position "θ" in a user's pose based on user-adjusted joint coordinates (such as, for example, the user's adjustment of shoulder sleeves of a virtual t-shirt that creates an offset for the shoulder anchors and shoulder joints). Furthermore, the "$L_{inv}$" loss function minimizes the mapping loss when IUV images of virtual garments are mapped onto a user's 3D UV (ultraviolet) body mesh, as discussed later with reference to the IUV extraction unit 702 and the IUV container unit 712 in the embodiment of FIG. 7A.

Referring back to equation (2), it is observed that the objective loss function "J" is a known function in AI-based body mapping, specifically in the domain of SMPL segmentation. The function "J" also may be referred to in the literature as a skeleton joint point function or joint anchorage loss function. In the present disclosure, the function "J" may be represented as $J(\theta, \beta)$, where "θ" refers to pose priors and "β" refers to shape priors. A "shape" prior may introduce prior knowledge of human skeletons and may enforce anthropometric constraints on bone lengths, whereas a "pose" prior may favor plausible poses and rule out impossible ones based on prior knowledge of various human postures. In particular embodiments, in the function "J", $\theta \in \mathbb{R}^{23}$ and $\beta \in \mathbb{R}^{42 \times 3}$. As an example, in case of a person wearing a skirt while in motion, when the person raises her hands for holding her virtual skirt while dancing, the change in the anchors to her original body mesh may change the objective loss function "J" for her. As "θ" increases due to her raising her hands while dancing, her waist may be adjusted to J(θ, β), and the shape of the virtual skirt may be recalibrated—for example, by the AR server 405 in view of the modified sartorial measurements from the measurement server 402—in order to map to the newly positioned joints. As another example, if a person wearing a jacket raises his arms, then J(θ, β) may generate a reverse map with shoulders adjusted, thereby providing the end user an experience of the jacket bulging out. In the virtual garment-rendering model as per teachings of the present disclosure, an end user is effectively allowed to regress "J" using the query translator module 409, which also operates to translate the user's gestures, voice, or facial expressions into corresponding machine-executable queries to predict the user's intent in the apparel-specific action, as discussed later in more detail with the examples in FIGS. 8-9. Such regressing may reduce the subspace that is tractable, thereby reducing computational complexity enabling real-time operations. In other words, the present disclosure provides a totally self-supervised system where the end user can self-train many aspects of virtual try-ons such as, for example, waist adjustment, skirt behavior (for example, when they are dancing with wide skirts), and so on, merely by using simple gestures. Conventional literature suggests that prior knowledge is necessary for such shape and pose prior formulation. However, in the garment-rendering methodology of the present disclosure, various AI-based component modules/networks train and memorize temporal changes iteratively—for example, video frame by video frame. This may allow J(θ, β) to be regularized by its past few timestamps and by the ground truth provided by human subjects with their hand gestures (which operate as pose priors).

It is noted that additional architectural details of the retailer module 102 are shown in FIG. 7A, which is discussed later along with an exemplary process flow among various modules of the VCI application 100 shown in FIG. 7B. Furthermore, various examples of query translation and virtual apparel rendering are shown in FIGS. 8-9 and discussed later. However, as mentioned earlier, the user 212 may optionally operate a controller (such as the apparatus controller 600 in FIG. 6) to interact with the virtual apparel and to convey apparel-specific actions. The outputs of the controller 600 may be wirelessly received by the client application 410—as illustrated by the broken arrow 416 in FIG. 4—and provided to the query translator 409 for interpretation and further processing. Therefore, operational details of the controller 600 are provided below before continuing with discussion of FIGS. 7-9.

Figures 6A, 6B:
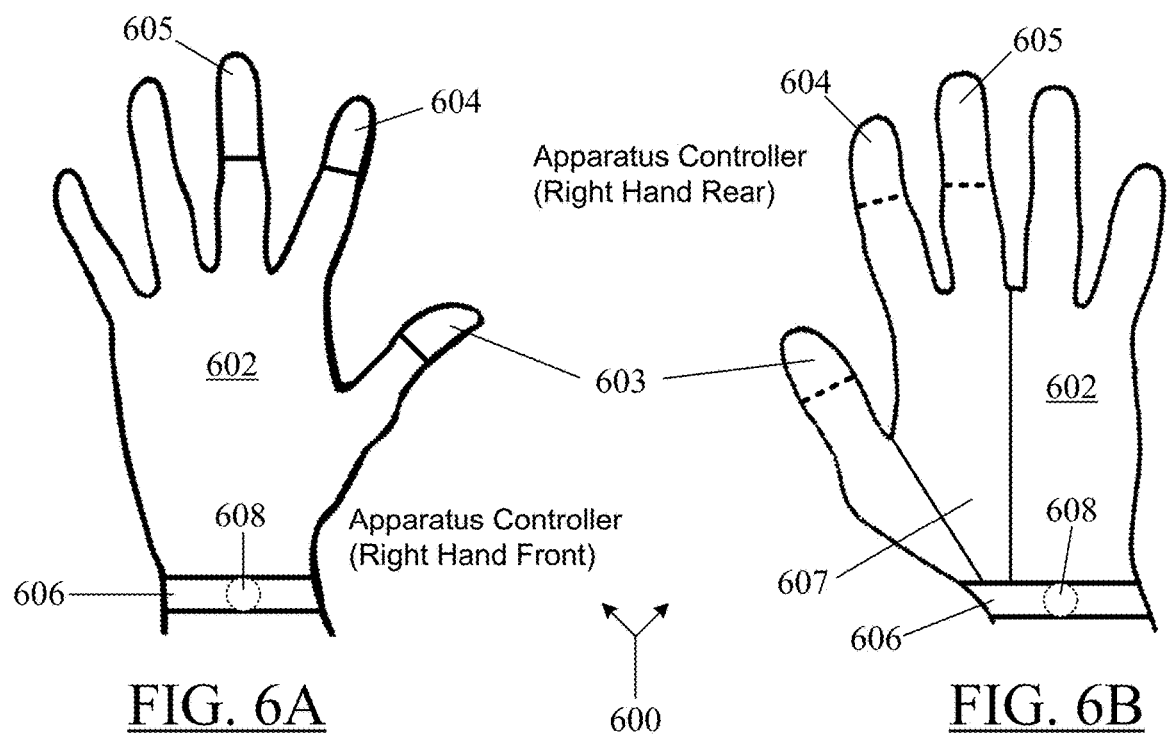
FIGS. 6A-6C depict a wearable apparatus controller and its architectural details as per particular embodiments of the present disclosure.
Figure 6C:
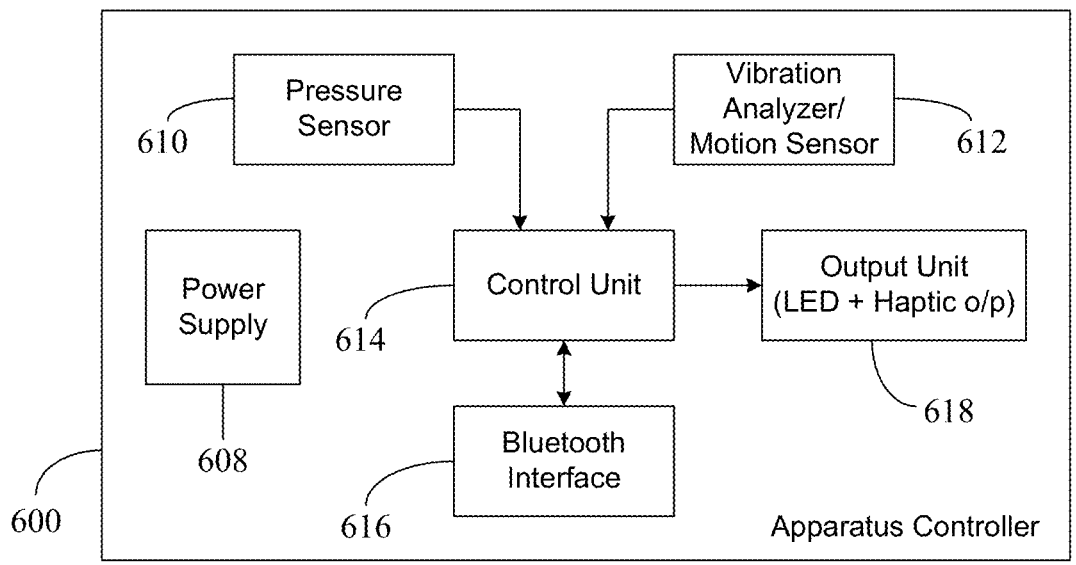

FIGS. 6A-6C depict a wearable apparatus controller 600 and its architectural details as per particular embodiments of the present disclosure. In FIG. 6A, the front side of the right hand 602 of a human user—such as, for example, the user 212 in FIG. 2—is shown with the controller portions 603-605 worn over fingertips of the thumb, the index finger, and the middle finger, respectively. The worn portions 603-605 may be held in place through a wrist band 606 that may operate as an enclosure which contains various hardware components of the controller 600 such as, for example, a power source 608 (for example, a rechargeable or replaceable battery) and one or more of the other components shown in FIG. 6C. In FIG. 6B, the back side of the right hand 602 is shown with the controller portions 603-605 being part of a wearable covering 607 (such as, for example, a strap or a belt like layer) that seamlessly extends to the wrist band 606. The covering 607 and the wrist band 606 both may be made of cloth, soft plastic, rubber, leather, or any other pliable material that can be worn over hands. In some embodiments, the controller 600 may have different configurations such as, for example, it may be worn over other fingers, over the entire hand (left or right or both), or over different portion(s) of a hand. Regardless of how the controller 600 is designed and worn (on one hand or both), the controller 600 may be operable to facilitate a user's sartorial interactions with a virtual garment as discussed below. The controller 600 may allow the user 212 to change the default look of the virtual garment to something complex and user-specific. As mentioned earlier, in certain embodiments, the controller 600 may be optional (or may be replaced with interactive controllers such as oculus controllers if the user has AR glasses), in which case, various portions of the virtual garment may be made interactive by highlighting those portions on the display screen of the user's mobile device (for example, the UE 204) and allowing the user to "select" the desired portion(s) with user's fingers or gestures to accomplish the needed clothing adjustments. In some embodiments, on-screen instructions also may be provided to assist the user with the desired manipulation of the rendering of the virtual clothing.

FIG. 6C shows several discrete components that may be assembled into the enclosure 606 or elsewhere within the wearable portions of the controller 600 to build the apparatus controller 600. As shown, in addition to the power supply unit 608, the controller 600 also may include a pressure sensor 610, a vibration analyzer/motion sensor 612, a control unit 614, a Bluetooth® interface 616, and an output unit 618. In one embodiment, the pressure sensor 610 may include a number of touch-sensitive pads embedded in the fingertip portions 603-605 to sense the pressure exerted by the user's controller-wearing fingers—such as, for example, when the user wishes to unbutton a virtual shirt or fold/unfold a collar and/or cuffs of the shirt—and may provide the sensed values to the control unit 614, which may signal the cut-off pressure points for positive action and trigger the Bluetooth® interface 616 to transmit the user's interaction to the client application 410 (FIG. 4) as a Bluetooth® signal over the link 214 (FIG. 2). As discussed later with reference to the examples in FIGS. 8-9, such interactions may be initially interpreted by the query translator 409 module (FIG. 4) for further processing by the retailer module 102. The vibration analyzer 612 may sense a vibration of the controller-wearing hand of the user during sartorial interaction. In one embodiment, the vibration analyzer/motion sensor 612 may include a Passive Infrared (PIR) motion sensor to detect change of shape, such as, for example, rotation or motion of user's hands during a sartorial interaction, or enlarging/shrinking of hands (for example, when the user spreads arms as in case of stretching an apparel or brings hands together as in case of an unbuttoning action). The PIR sensor also may detect relative depth of two hands when in motion. This measurement may help handle the problem of occlusion of one hand behind the other or behind the user's body such as, for example, in the areas where a hand should be either in front or back of the virtual garment. The motion sensor unit 612 may be embedded in the fingertip portions 603-605, in the back covering 607, or within the wrist band 606. In certain embodiments, the control unit 614 may be a single-board computer or a modular controller such as a Raspberry Pi™ or Arduino™ unit. The control unit 614 may reside within the wrist band 606. In one embodiment, the power supply unit 608 includes Arduino™ battery sets. The output unit 618 may comprise one or more Light Emitting Diodes (LEDs) to provide visual feedback or confirmation to the user that the user-initiated interaction with a virtual garment has been successfully received and/or processed by the VCI application 100. In certain embodiments, the output unit 618 also may provide haptic feedback to the user. In other embodiments, only one of the feedbacks—visual or haptic—may be provided depending on the design of the apparatus controller 600. The output unit 618 may be embedded within the back covering 607, within the wrist band 606, or elsewhere throughout the external surface of the controller 600. Although not shown in FIGS. 6A-6C, in some embodiments, the apparatus controller 600 may include an on/off button—for example, on the wrist portion 606 to allow the user to activate/de-activate the controller 600 as desired.

The apparatus controller 600 may return measurements of pressure, rotation, motion, and relative depth to the client application 410 in the frontend module 104 as illustrated by the broken arrow 416 in FIG. 4. The client application 410 may pass on the signals received from the controller 600 as user's queries to the query translator 409, which, in turn, may interpret the user's actions/queries (as discussed in more detail later with reference to the examples in FIGS. 8-9) and submit its outputs as translated queries to the AR server 405 (for example, via REST API 411) for further processing to generate AR datasets for suitable rendering of the virtual apparel. In some embodiments, the sartorial or other body measurements determined by the measurement server 402 may be sent to the apparatus controller 600 in real time—for example, using the REST API 411 and the client application 410—to enable the controller 600 to provide more accurate positional information of user's real-time sartorial interactions.

It is noted that the apparatus controller 600 also may be used to interact with virtual pants or trousers or other garments that are worn only from waist below. For example, in one embodiment, a user may adjust the waist of a virtual pair of pants with the apparatus controller (worn on both hands of the user) in the following manner: (i) The apparatus controller 600 may await a fist classification from the measurement server 402 based on the user's bringing of hands towards waist and in the posture of adjusting the waist. The measurement server 402 may indicate recognition of the user's controller-bearing fists to the client application 410 for transmission to the apparatus controller 600. (ii) The apparatus controller 600 may confirm that the classification is in the spatial radius of the waist area of the pants. (iii) The presence of the controller-wearing hands in the waist area may highlight the waist on the display screen of the user's mobile device and may indicate to the user that the pant anchors are to be adjusted with the two hands. (iv) Once the user interacts with the virtual waist using the controller-wearing hands, the shape of the pants is restructured by the AR server 405 based on the hands' motion/vibration data received from the controller 600.

Figure 7B:
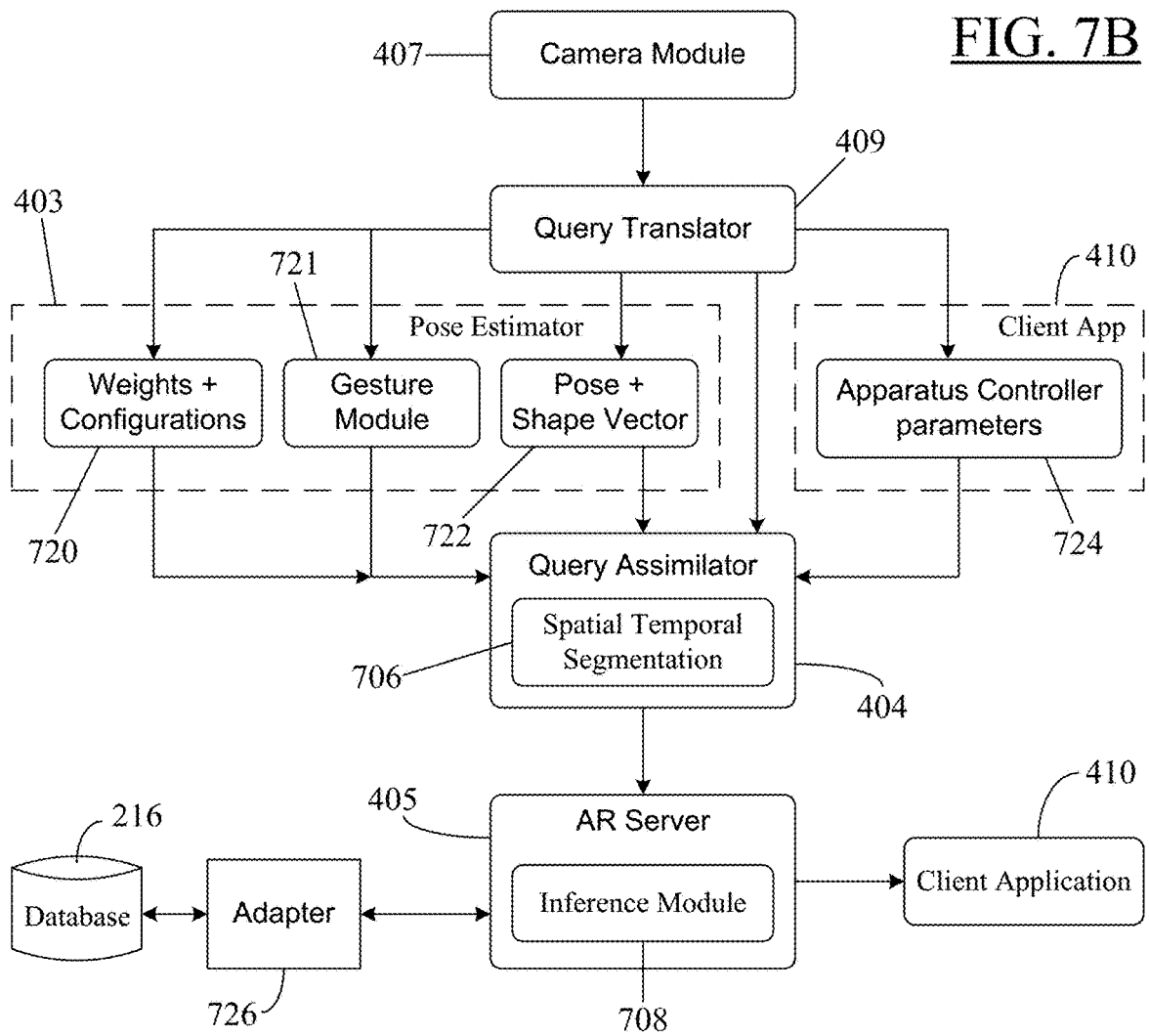
FIG. 7B illustrates an exemplary interaction among various software modules of the VCI application as per certain embodiments of the present disclosure.

FIG. 7A illustrates an exemplary architecture of various software modules in the retailer module 102 of FIG. 4, and FIG. 7B illustrates an exemplary interaction among various software modules of the VCI application 100 as per certain embodiments of the present disclosure. FIG. 7A is a high level illustration of the deep learning architecture of the retailer module 102. It is noted that the interconnections among various modules/units shown in FIG. 7A is exemplary only. In other embodiments, additional or different modules may be deployed and trained, and they may be operatively coupled in a manner different from that illustrated in the embodiment of FIG. 7A. Like any other well-known body mesh generating system, in the retailer module 102, a 3D generative model for learning parameters is fitted on established corpus and discriminative models are trained for regressing the pose and shape of the human body in order to predict the 3D body mesh as well as clothing/apparel mesh. As shown in FIG. 7A, the measurement server 402 may include a deep CNN 700 and an IUV extraction unit 702. At run-time both units may receive measurement data from the user interface unit 408 in the user module 104 (FIG. 4). The motion/pose estimator 403 may include a feature extraction unit 704 comprising an hourglass network. As mentioned before, in some embodiments, the measurement server 402 and the motion/pose estimator 704 may interactively operate to generate sartorial measurements of a user at run-time. In particular embodiments, the deep CNN 700 and the hourglass network 704 may be pre-trained components. They may be trained using the known 3D modeling datasets—Inria, Human3.6M, and UP-3D datasets. Additionally, in some embodiments, the training may include the corpus of Apple's bionic 14. LiDAR-generated depth and dispersion maps to train discriminative models of three-dimensional rotations that reinforces the weights for joint rotations and parallax movements for the pre-trained corpus and trains a temporal network (for example, the deep CNN 700 and/or the hourglass network 704) for intended shapes and deformations. In one embodiment, the deep CNN 700 may use Rectified Linear Unit (ReLU) as an activation function. Alternatively, "tan h" also may be used as an activation function. The hourglass network 704 may minimize the estimation errors in the current data from the measurement server 402. As a result, in particular embodiments, an accuracy of 98.2% may be obtained for body poses. In testing the discriminative models (in the measurement server 402 and the pose estimator 403) on 112 real-human subjects, the cross-validated adjusted measures were observed to be 97.3% accurate.

Once the above-mentioned pre-trained discriminative model in the measurement server 402 and pose estimator 403 is generated, its inferred depth may be utilized—for example, at run-time and also during training of other modules—to generate UV maps (or UV body mesh) of human body objects using, for example, the IUV extraction unit 702. For example, in one embodiment, over 550 unique sequences of videos of different users were obtained using Apple iOS™ 12+ devices (iPhones and iPads). These videos were used to train the IUV extraction unit 702 for generating true depth and disparity—using a semi-supervised mechanism for joint and UV map generation. The IUV extraction unit 702 may take a monocular image as an input for predicting a corresponding IUV image. In one embodiment, during the supervised training, the IUV extraction unit 702 also may receive corresponding LiDAR measurements and generate intermediate IUV images of human subjects before creating respective UV maps. The discriminative model may be used later—at run-time and during training of other modules—to infer relative body shape meshes, vertices, and joint rotations of human subjects. It is noted that the discriminator and other models in the retailer module 102 may be run across any cross-platform device with a simple monocular camera—such as, for example, a Windows Mobile™ device, an Android™ device, an Apple iOS™ device, and the like—to implement garment applications that gauge depth and process texture wraps of various clothing.

In particular embodiments, a differential loss function "L(k,Q)"—where "k" is the video frame sequence and "Q" is the difference between current and past UV map resolutions for the frame sequence—may be regularized within an error margin to optimize for transitions in motion as a person rotates. Such regularization may allow to indicate that the motion is continuous and can be panoramically mapped towards a complete generation of UV body mesh. The query assimilator module 404 may use GRUs 706 for spatial and temporal segmentation to perform noise reduction in the user's UV body mesh. The GRUs may be used as Fully Connected (FC) localizers with standard gating on update vectors as well activations mapped to the trigger function of the intent as described later. This will help restore and estimate the temporal network of user's body mesh. In one embodiment, the GRUs 706 may be Convolutional GRUs (CGRUs) having 3 hidden layers and 2 pooling layers with T=10 as sequence length. In one embodiment, the pooling may be performed for 5 seconds, which can result in the sequence of length of 100 video frames at 20 frames per second (fps). The size of each hidden layer may be 512 neurons for real-time rendering (or the size of [256 neurons, 512 neurons, 256 neurons] for three hidden layers, respectively, may also work for lightweight models). Additional discussion of a CGRU may be obtained from https://paperswithcode.com/method/cgru. In one embodiment, the GRUs 706 may be implemented as a classic neural networksuch as, for example, a Residual Network (ResNet—over 1080p (or 2080p) Nvidia® Graphics Processing Units (GPUs).

In particular embodiments, the query assimilator module may receive inputs from the query translator 409, pose estimator 403, and the database 216 (FIG. 2). In one embodiment, the inputs from the database 216 include garment-related data associated with a virtual apparel under consideration (such as for example, the material of the apparel, the texture of the apparel, the shape of the apparel, the cloth constructors defined for the apparel, and the like) as well as measurement data stored by the measurement server 402 in the database 216. Furthermore, the inputs from the query translator 409 may include inputs from the user interface 408 and inputs from the apparatus controller 600 (sent by the client application 410). The query assimilator 404 may operate as an accumulator of pose and joint content for the user 212 in view of multiple variables affecting the real-time interpretation of the user's sartorial interactions. The query assimilator 404 may include the direction of the movement, pose, interface classes, and gesture classification to predict the instructions for the AR server 405 to enable the server 405 to accurately infer the intent of the user through the user's sartorial interaction with a virtual apparel. In one embodiment, the query assimilator 404 also may provide these predictions to the query translator 409 in real-time as interactive feedback to further improve future interpretations of user's actions. Generally, the query assimilator 404 and the query translator 409 may collectively operate to segment the action, motion, intent, and similar other concepts of interactivity and motion that are very specific to a virtual apparel. The query assimilator 404 may also operate as an expression builder that constructs node-based inputs to the GRU units 706.

As shown in FIG. 7A, the AR server 405 may include an ML-based inference module 708, a shape regressor 710, a Variational Auto Encoder (VAE) GAN 714, an IUV container unit 712, and a rendering unit 716. In one embodiment, the inference module 708 may include a dense CNN with an extra hidden layer of complexity of filtering the sartorial action and user's intent. The dense CNN may start with 1024×512 layered autoencoder, which trims down to 256×256 and back. This may give maximal accuracy for predicting garment position eventually. In one embodiment, the autoencoder in the inference module 708 may be a Joint VAE (JVAE) that rigs the 3D UV body mesh at common joints such as arms, legs, torso, shoulders, waist, and curvatures including bust, waist and inseams, and returns the cloth mesh and joint anchors. The cloth material (which may be defined by colors and fabric) may be inverse UV mapped onto the mesh and reconstructed using a Recurrent CNN (RCNN) with a standard Softmax function. More specifically, the measurement co-ordinates from the garment database (which may be a part of the database 216 a noted before) may be mapped onto the user's UV body mesh generated by the measurement server 402. Thereafter, the applicable garment is considered in context (for example, gender, size, style, texture, and material—as provided by the retailer's images for the front and the back of the garment. As mentioned before, in particular embodiments, such garment-related content (and other retailer-provided data) may be stored in the garment database within the database 216. The shape regressor 710 may transfer the garment's context (in the form of UV images of the garment) to the IUV container 712, which may create an IUV structure for the garment that can be mapped onto the person's UV body mesh. However, when the IUV maps for garments are inverted to the human mesh, the result may be extremely noisy and disparate, and, hence, non-utilizable for retail applications. To ameliorate this problem, in particular embodiments, the parameters collected from the query translator 409 and query assimilator 404 are fed into the hourglass network of the shape regressor 710. These parameters take into account the real-time user interactions with a virtual garment. The hourglass network may map the location and temporal sequences of human shape and pose to generate three key regressors: (i) the virtual apparel's cloth position in 3D co-ordinates (x,y,z); (ii) the texture and the material of the virtual apparel—for example, a drape shows a hanging effect on a dress and a folding effect on a t-shirt; and (iii) the style (or shape) and size of the virtual apparel for which the convex hull parameters may be estimated to the radius and recalibrated (by the shape regressor 710 and VAE GAN 714) along localized joints of the human body. For example, as discussed earlier with reference to the discussion of the objective loss function "J," when a person raises her hands for holding her virtual skirt while dancing, the change in the anchors to her original body mesh may change the objective loss function "J" for her. As "θ" increases due to her raising her hands while dancing, her waist may be adjusted to $J(\theta, \beta)$, and the shape of the virtual skirt may be recalibrated to map to the newly positioned joints. As another example, if a person wearing a jacket raises his arms, then $J(\theta, \beta)$ may generate a reverse map with shoulders adjusted, thereby providing the end user an experience of the jacket bulging out.

Thus, in the retailer module 102, the IUV images of a virtual apparel may be modified by recalibrating at least one of the following in each IUV image: the 3D Cartesian coordinates of the position of cloth or cloth segment (in the virtual apparel), the style of the virtual apparel, and the size of the virtual apparel. The recalibration may be based on the apparel-specific action predicted (by the query translator and/or the query assimilator) in response to the user's sartorial interaction and based on the cloth texture and material information associated with the virtual apparel. Thereafter, the modified IUV images of the apparel may be mapped onto the UV body mesh of the user to provide the augmented image (in the form of AR datasets from the AR server 405) with the virtual apparel modified therein as per the user's apparel-specific action. Similarly, when a set of cloth constructors (discussed later) are provided by a retailer for a virtual apparel, the generated IUV images of the virtual apparel may represent the virtual apparel as being composed of such cloth constructors. Each cloth constructor—such as a collar, a button, a cuff, a sleeve, and the like—has a pre-defined shape, size, and position within a virtual apparel (for example, a shirt, a t-shirt, a jacket, and so on). As part of garment-related data, the retailer also may provide a corresponding set of rules for the set of cloth constructors. Each rule may define a limitation on the freedom of motion of the corresponding cloth constructor—for example, the right arm sleeve in a virtual shirt can rotate along the y-axis (or the vertical axis) towards the front of the user's body, but its degree of freedom along the z-axis may be between 90 degrees and 270 degrees. Thus, the modified IUV images may be generated by recalibrating at least one of the pre-defined shape, size, and position of each cloth constructor in each corresponding IUV image within the limitation on freedom of motion and/or the observability of the corresponding cloth constructor. The aspect of observability of a cloth constructor relates to whether or not the cloth constructor should be occluded.

It is noted that the hourglass network in the shape regressor 710 may deploy a deterministic, query-based autoencoder, which may be configurable or driven by user's actions/queries. Similarly, the discriminator functionality of the measurement server 402 also may be more deterministic. Furthermore, in some embodiments, the GAN 714 may use one or more RCNNs in both generative and discriminative networks. As previously noted, cloth material may be inverse UV mapped onto the user's UV body mesh and reconstructed with a standard Softmax function using an RCNN in the GAN 714 and the hourglass network in the shape regressor 710. In particular embodiments, the combination of the shape regressor 710 and the GAN 714 may modify the effect of how an item of clothing will look on the user based on the outputs from the query translator 409 and/or query assimilator 404. On the other hand, as discussed earlier, the IUV container unit 712 may operate to fit the selected item of clothing to the user's current pose. The rendering unit 716 may operate on the inputs from the units 712, 714 to generate the AR datasets to be sent to the client application module 410, which may contain a 3D/physics visualization engine for accurate, real-time rendering of the virtual apparel on the corresponding body portion of the user. The rendering may be displayed on the display screen of the UE 204 through the UI module 408.

As discussed in more detail below, the training mechanism behind the discriminative networks may deploy a computer based model for training data. The model may: (i) use a Deep Learning model of hourglass network's intermediary layer and IUV meshes; (ii) utilize differential updates from depth and stereo camera systems or likeness; (iii) use the training data in query assimilator and query translator and sequence it in the form of an inference selection for garment re-generation; (iv) re-project pose agnostic variation of the data using sartorial interaction/measurements previously collected; (v) perform differential analysis of a loss latent vector across relative and absolute depths using monocular imagery (which may be optional); and (vi) also perform real-time re-adjustment and anchor re-projection of the semi-supervised training mechanism.

Referring now to FIG. 7B, an exemplary interaction among various software modules of the VCI application 100 as per certain embodiments of the present disclosure is shown. Primarily, the illustration in FIG. 7B relates to the backend composition that lies in the measurement server 402 and the AR server 405, powering visualizations. Initially, the camera module 407 may detect the image of a human body (for example, when the user 212 poses in front of the UE's 204 camera) and may send the initial image data to the query translator 409 to interpret user gesture or other action, if any. Some examples of the intent analysis using query translator 409 and query assimilator 404 are discussed later below, and with reference to discussion of FIGS. 8-9. The initial body measurements may be sent to the measurement server 402 and the pose estimator 403 for generating a 3D spatial construct containing sartorial measurements that may be further processed by the AR server 405 for rendering a virtual apparel. In particular embodiments, the 3D spatial construct may be a combination of body vertex co-ordinates, and a dictionary of the inverse tree mappings that connects the joints (in a human body) and its associated convex hull that forms the 3D body mesh of the user which also contains 3D rotations of the user along the three axes (x,y,z). The query translator 409 outputs also may be received in the pose estimator 403 (for example, through the interaction with the measurement server 402), the client application 410, and the query assimilator 404. In one embodiment, the feature extraction unit 704 in the pose estimator 403 may include a weights and configurations module 720 to determine weights to be assigned to a body pose, a gesture module 721 to identify the user's current gesture/pose, and a pose and shape vector generation module 722 to estimate the user's current and future poses. The measurement data from the measurement server 402 may be processed in the feature extraction unit 704 in view of the query translator's commands, and outputs sent to the query assimilator 404. Similarly, the client application 410 may combine the user inputs received from the apparatus controller 600 (as indicated by the block 724 in FIG. 7B titled "apparatus controller parameters") and corresponding commands from the query translator 409 and send its outputs to the query assimilator 404 as well. The user's "intent" behind a sartorial interaction may be first generated and predicted in the GRU modules 706 and the forecast may be transferred to the inference module 708 in the AR server 405 directly or via web sockets (or equivalent) 412 through query translator 409 and REST API 411.

Based on the contents of the input query, the AR server 405 may communicate with an adapter 726 to form a constructed input sequence, which helps detect the respective parameters for the inference module 708. This aspect may invoke the necessary actions behind the real-time garment implementation/rendition. It is noted that, in some embodiments, the adapter 726 may be a part of the AR server 405 itself. In other embodiments, the adapter 726 may be a part of the database 216, or the host system 202, or may be a hardware and/or software entity external to the host system 202 and implemented in conjunction with the VCI application 100 through a cloud network. As an example, where the garment is a virtual t-shirt, the output of the AR server 405 displayed to the user may need to be just in time rigged and flowing along the arms and circularly around the user's torso. In that case, the respective clothing type-specific inference model (discussed below and also later with reference to FIGS. 8-9) selected from a corpus may be a "collared t-shirt". The inputs to the adapter 726 would be the pre-selected garment (here, the virtual t-shirt) from the garment-related data in the database 216, the user actions on former video frames, and the above-mentioned 3D spatial constructs for the user's body (which may have been stored as part of the measurement data in the database 216). The adapter 726 may provide necessary conversions for reshaping of the t-shirt. In particular embodiments, these conversions may be stored in the database 216 itself or within the adapter 726 in a standard JavaScript Object Notation (JSON) or an Extensible Markup Language (XML) file format and passed on to the inference module 708 for further synthesis. The inferred content may be sent as AR datasets to a 3D visualization engine in the client application 410 for rendition of the virtual apparel on the display screen of the UE 204. It is noted here that the user interface module 408 may process multiple types of signals in conjunction with the query translator 409 to generate inputs for the inference module 708 as to which operation needs to be conducted. For example, these inputs may include values representing signals from the mobile device's visual interface (or display screen); recognition of user's gesture(s), voice, or facial expression(s); the sensed pressure and vibration in the data from the apparatus controller 600; recognition of the user's emotion through his/her gestures, voice, or facial expressions; and the like. Additional discussion of a few operators for the UI module 408 and the query translator module 409 is provided later with reference to FIGS. 8-9.

As noted above, in some embodiments, there may be a corpus of pre-defined, clothing type-specific inference models stored, for example, in a memory (not shown) of the host system 202 (FIG. 2), within the AR server 405, in the database 216, within the adapter 726, or at a location external to the host system 202 (such as, for example, a cloud storage like Microsoft's® Azure Blobs (Binary large objects)). The host/retailer system 202 may receive such inference models from a third-party provider of the VCI application 100 or may access an external location to retrieve the needed models based on the types of clothing offered for virtual try-ons. The inference engine running the inference module 708 may be a corpus of different such clothing models, with pre-known behavior. Each inference model may define the behavior of a clothing when worn on a human body and having a corresponding clothing type (such as, for example, a collared t-shirt, a full-zip hoodie, an embroidered fleece top, a sleeveless quilted vest, a long-sleeve flannel shirt, and so on) specific to the inference model. The inference module 708 may determine the clothing type of the virtual apparel and select a clothing type-specific inference model associated with the apparel's clothing type. In certain embodiments, the relevant inference model may be invoked by the inference module 708 upon a request from the query assimilator 404 (or query translator 409) and an input from the adapter 726. Thus, in response to the user's apparel-specific action, the AR server 405 may provide an AR dataset to generate an augmented image in which the virtual apparel is modified as per the clothing type-specific inference model selected for the apparel. For example, a dress always behaves in a particular way and has defined characteristics, which should trigger the inference module 708 to invoke the inference model specific to the dress's behavior. The pose and shape of the user's body may remain the same, but the discriminator for texture generation may require re-training for every new behavior of a clothing or type of clothing. These inference models may be dynamic in nature.

FIGS. 8-9 provide examples of details of necessary operations for consumers and retailers to define and interact with a virtual apparel or clothing in a desired fashion. In certain embodiments, apart from garment and texture reconstruction, the inference module 708 also may capture state and design rules that are viable and non-viable. The term "viability" may refer to something that an apparel can do. For example, a right arm sleeve can rotate towards the front of the body along the y-axis (vertical axis) but has a limit to degrees of freedom beyond 90 degrees to 270 degrees. Viability may be defined for the apparel microstructures as well. For example, a full shirt sleeve can be rolled up to the elbow length but not beyond that. In particular embodiments, a pre-defined set of such design rules may be stored within the adapter 726. However, there may be customizable rules as well that the cloth manufacturer (or retailer of the apparel/clothing) can enforce visually (such as, for example, in an image rendered on a display screen of a mobile device). For example, in the above example of a full shirt sleeve, if a manufacturer (or retailer) wanted to limit the folding, the manufacturer/retailer can define the constraints (on the sleeve's movement) from point A to B, and the query assimilator 404 may record transactions with these constraints during its training. At run time, the training parameters may change the inference model for that garment class to allow for temporal folding's for that clothing (for that manufacturing instance or batch of clothing) within the specified constraints. The manufacturer may remove/modify the constraints as well, if so desired, or may define completely different constraints for the same item.

Below are three examples of a user's apparel-specific actions and corresponding state sequences (in the VCI application 100) that implement the user-intended actions in particular embodiments of the present disclosure.

Example State Sequence 1: Opening a Button or a Zipper (i) Initially, the VCI application 100 may determine whether the user is wearing a virtual t-shirt or a virtual shirt with buttons/zipper. If the answer is "yes" to either of these possibilities, the state sequence may proceed to the next state. However, if the answer is "no" to both options, then the VCI application 100 may estimate the closest rule from the list of provided rules based on gesture. For example, a gesture based rule may be given as follows: The buttons stitch together the shirt co-ordinates and morph them into one. Two buttons within radial proximity of 0.5 inches merge into one button. Hand gestures of index finger, (optional) middle finger, and thumb joint together classify positive as a button trigger—i.e., such gestures can move the button, constrained to the degree of garment's freedom of movement (discussed before).

(ii) Thereafter, the VCI application 100 may determine whether the hand gesture is in proximity to one of the intended buttons. If yes, then the client application module 410 may be triggered to provide the capability to the apparatus—controller 600 (if present) to sense human intent. Otherwise, the execution state may move to the closest possible intent. An example of the closest possible intent in this case would be to button up or unbutton the t-shirt. In that case, the inference module 708 may be triggered to prepare the next two (virtual) buttons in sequence to be configurable by the user's hand (which may or may not be wearing the apparatus controller 600). By default, in particular embodiments, the buttons may not be made configurable for the reasons of noisy inputs and reliability. However, the proximity of the hand to the first button may be the trigger point that makes the buttons user-configurable.

(iii) Next, the inference module 708 may analyze the user intent by determining if the user's gesture showcases a fingertip palm. In particular embodiments, an intent may be first generated and predicted in the GRU modules 706, where the gating may predict the continuity of the buttoning/unbuttoning process. This forecast may be then transferred from the query assimilator 404 to the inference module 708. Once the determination threshold for the received forecast is positive in the inference module 708, the inference module 708 may inform the IUV map exchange unit (in the IUV container 712) or another module in the AR server 405 that performs updates to the garment shape to create an updated texture for the virtual t-shirt/shirt with the button(s) modified as per user-intended action.

(iv) The AR server 405 may use the client application 410 to communicate with the apparatus controller 600 to provide feedback (for example, a haptic feedback) to the user's button/zip opening gesture. The client application 410 may instruct the apparatus controller 600 to hold a pressure and provide vibrations to the user sa positive feedback that the t-shirt button/zip will be opened.

Example State Sequence 2: Fold/Unfold a Collar and/or Cuffs (i) Initially, the VCI application 100 may determine if the user is wearing a virtual apparel with a mapped collar/cuff. In particular embodiments, a left collar/cuff may be considered "mapped" if the user moves it counterclockwise, and a right collar/cuff may be considered "mapped" if the user moves it clockwise. If the determination is "yes", the AR server 405 may start unfolding the collar/cuff on the display screen of the user's mobile device.

(ii) Next, as part of analyzing the user's intent, the inference module 708 may determine if the outputs from the gesture module 721 (FIG. 7B) showcase a folding intent. If the answer is "yes", the AR server 405 may proceed to the apparatus controller 600, if necessary.

(iii) Through the client application 410, the AR server 405 may instruct the apparatus controller 600 to use its pressure and vibration sensors through its output unit 618 to provide haptic feedback to the user that the collar/cuff is folding/unfolding.

Example State Sequence 3: Change the Apparel and Try Different Ones in Real-Time (i) Initially, the VCI application 100 may determine if the user is wearing any system generated or "approved" garments. This determination may confirm to the VCI application 100 that the virtual garment in question is supported by the VCI application 100 and for which virtual try-on as per teachings of the present disclosure is available. If the answer to this initial determination is "yes", the VCI application 100 may keep scanning for user's actions and assertions.

(ii) In some embodiments, if the VCI application 100 notices that the user's hand is raised and gesture aligned, it may prepare next set of recommended dresses for the user. In other words, the use raising a hand in preparation of a pre-defined gesture (for example, snapping of fingers, as noted below) may be interpreted as the user intending to change the current apparel to a different one.

(iii) If the user's body is completely visible to the camera, the VCI application 100 may prepare all of the anchors for the new dress.

(iv) Once the user's fingers are snapped, the VCI application 100 may render the new dress. If the user wishes to change the dress/garment again, the user may continue this process of raising a hand and snapping the fingers. In certain embodiments, the allowable gestures and corresponding actions may be displayed on the display screen of the user's mobile device. In other embodiments, the portions of the virtual clothing that may be manipulated/modified can be highlighted for user's selection. The selected portion(s) may be modified in the display for user to review. Additional examples of clothing interactions are shown in FIGS. 8-9 and discussed later below.

From the above examples, it is noted that, in particular embodiments, the VCI application 100 may define several such states and priorities to the inference module 708. In certain embodiments, "priorities" may be a list of attributes that precede over the other. For example, some state sequences—such as the state sequences for the act of putting on a belt and those for the act of adjusting the waist—may have similar gesture values. In that case, the default precedence may go to the act of putting on a belt, if the belt as an accessory exists or offered. If the default turns out to be incorrect, the user may be required to manually move to the next state if waist adjustment was intended. In certain embodiments, the AR server 405 may power the interactivities and the overall combinatorial system that define and implement various rules and priorities devised to carry out the functionality of the VCI application 100.

Query Translator Interface: Before discussing FIGS. 8-9, a brief description of the interface and functionality provided by the query translator 409 (FIG. 4) is provided below. It is observed that, in certain embodiments, the query translator 409 may be a faux language compiler that deconstructs a fixed sequence of statements and interprets the language in a simple format. For example, in pseudocode, a query translator interpretation can be: "Tell me what region of the body needs apparel adjustment based on the characteristics of the user behavior and parameters attained from the camera lens and associated hardware." Thus, a statement of the query translator 409 may be considered to "design" a set of commands for the user to recursively implement gestures and interact with the virtual garments for fitting and measurements. The query translator 409 may effectively "translate" a user's real-time action by generating a corresponding set of executable commands for subsequent processing by the retailer module 102 to accomplish the desired real-time rendering of a virtual apparel. In certain embodiments, such "translation" also may include accumulation or collection of real-time sequences of user actions, and arranging the actions in each sequence into a language expression. Below is a pseudocode of a simple example script of commands that may be generated by the query translator 409 for the earlier-described exemplary state sequence related to the user action of opening a button or a zipper of a virtual shirt/t-shirt. In the script below, the basic commands of the query translator 409 are given in capital letters whereas comments are inserted after the symbol "IL" The operations associated with the commands are described below the script. It is seen later with reference to FIGS. 8A-8C that, embodiments, a command-specific operation may be generated based on one or more aspects such as the user's body measurements, pose, gesture, motion, intended apparel-specific action, and so on.

Example of a Query Translator Script

System/VCI detects [Domain], //Domain can be hands, eyes, and joint movements
ACTION EFFECT [Button], //a t-shirt or shirt button that can be opened and closed
DOMAIN EXPAND {body constructors}//body constructors release hands, legs, joints or face; body constructors may be abstractions of the body tree that contain values of pose, gesture, weights, spatial index, and apparatus controller parameters from systemic modules
For body constructor availability {// for body constructors that are available in the user's image INFER command action},
SCALE measured Index, //Scale by the measured index of the domain as per measurement server
IF ROTATION indegree match, // i.e., if one hand moves clockwise and the other hand moves counterclockwise
CONCATENATE Apparatus pressure, direction, distance, rotation
Evaluate State
  INFER Clothing outcome // a clothing outcome is the projected/anticipated outcome that the end user has for the virtually-fitted apparel. It could simply be the look, sizing, or effects of fit such as wrinkles, textures, etc.
  PREPARE state, vibration, translation, rotation from clothing outcome // Returns the visual appearance of the clothing and—apparatus controller outcomes In the above exemplary script, the "System/VCI" command identifies for the VCI application 100 that the user is interacting with the apparel in context. It is the fundamental command that invokes all types of decisions that exist behind the query translator 409. The "ACTION" command indicates the apparel-specific actions that the user is trying to perform. It could be unbuttoning a shirt, turning around 180 degrees to see how the apparel looks in a different pose, adjusting the waist or the sleeve, or simply wearing an accessory such as a belt. The "DOMAIN" command indicates the relevant body segments of the end user (hands, joints, shoulders, face, legs, fingers, and the like). Each domain (or body segment) may have a sub-domain tree that covers structures such as joints, degrees of rotation, and spatially-indexed anchors. For every domain, the query translator 409 may construct an instance of exploration segment that comes into play at run time. The "INFER" command is the statement that triggers the segment as collected by the "DOMAIN" command. It additionally checks if that domain/segment is relevant (for example, whether a zipper makes sense onto a blouse). This helps determine the inference model (discussed earlier) that needs to be invoked—for example, by the inference module 708 in the AR server 405—for apparel rendering from the interface (for example, the rendering unit 716 in the AR server 405) that does the mapping of the apparel onto the relevant body portion of the user. The "SCALE" command asks the measurement server 402 to detail the type of a given measurement (such as waist, height, hips, bust, and the like) and link it to user-personalized measurement. The "ROTATION" command considers the rotation and spatial segmentation (of the user's movement) for the apparel in context and adds any offset from the apparel renderer (for example, the AR server 405). The "CONCATENATE" command pulls together all additional information from aspects such as accessories; apparatus controller's pressure and vibration values; and intended physics effects such as gravity, bulging, etc. It is observed here that all concatenate actions may not be functional; some may be nonfunctional or implicit, such as the behavior of a dress. The "PREPARE" command prepares the outcome from the neural network inference engine (such as the inference module 708 in the AR server 405) to translate the results back to the user. In particular embodiments, the inferred outcome may be received at the query translator 409 via the client application 410 (and REST API 411) and the translated results may be sent to the user interface module 408 (for display on a display screen of the user's mobile device) via the client application 410.

Figure 8A:
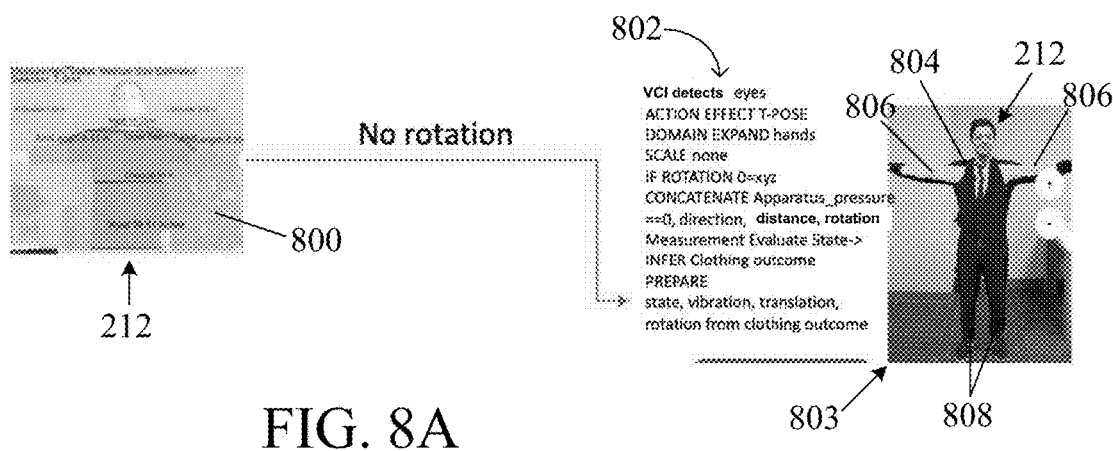
FIGS. 8A-8C show examples of three simple apparel interactions and corresponding translations of these interactions by the query translator for further processing as per particular embodiments of the present disclosure.
Figure 8B:
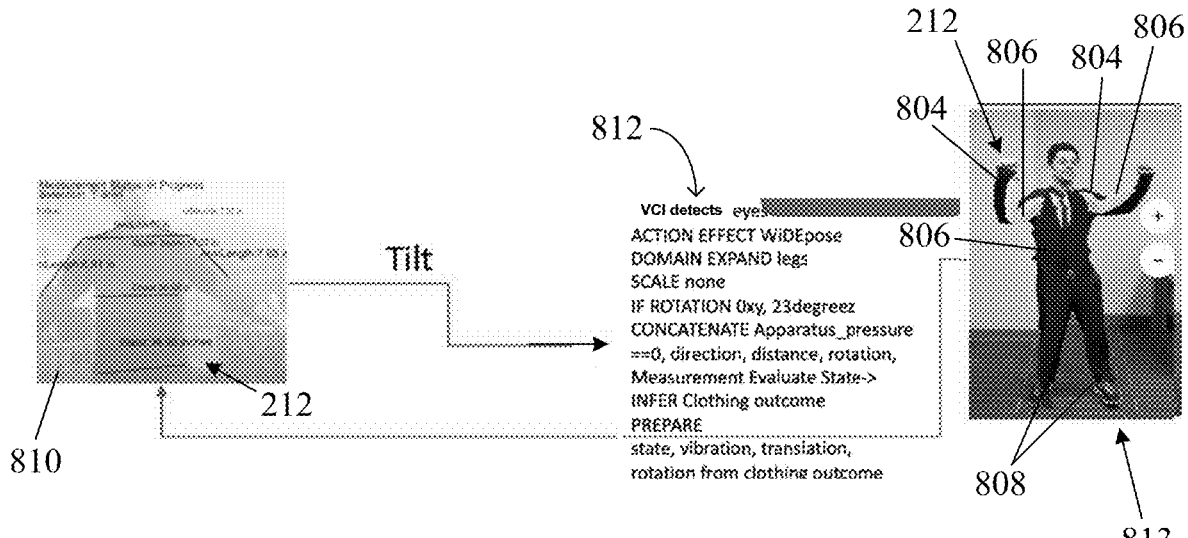
Figure 8C:
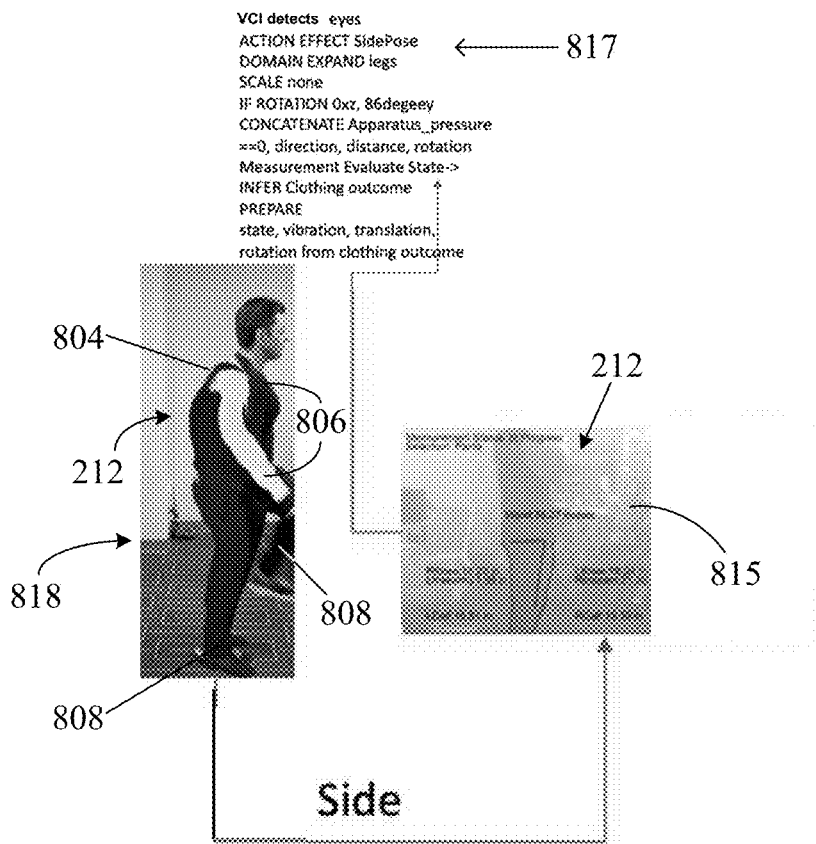

FIGS. 8A-8C show examples of three simple apparel interactions and corresponding translations of these interactions by the query translator 409 for further processing as per particular embodiments of the present disclosure. The pose transitions in FIGS. 8A-8C illustrate how query translator 409 may adapt in real-time to initially "interpret" these transitions. In FIG. 8A, the user 212 is shown to be standing in a T-pose. In FIG. 8B, the user 212 tilts to a wide-pose, whereas in FIG. 8C, the user 212 transitions to a side pose. In FIGS. 8A-8C, a virtual t-shirt and a virtual pair of pants have been selected by the user (or by the system as discussed earlier) for try-on. The illustration 800 in FIG. 8A (which is similar to the illustration 508 in FIG. 5B) indicates that the initial measurement of user's body dimensions is completed (for example, by the measurement server 402) and a medium size t-shirt has been recommended for try-on based on user's body profile and pre-stored dimensions of a medium size t-shirt (for example, as provided by the retailer). In the absence of any rotation or movement by the user 212, an exemplary script by the query translator 409 may be as shown at arrow 802 in FIG. 8A. In the illustration 803, the user 212 is shown wearing an actual t-shirt 804, which is fitted over with a virtual t-shirt 806. The virtual pair of pants 808 is also shown fitted over user's actual pants (not visible). In FIG. 8B, the user has tilted and raised user's hands. As a result, the measurement server 402 may perform real-time measurements to determine what dimensional changes or modifications have occurred that may be considered to accurately render the virtual apparels in the user's new pose. Thus, the illustration 810 (which is similar to the illustration 510 in FIG. 5B) indicates that the measurement is "in progress." Based on the preliminary determination of the user's tilt and other dimensions (for example, through the initial LiDAR measurements), the query translator 409 may generate the exemplary script shown at arrow 812 to assist the measurement server 402 and other units in the retailer module 102 to exactly determine user's modified dimensions and intent. The "ROTATION" command in the script 812 indicates the user's tilt to be 23 degrees along the z-axis, but 0 degree along the x and y axes. It is seen that, because of the user's motion, the "DOMAIN" command in the script 812 now focuses on the user's legs, whereas the "DOMAIN" command in the script 802 initially focused on the user's hands. Like the illustration 803, the illustration 813 also shows the user 212 with the actual t-shirt 804 and the virtual t-shirt 806 (whose rendering is modified as per user's movement to maintain the fit). The position of the virtual pair of pants 808 is also shown modified (from that in the illustration 803) as per user's movement to maintain a realistic fit.

In FIG. 8C, the user has turned fully sideways, raised one leg, and brought down user's hands. As a result, the measurement server 402 may again perform or calibrate the previous measurements for a known pose real-time measurements to determine what dimensional changes or modifications have occurred that may be considered to accurately render the virtual apparels in the user's new pose. Thus, the illustration 815 (which is similar to the illustration 514 in FIG. 5B) indicates that the measurement is "in progress." Based on the preliminary determination of the user's rotation and other dimensions (for example, through the initial LiDAR measurements), the query translator 409 may generate the exemplary script shown at arrow 817 to assist the measurement server 402 and other units in the retailer module 102 to exactly determine user's modified dimensions and intent. The "ROTATION" command in the script 817 indicates the user's rotation to be 86 degrees along the y-axis and 0 degree along the x and z axes. It is seen that, because of the user's motion, the "DOMAIN" command in the script 817 also focuses on the user's legs. Like the illustrations 803 and 813, the illustration 818 also shows the user 212 with the actual t-shirt 804 and the virtual t-shirt 806 (whose rendering is modified as per user's movement to maintain the fit). The position of the virtual pair of pants 808 is also shown modified (from those in the illustrations 803 and 813) as per user's movement to maintain a realistic fit.

It is observed here that the value of the "Apparatus pressure" parameter of the "CONCATENATE" command in each of the scripts 802, 812, and 817 is zero because the user is not wearing the apparatus controller 600. Hence, no controller outputs are available for sensing. (FIG. 9, discussed later, shows the diagrams of the user wearing the controller 600.) It is also observed here that each of the scripts 802, 812, and 817 in FIGS. 9A-9C, respectively, contains the same commands as those discussed earlier with reference to an exemplary query translator script. However, as can be seen from FIGS. 8A-8C, the parameters, operands, or arguments of a command may change in real-time based on the user's pose, posture, gesture, movement, interactions with a virtual apparel, and whether the user is wearing an apparatus controller.

Generally, the query translator 409 may identify user's poses and retrieve metadata from the apparatus controller and data related to user's body measurements and feed them to various units in the retailer module 102 for further processing. For example, in certain embodiments, the query translator outputs may be part of the data sent to the inference module 708 (in the AR server 405) and to the inference models for the GAN 714 to provide details about user's action and intent. The inference estimator, such as the AR server 405, may then use Hierarchical Mesh Deformation (HMD) or its variations to reconstruct a body mesh and estimate joint intent and motion of the user, eventually generating the clothing mesh and folding lines based on the intent. In certain embodiments, instead of HMD (which is a type of a CNN), any other ML model that uses the project-predict-deform strategy may be deployed. Such an ML model can also be used in monocular systems as well. In the embodiments of FIGS. 8A-8C, the user's movements indicate an intent to dance with virtual garments on. Hence, the AR server 405 may geometrically deform the virtual garments accordingly based on the translations/interpretations of the user's actions received from the query translator 409. More specifically, in particular embodiments, the retailer module 102 in the host system 202 may perform the following overall process: (i) Generate a 3D body mesh of the corresponding body portion of the user. (ii) Estimate the temporal motion of the user. (iii) Use HMD to reconstruct the 3D body mesh in real-time based on the temporal motion of the user and the apparel-specific action intended by the user. This may generate a reconstructed 3D body mesh. (iv) Geometrically deform the virtual apparel as per the reconstructed 3D body mesh. Such deformation may be performed in the earlier-displayed AR image of the user to enable the user to visualize the behavior/fitting of the virtual apparel as if the user were actually wearing it.

As discussed before, the sartorial data for the user's body may be obtained through the measurement server 402 operating in conjunction with the pose estimator 403. However, in some embodiments, the data for various types of garments may be collected only during the training phase of various ML modules in the VCI application 100. For example, the interactions with a collar are only possible if the "collar" exists as a construct or cloth constructor (which was mentioned before and described in more detail below). In particular embodiments, a virtual garment may be "segmented" or "modularized" into parts or cloth constructors—like sleeves, collar, buttons, vest portion, and so on—for easy manipulation visually. Many retailers may have standardized 3D implementations of their clothing line. Alternatively, a third party may offer a default creation corpus to the retailer that the retailer can modify as per its own clothing line. In some embodiments, the apparel images may be stored at a retailer's system. The user may access the retailer's website and select a desired apparel from its image, or the website may present default set of apparels based on user's choice inputs. The SKU ID (Stock Keeping Unit Identifier) or other product designator of the selected apparel may be referenced and sent to a third party's system which may be linked to the retailer's system. The third party's system may now communicate with the user's mobile device to receive and process real-time user body measurements as well as sartorial interaction data as discussed before. The apparel may be rendered by the third party's system and directly sent to the user's device for display. Once the apparel is rendered, the user can either go back to the retailer's website to browse other apparels or add the current apparel to a shopping cart.

In particular embodiments, a third party software provider (or rendering service provider) may have a pre-defined set of attributes for garments such as cotton, polyester, wool, fleece, and the like. Through a third party system such as the host system 202, the third party may provide the retailers or cloth designers with an additional interface where they can define cloth constructors and related aspects—such as sleeves, folds, wrinkle types, accessory location, and so on. In some embodiments, these attributes and other 3D features/aspects may be generated using various tools available online, for example, at the website: https://www.marvelousdesigner.com/product/overview. A script by the third party provider may convert an open format file—such as an fbx (film box) or obj (object) file—containing information about such 3D cloth constructors/features into a retailer's platform-friendly zip file where a render may be created to map the outputs of the apparatus controller 600 (if deployed by the user) in conjunction with the retailer's line of apparels for which cloth constructors/features have been defined. On the other hand, in certain embodiments, if a retailer does not have the necessary 3D assets or expertise, the retailer may be asked to provide two (2) 2D image uploads (to the third party's platform) for each item of clothing in standard sizes and types. For example, the retailer may be allowed to access a retailer-only portion on the third party's website and select garments and attach their 2D images. Thereafter, the third party may deploy an IUV image converter and an inverse texture generator—like the IUV container 712—to create common depth attributes such as, for example, collar folds and button overlays. In other embodiments, different machine learning techniques may be used to help retailers crop and convert the 2D images as desired.

As discussed before, the "DOMAIN" command in the query translator 409 may distribute the focus on the relevant body segment of a user. This operation may be partially analogous to a similar tool on the market such as, for example, the "Sculpt mode" in the Blender™ software (available from https://www.blender.org). However, the present disclosure offers additional functionality through a visual interface, which may be presented—for example, by the UI module 408 and the client application 410—to the user on the display screen of the user's mobile device. The visual interface may allow for: (1) Retailer-specific sculpts—such as, for example, introducing a collar or a sleeve or folds. These may be referred to as the earlier-mentioned "cloth constructors" (some examples of which are given in the table below). Alternatively, these may be referred to as "constructs". (2) Dynamic 3D rendering of these constructs using visual interactions—such as, for example, user's folding of hands or choosing one of the predefined ways to select items (associated with a virtual garment) and convey intent.

Thus, in particular embodiments, the VCI application 100 may receive and store a plurality of pre-defined ways of interacting with a virtual apparel. Each of the plurality of pre-defined ways may have a corresponding pre-defined apparel-specific action associated therewith. Some examples of such pre-defined operations are given in the table below under the column heading "Operation/Infer command." In some embodiments, the UI module 408 of the VCI application 100 may present these pre-defined ways to the user—for example, as a list of instructions or symbols on the display screen of the user's mobile device or by highlighting the modifiable portions of the virtual apparel—prior to the user's sartorial interaction. The VCI application 100 may then instruct the user to follow one of the pre-defined ways as part of the sartorial interaction to convey the apparel-specific action intended by the user. The query translator 409, in turn, can initially "interpret" the user's action and generate appropriate command parameters for further processing by the retailer module 102 as discussed before. In some embodiments, the VCI application 100 may receive one or more options associated with a virtual apparel, wherein each option allows customization of the virtual apparel in an option-specific manner. Some exemplary such options are given in the table below under the column heading "Action," and corresponding option-specific outcomes are given under the column heading "Outcome." The VCI application 100 may then offer such options to the user for selection through sartorial interaction. In certain embodiments, it is important to recognize the statefulness of the VCI application 100. For example, if the top button is open, then and only then the one below may be opened. The VCI application 100 may allow the retailers to author such rules (as pre-defined ways), and may allow the shoppers to view the rules and perform the sartorial interaction accordingly.

The examples in the table below provide a list of actions that can be performed by a user and interpreted by the VCI application 100 as per teachings of the present disclosure. The first column ("Action" column) in the table gives examples of interactions a user may be allowed to perform with a virtual apparel. The second column ("Domain" column) lists corresponding domains to be interpreted by the query translator 409 through its earlier-mentioned "DOMAIN" command. The third column ("Garment" column) lists the types of garments for which the user may be allowed to perform the corresponding interaction in the "Action" column. The fourth column ("Outcome" column) mentions action-specific outcomes that may be displayed on the display screen of the user's mobile device. The fifth column ("Operation" column) lists pre-defined operations that a user may be instructed to perform to accomplish the desired interaction. The last column ("Cloth Constructor" column) provides a list of cloth constructors (explained before) that may be modified as per user's intended action. It is assumed that, in the table below, a retailer has pre-defined the cloth constructors, clothing mesh, and cloth folding to the query translator 409 that takes in apparel's rotations, rigs, textures, and fold maps into account to adjust the apparel to the poses of the person in query. Furthermore, as shown in the table below, in certain embodiments, various virtual clothing accessories (such as belts, ties, scarves, and so on) also may be selected by a user and "attached" to a virtual apparel and manipulated with it.

| Action | Domain | Garment | Outcome | Operation/Infer command | Cloth Constructor |
|---|---|---|---|---|---|
| Turning | None | Any | Clothing turns and follows pose | None | None |
| Folding sleeve | Palm to elbow | Shirts and jackets | Sleeve shrinks and expands | Bent palm on second hand | Predefined sleeve object rigged as an extension |
| Adjusting a bra | Bust, shoulder | Undergarments | The bra is adjusted moved in the region of interest | Palm hold position | Bra anchors are recalibrated on the torso |
| Closing a Zipper | Neck and Shoulder | Shirts and Jackets | Collar area goes snug or loose | One arm is a fist | Predefined zipper object |
| Adjusting a skirt | Waist | Dresses, skirts | Skirt expands or flows | Both arms needed | Predefined skirt waist object |
| Change/Select an apparel | Palm and non-body region (raise hand and snap fingers) | Any | The garment changes to the previous selection or next selection depending on direction | Snap towards the left or right | None |

-continued

| Action | Domain | Garment | Outcome | Operation/Infer command | Cloth Constructor |
|---|---|---|---|---|---|
| Multi-select an apparel | Menu bar on mobile's UI/UX or a button menu on apparel controller | Accessories (belt, scarf, jackets, tie, suit, flowers) | The original garment can now interface with the accessory | Press controller button (or select from menu bar) and anchor the garment on your hands | Predefined accessory with access points (anchors) that can be virtually held by a hand |
| Attach the apparel | Map the apparel onto the segment of interest for the body | Accessories (belt, scarf, jackets, tie, suit, flowers) | The accessory gravitates on the top of the garment-inference engine in the AR server handles this | Hold to release action | Release apparel controller button or open palm to release apparel objects |

In some embodiments, the program code for the 3D/physics engine for rendering the virtual clothing may be written as a C# module on the earlier-mentioned Unity Platform but can be utilized on any physical engine. This cleanly converts user actions and previous states into readable sequences that the inference engine (such as, for example, the inference module 708) in the AR server 405 can understand and process. In certain embodiments, the user's sequence of steps may be automatically corrected—for example, by the inference module 708—to the best effort estimation in case of incorrect state sequence or occlusion (for example, of certain body parts or portions of the user) because the sequence is closely syntactic. The best effort estimation may be carried out based on the earlier-discussed "priorities" that may be defined by the VCI application 100 for the inference module 708. As mentioned before, "priorities" may be a list of attributes that precede over the other. For example, rules for the inference module 708 may indicate certain priorities such as z-axis overlay, physical effects (such as gravity), and so on.

Figures 9A, 9B:
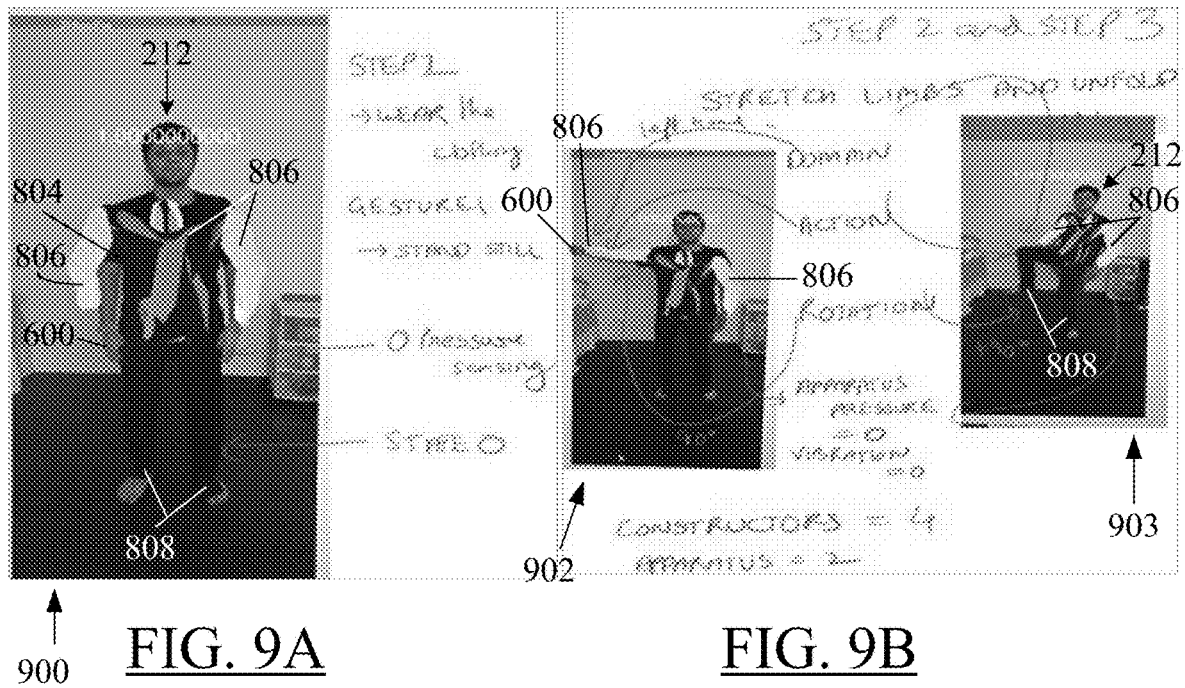
FIGS. 9A-9C depict examples of a user trying on a virtual t-shirt and a virtual pair of pants, and interacting with the t-shirt with an apparatus controller to unbutton it as per particular embodiments of the present disclosure.
Figure 9C:
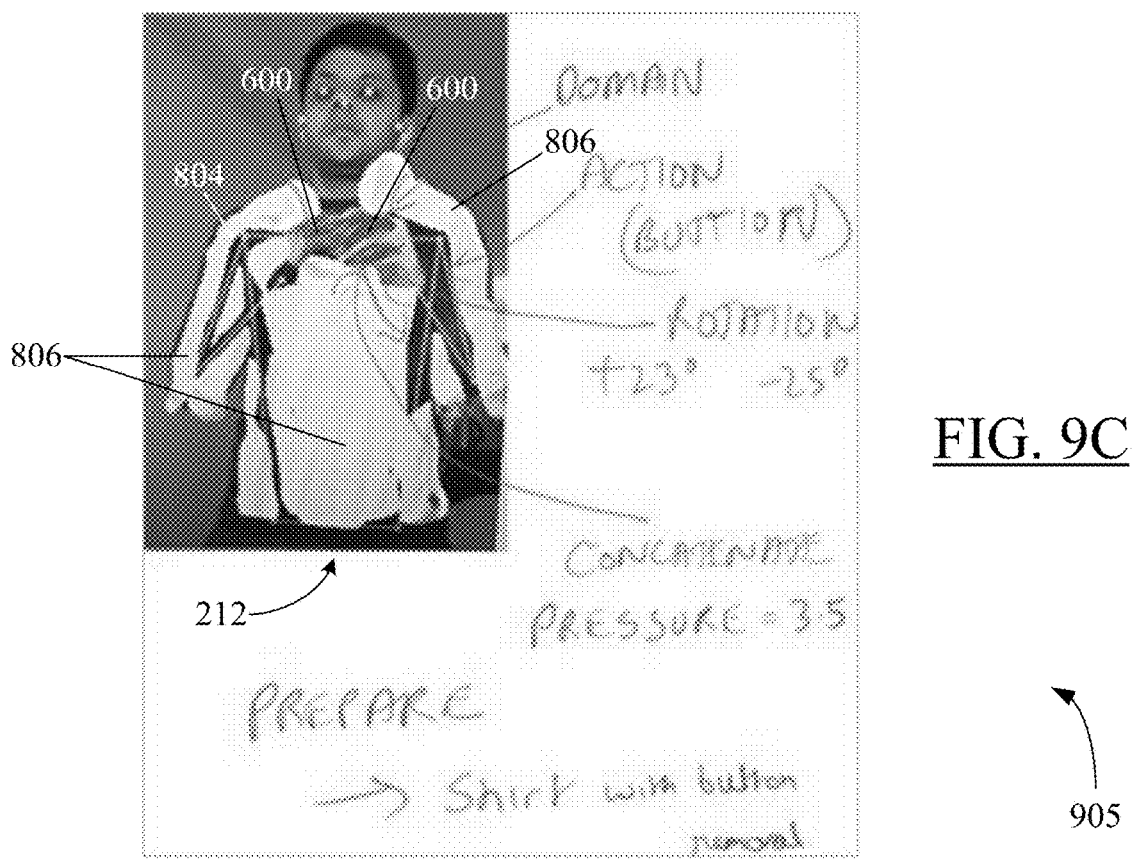

FIGS. 9A-9C depict examples of a user (such as the user 212) trying on a virtual t-shirt and a virtual pair of pants and interacting with the t-shirt with an apparatus controller (such as the controller 600) to unbutton it as per particular embodiments of the present disclosure. For the sake of consistency, the same reference numerals are used in FIGS. 8 and 9 to identify various garments—virtual and real—common between those figures. FIGS. 9A-9C illustrate examples of how a user can "define" values for various commands through the visual interface of the user's mobile device for subsequent interpretation by the query translator 409. Initially, it is observed that the user 212 may not be willing to learn or understand the syntax of the exemplary query translator script discussed before. Therefore, the user may not be expected to manually input parameters of various query translator commands. Hence, the VCI application 100 as per particular embodiments of the present disclosure provides for visual operators to develop segmentation techniques based on human body movements. The VCI application 100 may store in a memory (for example, the memory in the host system 202 or the database 216) software routines that retain the earlier-mentioned 3D spatial constructs (containing sartorial measurements that may be further processed by the AR server 405 for rendering a virtual apparel) and parameters/receptors received from the apparatus controller 600 (if deployed). This allows for a generic translation of user's sartorial interactions that the end users can "define" themselves and develop for their clothing. In particular embodiments, such "defining" may be accomplished through the visual interface (or display screen) of the user's UE 204 which may be under operative control of the UI module 408. Through the visual interface, the user may be trained with certain examples of what actions, gestures, and poses may be used to create visual effects as intended. The joint and vertex combinations of user's hands, legs, fingers, face, etc., may be used to define gestures, facial expressions, poses, and other actions.

In particular embodiments, a set of operators may allow the end users to signal their cloth-level interactions to the frontend module—such as the user module 104—and convert them into state sequences, for example, with the help of the query translator 409. The operators may generate appropriate values/parameters for the commands in the exemplary query translator script discussed before. The examples of unbuttoning a virtual t-shirt and folding the t-shirt and a virtual pair of pants in FIGS. 9A-9C show the power of the operators to bind a user's clothing interactions before they reach the query translation stage. In the embodiments of FIGS. 9A-9C, the user 212 is shown wearing the apparatus controller 600 on both hands to perform the sartorial interactions. In FIG. 9A, the user 212 starts utilizing the VCI application 100 and stands in the key frame with the intent of cloth folding and unbuttoning. The illustration 900 in FIG. 9A showcases the first step ("Step 1") of user's preparations to interact with virtual clothing(s). Step 1 showcases the user 212 entering the image capture field of the VCI application 100 as it detects the value of zero (0) for the "state" operator, indicating that the user's gesture shows that the user is simply standing (or standing still) with zero (0) pressure from the apparatus controller 600 and with spatial clarity. The "State" and "Apparatus pressure" operators may provide the corresponding values to the "CONCATENATE" command mentioned before in the context of the discussion of the exemplary query translator script. As a result of such initial values, the virtual clothing—here, the virtual t-shirt 806 and the virtual pair of pants 808—is shown fitted on the corresponding body portions of the user 212. As in case of FIGS. 8A-8C, the virtual t-shirt 806 may be rendered and fitted over the actual t-shirt 804 of the user 212 which may be partially visible in certain views. It is noted that the relevant query translator script for each of the FIGS. 9A-9C—like the scripts 802, 812, and 817 in FIGS. 8A-8C, respectively—is not shown in FIGS. 9A-9C for the sake of clarity and simplicity of the drawings.

The illustrations 902 and 903 in FIG. 9B showcase the second ("Step 2") and third ("Step 3") steps, respectively, of user's interactions with virtual clothing(s). In these steps, the user 212 may trigger the query translator 409 by moving the left hand (illustration 902) and the left leg (illustration 903). The movement in the illustration 902 may indicate the user's intent to fold the virtual t-shirt by 90 degrees at the respective shoulder. The movement in the illustration 903 may indicate the user's intent to fold one of the pair of pants by 90 degrees at the respective knee joint. The parameters for the relevant "DOMAIN" (left hand in the illustration 902 and left leg in the illustration 903), "ACTION", and "ROTATION" (90 degrees for both illustrations 902, 903) commands in the earlier-discussed query translator script are also identified in FIG. 9B. Other values for relevant operators include the values of zero (0) for "Apparatus pressure" and "vibration" operators, the value of 90 degrees for "rotation", the value of four (4) for "body constructors" (two hands and two legs), and the value of two (2) for "Apparatus" (one apparatus controller 600 in each hand). Based on these user gestures and apparatus controller outputs, the CNN 700 in the measurement server 402 may determine that there is no intent to change the physics or the fabric of the material in both steps in FIG. 9B. The illustrations 902, 903 also show the resulting renditions of the virtual t-shirt 806 and the virtual pair of pants 808, respectively, modified as per user's movements to remain fitted on the user's body as if the user were wearing them.

It is observed that, in some embodiments, the shape, size, and texture may be considered as basic physical attributes of a piece of clothing. On the other hand, fabric types like woolen, cotton, polyester, and so on—may be considered as behavioral attributes. For example, a light cotton dress would have the ability to flow along the y-axis, whereas a tight polyester dress may not. In certain embodiments, the Unity Platform underlying the user module 104 may use gravity and anchor on a free body object when the user attempts to change the physics (or physical attributes) of the material. In some embodiments, the user may need to manually change the displayed apparel (as noted earlier) or its fabric type by raising a hand and snapping its fingers or using a drop-down menu on the display screen of the user's UE 204 to remotely select the fabric type visually (for example, with a button of the controller 600).

FIG. 9C shows an illustration 905 of the user 212 intending to unbutton and change the currently-rendered virtual apparel 806. The apparel controller 600 may sense the user's proximity of hands to the collar region of the virtual t-shirt 806 and pressure exerted by user's fingers, which may indicate the user's intent to unbutton the t-shirt 806. The parameters for the relevant "DOMAIN" (both hands in the illustration 905), "ACTION" (buttons), "ROTATION", "CONCATENATE," and "PREPARE" commands in the earlier-discussed query translator script are also identified in FIG. 9C. For the "rotation" operator, the values may be "+23°" (rotation sensed at one hand) and "−25°" (rotation sensed at the other hand) because one hand moves clockwise whereas the other moves counterclockwise during unbuttoning. The "Apparatus pressure" operator may provide a value of "3.5" (measured in kPa or kilo pascals) based on the pressure of user's fingers sensed by the controller 600. Based on values of various sensed parameters in its command script, the query translator 409 may determine that the user wishes to unbutton and change the virtual t-shirt 806. As a result, the "PREPARE" command of the query translator script may suggest to the inference engine in the AR server 405 that the user's sartorial interaction may be categorized as "shirt with button removal." In response, the AR server 405 may modify the current rendering of the virtual t-shirt 806 to display to the user 212 the t-shirt 806 being unbuttoned and removed. The rendering of the unbuttoning process and the unbuttoned t-shirt may be followed by a display of virtual folding of the t-shirt as if the user were unbuttoning, taking off, and folding the t-shirt. In some embodiments, there may be a default folding and texturing process for all virtual garments.

It is noted that the illustrations 803, 813, 818 in FIGS. 8A-8C and the illustrations 900, 902, 903, and 905 in FIGS. 9A-9C may be considered as real-time augmented images of the user with virtual clothing fitted as shown. As discussed before, the virtual clothing displayed in an augmented image of the user may be modified as per user's apparel-specific action. FIGS. 9A-9C demonstrate that the user has the capability of unbuttoning and folding a virtual t-shirt or other clothing with buttons. It should be noted that, in some embodiments, the task of unbuttoning a shirt may require several operations that can take multiple permutations of sequences like re-buttoning, stay in position, wear on, rotation, translation, and apparel change. The VCI application 100 as per teachings of the present disclosure may simplify the user experience when multiple such operations need to be performed. All the users may need to do is semantically bring both hands together near buttons, which invokes the query translator 409 as discussed before. After that, the apparatus controller 600 may "sense" the unbuttoning task using the pressure from the finger sensors, and request spatial measurements (in this case, the chest size) to open up the clothing in a gravitationally—decreasing direction. In one embodiment, the earlier-described query translator script may handle user rotation, intent, depth, and motion to identify button removal with over 98% accuracy using the earlier-mentioned UE 204 (an iPhone™ with camera optics including a 1080p RGB camera and a 12× LiDAR sensor) under contained illumination.

As previously noted, a customer can move his/her hands in a pre-defined manner to change the apparel in context. For example, the end user may raise a hand and snap the raised hand's fingers to indicate that the user needs a change of apparel. In another embodiment, the VCI application 100 may highlight one or more portions of the displayed garment for the user to choose (remotely, for example, using the apparatus controller 600) to indicate a change of apparel. In one embodiment, different-colored highlighting (mentioned below) may be used to allow the user to indicate modification or change in the dimensions of the highlighted segment of the clothing—for example, a smaller waist, a longer sleeve, a tighter-fitting in the thigh area, and so on. In some embodiments, the user may use his/her voice (for example, by speaking a pre-defined command phrase), smile (or other facial expression), and/or a pre-defined gesture to indicate that they need a change of apparel. In certain embodiments, a pre-defined set of action-specific voice commands may be presented/displayed to the user for selection as per the apparel-specific action intended by the user. The UI module 408 (or the client application 410) in the frontend user module 104 (FIG. 4) may use known voice and speech recognition techniques to process the user's voice command and provide corresponding inputs to the query translator 409 for further interpretation and processing. In particular embodiments, different states of user's facial expressions— such as, for example, normal face, happy face, surprised face, and the like may be recognized (for example, using well-known facial recognition techniques) to analyze the user's change of sentiment and underlying intent. The motion and the intent gathered by the query translator 409 may determine the next state of anchors depending on the dress (or an accessory such as a handbag, a ski gear, and the like) and the item of interest. An exemplary pseudocode for the earlier-discussed query translator script is provided below to accomplish the user-desired effect of dress transitions through hand snapping and smile.

Input==
System/VCI detects smile and hands
ACTION EFFECT CLIENT-POSE
DOMAIN expand hands, fist
SCALE NONE
CONCATENATE ROTATION-0=xyz, Apparatus pressure>=0
Sentiment=Happy, =>
Measurement Evaluate State→Infer Clothing outcome
Prepare state, Vibration, Transition, Anchors, Garment, rotation,
Fit (green, yellow, red)

In the above example, the user may raise a hand, form a fist, and snap the fingers of the fist to provide the DOMAIN parameters to the query translator 409. If the "Sentiment" operator indicates that the user has a "happy" facial expression, then the "Fit" operator may display a green colored border around the latest virtual garment being rendered or a green dot on the garment to illustrate that the user is happy with the most-recent choice of the apparel. If the user's facial expression is not "happy," then a yellow-colored indication may be displayed. On the other hand, if the user acts "surprised" or "angry" at the currently-displayed garment, then a red-colored indication may alert the user that the system would select and display another apparel and/or display a modified version of the current apparel—for example, a smaller waist, a longer sleeve, a tighter-fitting in the thigh area, and so on, as noted above—as per user's intent.

It is noted that, in some embodiments, the visual operator-based query translation may be used to provide inputs for more diverse applications such as, for example, Avatar generation and automated rigging in gaming and animations, digital inventory, and the like. Below is an example of pseudocode for the implementation of the earlier-discussed query translator script in applications such as gaming, social media, or digital fashion.

System/VCI detects face+body
ACTION EFFECT SCAN-POSE
DOMAIN EXPAND OPEN POSE
SCALE NONE
CONCATENATE rotation=0xyz, Apparatus pressure=0
measurement_eval_state=Infer_Avatar
Prepare state mode, vibration, transition, anchors . . . rigs It is observed from the foregoing discussion that the functional aspects of the VCI application 100 allow both consumers and retailers to define and translate their interactions and clothing to enable a better "fit" for the end user. In some embodiments, a customer service representative of a retailer or fashion designer may use the functionality of the VCI application to assist a customer over a video call—like FaceTime—with selection of proper apparel and accessories. As part of interpreting a sartorial interaction, the VCI application 100 may monitor, in real-time, at least one of the following user behaviors: (i) an interaction of fingertips of the user with the virtual apparel, (ii) a change of pose of the user, (iii) a rotation of a body portion of the user, (iv) a tilting of the body portion, (v) a motion of the body portion, (vi) a gesture of the user in response to the generated augmented image (in which a virtual garment is rendered on the user's body portion), (vii) a facial expression in response to the generated augmented image, and (viii) an audio expression in response to the generated augmented image. In particular embodiments, the VCI application 100 may then estimate, in real-time, the sartorial interaction based on the monitored user behavior(s). In some embodiments, the VCI application 100 also may update the sartorial measurements based on the estimated sartorial interaction. Such updating may be considered a "measurement mode." For example, the dimensions of a user's waist may be changed if the user wants the waist to be measured a little above or below the current position, or the dimensions of a user's shoulder measurements may be changed if the user wants a broad fitting on the shoulder, and so on. The VCI application 100 also may translate, in real-time, the estimated sartorial interaction into a set of executable commands representing the apparel-specific action intended by the user. In some embodiments, a video game may be developed for a fashion show based on the virtual interactions supported by the VCI application.

It is noted that, in certain embodiments, any one of the following may be considered an apparel-specific action as per teachings of the present disclosure: (i) a change to a different type of virtual apparel or accessory (such as a handbag on body) to be displayed in the augmented image; (ii) a change to the index of anchors or joints during the body measurement process (such as the waist selection), (iii) a change to a different virtual apparel to be displayed in the augmented image; (iv) a change of size and/or style of the virtual apparel (for example, slim fit, tight fit, and the like) currently being displayed in the augmented image; (v) a modification of a portion of the virtual apparel currently being displayed in the augmented image; (vi) a modification of a property (such as stitching, plaits, and so on) of a cloth of the virtual apparel currently being displayed in the augmented image; and (vii) an introduction or removal of a virtual accessory associated with the virtual apparel currently being displayed in the augmented image. It is noted here that these apparel-specific actions may be performed in real-time and while the virtual apparel (and/or virtual accessory) is on the user's body. The permutations may increase with the complexity of the user's poses.

More generally, the query/language processing system may include a query assimilator that comprises rules to target clusters or plurality of clusters. The rules may be stored on a computer-readable medium or memory for execution by a processor. Upon execution of the rules, the query assimilator may perform some or all of the following operations: (i) The query assimilator may present on a display of the user interface a number of items such as, for example, sartorial measurements, virtual garments, intent of the user, and the like. The display also may highlight the proximity of the operation (for example, the collar may be highlighted). (ii) The query assimilator also may help the user and the retailer interpret the viability of the rules. (iii) The query assimilator may assimilate various apparel-specific actions (discussed before) and the attributes (such as, for example, the gender of the user, the style of the virtual apparel, the size of the virtual apparel, the material of the virtual apparel, and the texture of the virtual apparel). (iv) The query assimilator may resolve conflict fro plurality of operations and select the best possible inference based on the maximum number of elements that match in the rules engine (as, for example, the table mentioned previously). (v)

The query assimilator may continue with the operations/methodology related to displaying an augmented image.

The foregoing discussion of FIGS. 1-9 illustrates how a user with a smartphone or tablet (or laptop or other mobile device) can define retail adjustment operations on a virtual apparel/clothing in real-time using an AR-based visual interface and the user's fingertips. The user can interact with the virtual apparel for identifying, defining, and changing the look, fit, and design of the specific apparel on the user's own body in real-time as per individual needs. The AR-based interactive solution discussed herein may allow a customer to find the right fitting apparel online through interaction with a virtual clothing in real-time. The solution also may help retailer community define new operations based on their available apparels. The AR-based visual interface (which may be presented/displayed on the user's mobile device under operative control of the UI module 408 and/or the client application 410) accumulates user's action-specific query constructs for the query translator 409 in the frontend module 104. The connector code for the AR-based visual interface may be written on the earlier-mentioned Unity Platform. Although AR platforms such as ARCore (for Android™ OS) and ARKit (for Apple's iOS™) provide for common interfaces for depth, body pose measurements, and/or background segmentation, these platforms do not provide for the modeling of human interactions with the same piece of virtual clothing. On the other hand, the AR-based visual interface as per teachings of the present disclosure can configure measured elements (such as sartorial measurements) alongside the user's interactions with the apparel controller 600 to render a virtual piece of clothing in real-time as per user's clothing-specific action.

Moreover, in aspects such as social media innovations, the teachings of the present disclosure may enable consumers (especially fashion designers and influencers) to share hacks and interactions with virtual clothing to influence users and develop methods that may help the users determine course of—clothing interactions in the virtual, stay-at-home world. The teachings of the present disclosure also may help physical robotics applications for aspects such as ironing, washing, cleaning, and folding of clothes, or wardrobe cleaning. In some embodiments, the VCI application 100 may empower storage of visual memory of personalized user fit and then allowing for granular interactivity. The interactive, virtual try-on as per teachings of the present disclosure may facilitate fitting and modularizing of clothing as if the consumer were really wearing the apparel.

It is noted that the sartorial measurements performed by the VCI application 100 are dynamic measurements that can handle random poses, occlusions, projections and the like. Furthermore, the measurements are performed on real humans and in real-time, and not on mannequins or other samples. The VCI application 100 deals with garment level interactions (between the human subject and garments), and with its own methodology based on query assimilator, inference selector, apparatus controller, and other operators. In some embodiments, the VCI application offers measurement customization (from end user perspective) along with garment rendering. The earlier-mentioned measurement mode allows deep measurements with interactivity to allow users to adjust their sartorial measurements for the virtual apparel. In this mode, users can see their measurements and adjust the aspects where they would like to add subjectivity—for example, leg length or length of the pants. Thus, the users can debug their own measurements and understand how they are being measured in real-time in different poses. In some embodiments, remote debugging may be enabled by allowing tailors or designers to communicate with the users in measurement mode or garment mode (when the virtual apparel is rendered on the user's body) so that the tailor/designer may be able to adjust the characteristics of the garment alongside the shopper, allowing for real-time interactivity and making the cloth design process digital (allowing for 3D schematic generation in real-time). In certain embodiments, the VCI application may enable interested persons to create unique elements based on real-time motion and interactivity. For example, designers can create a Non-Fungible Token (NFT) on motion-based characteristic of real-time users. In gaming, social media streaming or entertainment/media, the apparel-specific actions may be performed using a joystick or a keypad (as in oculus devices), or electromechanical probes on a remote user's body. In Zoom™ or FaceTime™ meetings, spatial interactions may be allowed in aspects such as dressing up as a CEO of the company or in a Halloween costume, or as any persona that a user would like to represent himself/herself as and when the user transitions from one meeting to the other. In some embodiments, aspects of size prediction may be performed by the VCI application in real-time based on partial body and occluded segments. For example, as the user interacts and adjusts the garment, the measurement may be calibrated in real-time. Similarly, sizes can be dynamically predicted for a specific retailer or clothing manufacturer in the same way. For example, if a user adjusts the user's waist, the trouser length of the user will dynamically adjust. Thus, the user may need to wear a Levi's® size 34×30 trouser instead of a Levi's® 32×30 trouser (which the first round of measurement would have estimated/predicted). The same goes for sizing (Small, Medium, Large), fit, style (slim, broad), and so on.

FIG. 10 is a block diagram of an exemplary user equipment (UE), such as the UE 204 in FIG. 2, according to one embodiment of the present disclosure. As noted earlier, the UE 204 may be a mobile handset, smartphone, or any other wireless device operable to carry out the functionality of the user module 104 of the VCI application 100 as per particular embodiments of the present disclosure. The UE 204 may include a processor 1000, a memory 1002 (which may, in some embodiments, also include memory on UE's Subscriber Identity Module (SIM) card), a transceiver 1004, and an antenna unit 1005. The memory 1002 may include the program code for the user module 104. The program code may be executed by the processor 1000. Upon execution of the program code, the processor 1000 may configure the UE 204 to perform various mobile device-specific tasks associated with the interactive virtual try-on of apparels as per the teachings of the present disclosure. In one embodiment, such tasks may include, for example, the process steps illustrated in FIG. 3A as well as other UE-specific (or user module-based) tasks discussed earlier with reference to FIGS. 4-9.

In particular embodiments, the processor 1000 may be a relatively low-powered Central Processing Unit (CPU) executing a mobile operating system (or mobile OS) (e.g., Symbian™ OS, Palm™ OS, Windows Mobile™, Android™, Apple iOS™, etc.). Because of the battery-powered nature of mobile handsets, the processor 1000 may be designed to conserve battery power and, hence, may not be as powerful as a full-functional computer or server CPU. Although not shown, it is observed that, in addition to the user module 104, the memory 1002 of the UE 204 also may have one or more mobile applications resident therein. These mobile applications are software modules that may have been pre-packaged with the handset 204 or may have been downloaded by a user into the memory 1002. Some mobile applications may be more user-interactive applications (e.g., a mobile game of chess to be played on the UE 204, a face recognition program to be executed by UE 204, etc.), whereas some other mobile applications may be significantly less user-interactive in nature (e.g., UE presence or location tracking applications, a music streaming application, etc.). These mobile applications as well as the user module 104 may be executed by the processor 1000 under the control of the mobile OS.

The memory 1002 may store data or other related communications received from the host system 202 (FIG. 2) and the wearable controller 600 (FIG. 6) as well as other content needed to facilitate interactive try-on of virtual clothing. For example, in one embodiment, the memory 1002 may store, for example, body measurements of the user 212, pressure and vibration values received from the controller 600, AR datasets received from the AR server 405 of the retailer module 102, video frames containing real-time user images, contents of the augmented image of the user 212 "wearing" the virtual apparel in real-time, and the like. The memory 1002 may receive some content over the links 208, 214, and some as processed values generated by the user module 104 at run-time.

The transceiver 1004 may communicate with the processor 1000 to perform transmission/reception of data, control, or other signaling information (via the antenna unit 1005) to/from the host system 202 and the apparatus controller 600 with which the UE 204 may be in communication. In particular embodiments, the transceiver 1004 may support wireless communication with the host system 202 through the Internet 206 and with the apparatus controller 600 via the Bluetooth® link 214 to implement the interactive virtual try-on methodology as per the teachings of the present disclosure. The transceiver 1004 may support different types of wireless connections such as, for example, a cellular network connection, a Wi-Fi connection, a Bluetooth® connection, and the like. The mobile OS, mobile applications, and the user module 104 may utilize the transceiver 1004 as needed. The transceiver 1004 may be a single unit or may comprise of two separate units—a transmitter (not shown) and a receiver (not shown). The antenna unit 1005 may include one or more antennas. Alternative embodiments of the wireless device 204 may include additional components responsible for providing additional functionality, including any of the functionality identified herein, such as, for example, communicating with the apparatus controller 600, transmitting sartorial measurements to the host system 202 in real-time, receiving AR datasets and other contents from the host system 202, displaying various notifications, images, video frames, or messages to the user of the device 204, etc., and/or any functionality necessary to support the solution as per the teachings of the present disclosure. For example, in one embodiment, the wireless device 204 also may include an on-board power supply unit 1007 (e.g., a battery or other source of power) to allow the device to be operable in a mobile manner.

In one embodiment, the mobile device 204 may be configured (in hardware, via software, or both) to implement device-specific aspects of interactive try-on of virtual apparels as per teachings of the present disclosure. As previously noted, the software or program code may be part of the user module 104 and may be stored in the memory 1002 and executable by the processor 1000. For example, when existing hardware architecture of the device 204 cannot be modified, the functionality desired of the device 204 may be obtained through suitable programming of the processor 1000 using the program code of the user module 104. The execution of the program code (by the processor 1000) may cause the processor to perform as needed to support various aspects related to the interactive virtual try-on as per the teachings of the present disclosure. Thus, although the wireless device 204 may be referred to as "performing," "accomplishing," or "carrying out" (or similar such other terms) a function/task or a process or a method step, such performance may be technically accomplished in hardware and/or software as desired.

FIG. 11 illustrates an example configuration of a computer system 1100 that can be used to implement the virtual clothing interaction methodology described herein. In particular embodiments, the computer system 1100 may represent the host system 202. In other embodiments, the computer system 1100 may represent a stand-alone kiosk or terminal. The computer system (also interchangeably referred to as "computing system" or "computing device") 1100 may be suitably configured to implement some or all of the functionality of the VCI application 100 according to the teachings of the present disclosure. If the computer system 1100 is a stand-alone system, such as a kiosk or a terminal, it may execute the user module 104 as well as the retailer module 102 on a single platform. On the other hand, if the computer system 1100 is the host system 202, it may execute only a portion of the VCI application—for example, the retailer module 102. In that case, the block 100 titled "VCI Application" in FIG. 11 may be replaced with the block titled "Retailer Module" and having the reference numeral "102." In other words, the computing system 1100 may implement some or all the functionality of the VCI application 100 depending on how the system 1100 is deployed in the marketplace and whether the user's system 204 implements the user module 104 or not.

The computer system 1100 may include one or more processors 1102, a memory unit 1104, an interface unit 1106 providing communication interfaces, one or more input devices 1108, one or more output devices 1110, and a peripheral storage unit 1112, connected to the processor 1102 as shown and configured to communicate with each other, such as via one or more system buses (not shown) or other suitable connection. In one embodiment, the input devices 1108 may provide operator inputs—such as, for example, messages or commands related to the administration of system 1100, customer service related inputs (for example, rectifying a customer's online order or managing a customer's account), responses to customer queries, modification of apparel dimensions as per customer's requirements, and the like—to the processor 1102 and the VCI application 100 for further processing. The input devices 1108 may include, for example, a touchpad, a camera, an AR device (such as a hololens, a snap lens, and the like), a computer keyboard, a touch-screen, a joystick, a physical or virtual "clickable button," a computer mouse/pointing device, and the like.

A display screen is an example of the output device 1110. Other examples of an output device include a graphics/display device, a computer screen or monitor, an alarm system, or any other type of data output device. In some embodiments, the input device(s) 1108 and the output device(s) 1110 may be coupled to the processor 1102 via an I/O or peripheral interface(s). In some embodiments, the computer system 1100 may include more than one instance of the devices shown. In various embodiments, all the components shown in FIG. 11 may be housed within a single housing. In other embodiments, the computer system 1100 may not include all of the components shown in FIG. 11. Furthermore, the computing system 1100 may be configured as a standalone system, as a server system, as a client system (of another server), as a cluster of networked computers, as a virtual machine (e.g., within a cloud computing system), or in any other suitable form factor.

The processor 1102 is a hardware device that may include a single processing unit or a number of processing units, all of which may include single or multiple computing units or multiple cores. When the computing device 1100 is a multiprocessor system, there may be more than one instance of the processor 1102 or there may be multiple other processors coupled to the processor 1102 via their respective interfaces (not shown). The processor 1102 may include an integrated Graphics Processing Unit (GPU) or the GPU may be a separate processor device in the system 1100. The processor 1102 may be implemented as one or more microprocessors, microcomputers, microcontrollers, Digital Signal Processors (DSPs), Central Processing Units (CPUs), Graphics Processing Units (GPUs), state machines, logic circuitries, virtual machines, and/or any devices that manipulate signals based on operational instructions. Among other capabilities, the processor 1102 may be configured to fetch and execute computer-readable instructions stored in the memory 1104, the peripheral storage 1112, or other computer-readable media. In some embodiments, the processor 1102 may be a System on Chip (SoC).

The memory 1104 and the peripheral storage unit 1112 are examples of non-transitory computer media (e.g., memory storage devices) for storing instructions that can be executed by the processor 1102 to perform the various functions described herein. In some embodiments, the memory 1104 and the peripheral storage unit 1112 may include tangible, computer-readable data storage media. For example, the memory unit 1104 may include both volatile memory and non-volatile memory (e.g., RAM, ROM, or the like) devices. Further, in particular embodiments, the peripheral storage unit 1112 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices constituting the peripheral storage 1112 may be collectively referred to as "memory" or "computer storage media" herein and may be a media capable of storing computer-readable, processor-executable program instructions as computer program code that can be executed by the processor 1102 as a particular machine (or special purpose machine) configured for carrying out the operations and functions described in the implementations herein. In some embodiments, the database 216 (FIG. 2) may be a part of such computer storage media. In other embodiments, such computer storage media may be an online cloud-based storage.

The computing device 1100 also may include one or more communication interfaces as part of its interface unit 1106 for exchanging data via a network (such as the communication network 206 in FIG. 2). The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet (or, more generally, the IP network 206), and the like. Communication interfaces in the interface unit 1106 can also provide communication with an external storage (not shown in FIG. 11), such as in a storage array, network attached storage, storage area network, one or more databases, or the like. For example, if the database 216 in FIG. 2 is implemented as an external storage, the interface unit 1106 may facilitate communication with that database when the computer system 1100 is the host system 202. Similarly, if the computing system 1100 is the host system 202, the interface unit 1106 may facilitate communication between the host system 202 and the UE 204 via the network 206 for the exchange of various data and contents as described before.

The computer storage media, such as the memory 1104 and the mass storage devices in the peripheral storage 1112, may be used to store software and data. For example, the computer storage media may be used to store the operating system (OS) for the computing device 1100; various device drivers for the device 1100; various inputs provided by the operator of the device 1100, received from the UE 204 (for example, body measurements of the user 212, sartorial interactions of the user 212, and so on) when the system 1100 is the host system 202, or generated by the system 1100 (for example, user's sartorial measurements as modified based on user's motion/pose, AR datasets for rendering a virtual apparel as per user's virtual interaction(s), and so on) at run-time during the implementation of the interactive virtual try-on methodology discussed before with reference to FIGS. 1-9; and the data such as video content, text data (for example, a user's online order or account information), streaming content, or any other type of content. The computer storage media also may store software applications such as a word processing application, a spreadsheet application, a payment application, the VCI application 100 (or a module thereof), and the like. The program code for the software applications and the OS may be executed by the processor 1102.

In one embodiment, a non-transitory, computer-readable data storage medium, such as, for example, the system memory 1104 or the peripheral data storage unit 1112, may store program code or software for the VCI application 100 (or a portion thereof) as per particular embodiments of the present disclosure. In the embodiment of FIG. 11, the system memory 1104 is shown to include such program code. As previously noted, if the system 1100 is implemented as the host system 202, the system memory 1104 would include the program code of a portion of the VCI application 100—here, the retailer module 102. Such computer-readable data storage medium may be considered an article of manufacture. In the embodiment of FIG. 11, the VCI application 100 may operate in conjunction with the OS (not shown) of the computing system 1100. The processor 1102 may be configured to execute the program code for the VCI application 100 (or the retailer module 102, as applicable), whereby the computer system (or computing device) 1100 may be operative to perform various virtual clothing related tasks as per the teachings of the present disclosure. In particular embodiments, such tasks may include, for example, the process steps illustrated in FIG. 3 as well as other relevant tasks discussed with reference to FIGS. 1-2 and 4-9 such as, for example, reception of body measurements of a customer, rendering of an augmented image of the customer fitted with a customer-selected virtual apparel, monitoring of virtual interaction(s) of the customer with the virtual apparel, inference of apparel-specific action intended by the customer through the virtual interaction(s), real-time modification of the virtual apparel being displayed to the customer based on the inferred intent, and so on. The program code or software for the VCI application 100 may be proprietary software and/or open source software which, upon execution by the processor 1102, may enable the computer system 1100 to perform operations related to the interactive try-on of a virtual clothing as per teachings of the present disclosure. As a result, the computer system 1100 may operate as a special purpose system/device.

In particular embodiments, the computing device 1100 may include an on-board power supply unit 1114 to provide electrical power to various system components illustrated in FIG. 11. The power supply unit 1114 may receive batteries and/or may be connectable to an AC electrical power outlet. In one embodiment, the power supply unit 1114 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions), such as the program code for the VCI application 100 (including the software modules 102, 104 shown in FIG. 1), that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   wirelessly obtaining, by a computing system, sartorial measurements of a human user by:
   instructing the user to face a camera of the computing system with at least the corresponding body portion visible in a field of view of the camera, while maintaining the body portion visible in the field of view of the camera in a manner necessary to generate the augmented image;
   wirelessly capturing, by the computing system and in real-time, a plurality of two-dimensional (2D) video frames of temporal rotational poses of the body portion in the field of view of the camera;
   performing, by the computing system and in real-time, the following using the plurality of 2D video frames:
   generating a pre-determined number of body measurements based on a pre-determined number of key points established at pre-defined locations throughout the body portion visible in the field of view,
   determining a background visual content of the body portion captured in the plurality of 2D video frames,
   calculating a depth of each body part in the body portion,
   generating a three-dimensional (3D) body mesh of the body portion from the pre-determined number of body measurements and the calculated depth of each body part to represent the body portion as a continuum in 3D, and
   further generating a map of vertices and joints in the body portion from the 3D body mesh to provide anchors for rendering the virtual apparel in the real-time image; and
   determining, by the computing system and in real-time, the sartorial measurements as a function of the following:
   the 3D body mesh and the map of vertices and joints as modified by real-time temporal motion of the user captured through the field of view of the camera, and
   a temporal state of the virtual apparel in view of the temporal motion of the user and a plurality of attributes, wherein the plurality of attributes includes:
   a gender of the user,
   a style of the virtual apparel, a size of the virtual apparel,
   a material of the virtual apparel,
   a texture of the virtual apparel, and physics effects on the virtual apparel;
   displaying, by the computing system, a real-time image of the user with a virtual apparel fitted on a corresponding body portion of the user in the real-time image as per the sartorial measurements, thereby generating an augmented image of the user in real-time;
   interpreting, by the computing system and in real-time, a sartorial interaction by the user with the virtual apparel in the augmented image to predict an apparel-specific action intended by the user as if the user were wearing the virtual apparel; and
   displaying, by the computing system and in real-time, the augmented image of the user having the virtual apparel modified therein as per the apparel-specific action.

2. The method of claim 1, wherein the augmented image is displayed to the user as one of the following:
   a real-time video frame; and
   a combination of video frames, objects, and likeness stacked on top of each other to be viewed as a single video frame to a human eye.

3. The method of claim 1, wherein the 3D body mesh is an ultraviolet (UV) body mesh, and wherein displaying the augmented image comprises:
   receiving, by the computing system, a plurality of Inverse UV (IUV) images of the virtual apparel;
   generating, by the computing system, a plurality of modified IUV images by recalibrating at least one of the following in each corresponding IUV image in the plurality of IUV images based on the apparel-specific action predicted in response to the sartorial interaction and based on cloth texture and material information associated with the virtual apparel:

3D Cartesian co-ordinates of position of a cloth segment of the virtual apparel, the style of the virtual apparel, and the size of the virtual apparel; and mapping, by the computing system, the plurality of modified IUV images onto the UV body mesh to provide the augmented image with the virtual apparel modified therein as per the apparel-specific action.

4. The method of claim 3, further comprising:

receiving, by the computing system, a set of cloth constructors for the virtual apparel, wherein each cloth constructor has a pre-defined shape, size, and position within the virtual apparel;

further receiving, by the computing system, a corresponding set of rules for the set of cloth constructors, wherein each rule defines a limitation on freedom of motion of a corresponding cloth constructor; and generating, by the computing system, the plurality of IUV images representing the virtual apparel as being composed of the set of cloth constructors; and wherein generating the plurality of modified IUV images comprises:

generating, by the computing system, the plurality of modified IUV images by recalibrating at least one of the pre-defined shape, size, and position of each cloth constructor in each corresponding IUV image within the limitation on freedom of motion of the corresponding cloth constructor.

5. The method of claim 1, wherein displaying the real-time image comprises:

allowing, by the computing system, the user to choose one or more of the following attributes related to the virtual apparel the user wishes to try on the corresponding body portion of the user:

a style of the virtual apparel, a size of the virtual apparel, a material of the virtual apparel, a texture of the virtual apparel, and physics effects on the virtual apparel;

selecting, by the computing system, the virtual apparel having the one or more attributes chosen by the user; and displaying, by the computing system, the selected virtual apparel fitted on the corresponding body portion of the user in the real-time image.

6. The method of claim 1, wherein displaying the real-time image comprises:

presenting, by the computing system, a set of virtual candidate apparels to the user, wherein each virtual candidate apparel in the set is dimensionally closest to the sartorial measurements of the corresponding body portion of the user;

allowing, by the computing system, the user to select one of the virtual candidate apparels from the set as the virtual apparel to be fitted on the corresponding body portion of the user; and displaying, by the computing system, the user-selected virtual candidate apparel fitted on the corresponding body portion of the user in the real-time image.

7. The method of claim 1, wherein the interpreting comprises:

allowing, by the computing system, the user to perform the sartorial interaction with the virtual apparel using a control unit;

receiving, by the computing system and in real-time, an output of the control unit generated in response to the sartorial interaction with the virtual apparel;

processing, by the computing system, the output of the control unit to predict the apparel-specific action intended by the user.

8. The method of claim 7, wherein the control unit comprises:

a pressure sensor to detect a pressure exerted at a hand of the user during the sartorial interaction;

a vibration analyzer to sense a vibration of the hand of the user during the sartorial interaction;

a motion sensor to detect a movement of the hand of the user during the sartorial interaction;

a processing unit to generate the output based on values received from the pressure sensor, the vibration analyzer, and the motion sensor during the sartorial interaction; and an interface unit to wirelessly transmit the output for processing by the computing system.

9. The method of claim 1, wherein the interpreting comprises:

monitoring, by the computing system and in real-time, at least one user behavior from the following set of user behaviors:

an interaction of fingertips of the user with the virtual apparel, a change of pose of the user, a rotation of the body portion, a tilting of the body portion, a motion of the body portion, a gesture in response to the generated augmented image, a facial expression in response to the generated augmented image, and an audio expression in response to the generated augmented image;

estimating, by the computing system and in real-time, the sartorial interaction based on the monitoring of the at least one user behavior; and translating, by the computing system and in real-time, the estimated sartorial interaction into a set of executable commands representing the apparel-specific action intended by the user.

10. The method of claim 9, wherein the apparel-specific action is one of the following:

a change to a different type of virtual apparel to be displayed in the augmented image; a change to a different virtual apparel to be displayed in the augmented image;

a change of size of the virtual apparel currently being displayed in the augmented image; a change of style of the virtual apparel currently being displayed in the augmented image;

a modification of a portion of the virtual apparel currently being displayed in the augmented image;

a modification of a property of a cloth of the virtual apparel currently being displayed in the augmented image; and an introduction of a virtual accessory associated with the virtual apparel currently being displayed in the augmented image.

11. The method of claim 1, wherein the interpreting comprises:

receiving, by the computing system, a plurality of pre-defined ways of interacting with the virtual apparel, wherein each of the plurality of pre-defined ways has a corresponding pre-defined apparel-specific action associated therewith;

presenting, by the computing system, the plurality of pre-defined ways to the user prior to the sartorial interaction; and instructing, by the computing system, the user to follow one of the plurality of pre-defined ways as part of the sartorial interaction to convey the apparel-specific action intended by the user.

12. The method of claim 1, further comprising at least one of the following:

displaying, by the computing system, real time graphics allowing the user to view the sartorial measurements as mapped on the corresponding body portion of the user and to adjust the sartorial measurements prior to generation of the augmented image; and performing, by the computing system, the following:

receiving, by the computing system, one or more options associated with the virtual apparel, wherein each option allows customization of the virtual apparel in an option-specific manner, and offering, by the computing system, the one or more options to the user for selection through the sartorial interaction.

13. The method of claim 1, wherein displaying the augmented image comprises:

receiving, by the computing system, a plurality of clothing type-specific inference models, wherein each inference model defines behavior of a clothing when worn on a human body and having a corresponding clothing type specific to the inference model;

determining, by the computing system, the corresponding clothing type of the virtual apparel;

selecting, by the computing system, one of the plurality of clothing type-specific inference models associated with the corresponding clothing type of the virtual apparel; and in response to the apparel-specific action, providing, by the computing system, the augmented image by modifying the virtual apparel as per the clothing type-specific inference model selected for the virtual apparel.

14. The method of claim 1, further comprising:

generating, by the computing system, a three-dimensional (3D) body mesh of the corresponding body portion of the user;

estimating, by the computing system and in real-time, a temporal motion of the user; using, by the computing system, a project-predict-deform based Machine Learning (ML) model to reconstruct the 3D body mesh in real-time based on the temporal motion of the user and the apparel-specific action intended by the user, thereby generating a reconstructed 3D body mesh; and wherein displaying the augmented image comprises:

geometrically deforming, by the computing system, the virtual apparel as per the reconstructed 3D body mesh in the augmented image of the user.

15. A method comprising:

determining, by a computing system, sartorial measurements of a human user by:

generating, by the computing system, a three-dimensional (3D) body mesh of the body portion to represent the body portion as a continuum in 3D;

further generating, by the computing system, a map of vertices and joints in the body portion from the 3D body mesh to provide anchors for rendering the virtual apparel in the first real-time display of the augmented image; and determining, by the computing system, the sartorial measurements as a function of the following:

the 3D body mesh and the map of vertices and joints as modified by real-time temporal motion of the user, and a temporal state of the virtual apparel in view of the temporal motion of the user and a plurality of attributes, wherein the plurality of attributes includes:

a gender of the user, a style of the virtual apparel, a size of the virtual apparel, a material of the virtual apparel, a texture of the virtual apparel, and physics effects on the virtual apparel;

selecting, by the computing system, a virtual apparel that best fits a corresponding body portion of the user as per the sartorial measurements;

generating, by the computing system, a first Augmented Reality (AR) dataset to enable a first real-time display of an augmented image of the user with the virtual apparel fitted on the corresponding body portion of the user;

receiving, by the computing system, an indication predicting an apparel-specific action intended by the user through a sartorial interaction with the virtual apparel in the augmented image; and analyzing, by the computing system, the indication to generate a second AR dataset to enable a second real-time display of the augmented image of the user having the virtual apparel modified therein as per the apparel-specific action.

16. The method of claim 15, wherein the apparel-specific action is one of the following:

a change to a different type of virtual apparel to be displayed in the second real-time display of the augmented image;

a change to a different virtual apparel to be displayed in the second real-time display of the augmented image;

a change of size of the virtual apparel currently being displayed in the first real-time display of the augmented image;

a modification of a portion of the virtual apparel currently being displayed in the first real-time display of the augmented image;

a modification of a property of a cloth of the virtual apparel currently being displayed in the first real-time display of the augmented image; and an introduction of a virtual accessory associated with the virtual apparel currently being displayed in the first real-time display of the augmented image.

17. A computer program product comprising a non-transitory computer-usable medium having computer-readable program code embodied therein, wherein the computer-readable program code, when executed by a computing system, causes the computing system to implement a method comprising performing the following in real-time:

wirelessly generating sartorial measurements of a human user by:

generating, by the computing system, a three-dimensional (3D) body mesh of the body portion to represent the body portion as a continuum in 3D;

further generating, by the computing system, a map of vertices and joints in the body portion from the 3D body mesh to provide anchors for rendering the virtual apparel in the first real-time display of the augmented image; and determining, by the computing system, the sartorial measurements as a function of the following:

the 3D body mesh and the map of vertices and joints as modified by real-time temporal motion of the user, and a temporal state of the virtual apparel in view of the temporal motion of the user and a plurality of attributes, wherein the plurality of attributes includes:
  a gender of the user,
  a style of the virtual apparel, a size of the virtual apparel,
  a material of the virtual apparel,
  a texture of the virtual apparel, and physics effects on the virtual apparel;

providing a virtual apparel that best fits a corresponding body portion of the user as per the sartorial measurements;

displaying a video frame of the user with the virtual apparel fitted on the corresponding body portion of the user, thereby generating an augmented video frame of the user;

allowing the user to perform a sartorial interaction with the virtual apparel in the augmented video frame;

interpreting the sartorial interaction to predict an apparel-specific action intended by the user as if the user were wearing the virtual apparel; and displaying the augmented video frame of the user having the virtual apparel modified therein as per the apparel-specific action.

18. The computer program product of claim 17, wherein the apparel-specific action is one of the following:
  a change to a different type of virtual apparel;
  a change to a different virtual apparel;
  a change of size of the virtual apparel;
  a modification of a portion of the virtual apparel;
  a modification of a property of a cloth of the virtual apparel; and
  an introduction of a virtual accessory associated with the virtual apparel.

* * * * *